US012019143B2

(12) United States Patent
Beg

(10) Patent No.: US 12,019,143 B2
(45) Date of Patent: Jun. 25, 2024

(54) USING HIGH-EFFICIENCY PHY FRAMES FOR MOTION DETECTION

(71) Applicant: Cognitive Systems Corp., Waterloo (CA)

(72) Inventor: Christopher Beg, Kitchener (CA)

(73) Assignee: Cognitive Systems Corp., Waterloo (CA)

( * ) Notice: Subject to any disclaimer, the term of this patent is extended or adjusted under 35 U.S.C. 154(b) by 561 days.

(21) Appl. No.: 17/181,077

(22) Filed: Feb. 22, 2021

(65) Prior Publication Data

US 2021/0278520 A1   Sep. 9, 2021

Related U.S. Application Data

(63) Continuation-in-part of application No. 16/807,776, filed on Mar. 3, 2020, now Pat. No. 10,928,503.

(51) Int. Cl.
*G01S 13/00* (2006.01)
*G01S 13/56* (2006.01)
(Continued)

(52) U.S. Cl.
CPC .......... *G01S 13/56* (2013.01); *G01S 13/003* (2013.01); *H04W 64/006* (2013.01);
(Continued)

(58) Field of Classification Search
CPC ...... G01S 13/56; G01S 13/003; H04W 72/20; H04W 64/006; H04L 2101/622; H04L 5/0007
(Continued)

(56) References Cited

U.S. PATENT DOCUMENTS 4,054,879 A   10/1977 Wright et al.
4,636,774 A   1/1987 Galvin et al.
(Continued)

FOREIGN PATENT DOCUMENTS

AU   2015328533 A1 *  2/2017   ......... H04L 27/2602
CA   2834522   5/2014
(Continued)

OTHER PUBLICATIONS

WIPO, International Search Report and Written Opinion dated Apr. 13, 2021, in PCT/CA2021/050202, 9 pgs.
(Continued)

*Primary Examiner* — Nuzhat Pervin
(74) *Attorney, Agent, or Firm* — Henry Patent Law Firm PLLC

(57) ABSTRACT

In a general aspect, motion is detected in an environment using wireless signals. In one example, a downlink high-efficiency PHY (HE-PHY) frame is received. The downlink HE-PHY frame is transmitted by an access point device to wireless communication devices residing inside an environment. An uplink orthogonal frequency-division multiple access (UL-OFDMA) transmission is subsequently received in response to the downlink HE-PHY frame. The UL-OFDMA transmission is transmitted by the wireless communication devices to the access point device. The UL-OFDMA transmission includes uplink HE-PHY frames simultaneously transmitted on respective resource units by the respective wireless communication devices. A motion data set is generated based on channel responses computed from the uplink HE-PHY frames. Each channel response is computed from a respective one of the uplink HE-PHY frames. Motion within the environment is analyzed based on the motion data set.

30 Claims, 34 Drawing Sheets

(51) Int. Cl.
*H04L 5/00* (2006.01)
*H04L 101/622* (2022.01)
*H04W 64/00* (2009.01)
*H04W 72/20* (2023.01)

(52) U.S. Cl.
CPC ........... *H04W 72/20* (2023.01); *H04L 5/0007* (2013.01); *H04L 2101/622* (2022.05)

(58) Field of Classification Search
USPC .......................................................... 342/28
See application file for complete search history.

(56) References Cited

U.S. PATENT DOCUMENTS

| | | | |
|---|---|---|---|
| 4,649,388 A | 3/1987 | Atlas | |
| 4,740,045 A | 4/1988 | Goodson et al. | |
| 5,270,720 A | 12/1993 | Stove | |
| 5,613,039 A | 3/1997 | Wang et al. | |
| 5,696,514 A | 12/1997 | Nathanson et al. | |
| 6,075,797 A | 6/2000 | Thomas | |
| 6,380,882 B1 | 4/2002 | Hegnauer | |
| 6,573,861 B1 | 6/2003 | Hommel et al. | |
| 6,636,763 B1 | 10/2003 | Junker et al. | |
| 6,914,854 B1 | 7/2005 | Heberley et al. | |
| 7,652,617 B2 | 1/2010 | Kurtz et al. | |
| 8,463,191 B2 | 6/2013 | Farajidana et al. | |
| 8,660,578 B1 | 2/2014 | Yang et al. | |
| 8,671,069 B2 | 3/2014 | Chang et al. | |
| 8,710,984 B2 | 4/2014 | Wilson et al. | |
| 8,812,654 B2 | 8/2014 | Gelvin et al. | |
| 8,832,244 B2 | 9/2014 | Gelvin et al. | |
| 8,836,344 B2 | 9/2014 | Habib et al. | |
| 8,836,503 B2 | 9/2014 | Gelvin et al. | |
| 9,019,148 B1 | 4/2015 | Bikhazi et al. | |
| 9,030,321 B2 | 5/2015 | Breed | |
| 9,094,071 B2 | 7/2015 | Nandagopalan et al. | |
| 9,247,382 B2* | 1/2016 | Guo | H04W 24/10 |
| 9,253,592 B1 | 2/2016 | Moscovich et al. | |
| 9,329,701 B2 | 5/2016 | Lautner | |
| 9,462,607 B2* | 10/2016 | Ma | H04W 74/002 |
| 9,523,760 B1* | 12/2016 | Kravets | G01S 5/0273 |
| 9,524,628 B1 | 12/2016 | Omer et al. | |
| 9,551,784 B2 | 1/2017 | Katuri et al. | |
| 9,584,974 B1 | 2/2017 | Omer et al. | |
| 9,609,468 B1 | 3/2017 | Moscovich et al. | |
| 9,628,365 B2 | 4/2017 | Gelvin et al. | |
| 9,692,459 B2 | 6/2017 | Maltsev et al. | |
| 9,743,294 B1* | 8/2017 | Omer | G01S 13/56 |
| 9,866,308 B1 | 1/2018 | Bultan et al. | |
| 9,869,759 B2 | 1/2018 | Furuskog et al. | |
| 9,893,790 B2* | 2/2018 | Moon | H04B 7/0452 |
| 9,912,513 B2* | 3/2018 | Kwon | H04L 27/2665 |
| 9,923,702 B2* | 3/2018 | Wang | H04L 5/0073 |
| 9,927,519 B1 | 3/2018 | Omer et al. | |
| 9,933,517 B1 | 4/2018 | Olekas et al. | |
| 9,946,351 B2 | 4/2018 | Sakaguchi et al. | |
| 9,989,622 B1 | 6/2018 | Griesdorf et al. | |
| 10,004,076 B1 | 6/2018 | Griesdorf et al. | |
| 10,045,369 B2* | 8/2018 | Li | H04W 72/21 |
| 10,048,350 B1 | 8/2018 | Piao et al. | |
| 10,051,414 B1* | 8/2018 | Omer | G01S 13/56 |
| 10,077,204 B2 | 9/2018 | Maschmeyer et al. | |
| 10,108,903 B1 | 10/2018 | Piao et al. | |
| 10,109,167 B1 | 10/2018 | Olekas et al. | |
| 10,109,168 B1 | 10/2018 | Devison et al. | |
| 10,111,228 B2 | 10/2018 | Griesdorf et al. | |
| 10,129,853 B2 | 11/2018 | Manku et al. | |
| 10,462,790 B1* | 10/2019 | Zhang | H04L 5/0007 |
| 10,516,468 B2* | 12/2019 | Yoon | H04L 5/0048 |
| 10,524,289 B2 | 12/2019 | Adachi et al. | |
| 10,630,519 B2* | 4/2020 | Lee | H04L 5/0016 |
| 10,951,453 B2 | 3/2021 | Nam | H04L 27/2662 |
| 11,039,440 B1* | 6/2021 | Zhang | H04W 72/0453 |
| 11,246,162 B2* | 2/2022 | Adachi | H04L 1/008 |

| | | | |
|---|---|---|---|
| 2002/0080014 A1 | 6/2002 | McCarthy et al. | |
| 2003/0108119 A1 | 6/2003 | Mohebbi et al. | |
| 2005/0128067 A1 | 6/2005 | Zakrewski | |
| 2006/0152404 A1 | 7/2006 | Fullerton et al. | |
| 2006/0217132 A1 | 9/2006 | Drummond-Murray et al. | |
| 2006/0284757 A1 | 12/2006 | Zemany | |
| 2007/0296571 A1 | 12/2007 | Kolen | |
| 2008/0057978 A1 | 3/2008 | Karaoguz et al. | |
| 2008/0119130 A1 | 5/2008 | Sinha | |
| 2008/0240008 A1 | 10/2008 | Backes et al. | |
| 2008/0258907 A1 | 10/2008 | Kalpaxis | |
| 2008/0300055 A1 | 12/2008 | Lutnick et al. | |
| 2008/0303655 A1 | 12/2008 | Johnson | |
| 2009/0062696 A1 | 3/2009 | Nathan et al. | |
| 2009/0180444 A1 | 7/2009 | McManus et al. | |
| 2010/0073686 A1 | 3/2010 | Medeiros et al. | |
| 2010/0127853 A1 | 5/2010 | Hanson et al. | |
| 2010/0130229 A1 | 5/2010 | Sridhara et al. | |
| 2010/0207804 A1 | 8/2010 | Hayward et al. | |
| 2010/0306320 A1 | 12/2010 | Leppanen et al. | |
| 2010/0315284 A1 | 12/2010 | Trizna et al. | |
| 2011/0019587 A1 | 1/2011 | Wang | |
| 2011/0035491 A1 | 2/2011 | Gelvin et al. | |
| 2011/0090081 A1 | 4/2011 | Khorashadi et al. | |
| 2011/0263946 A1 | 10/2011 | El Kaliouby et al. | |
| 2012/0115512 A1 | 5/2012 | Grainger et al. | |
| 2012/0146788 A1* | 6/2012 | Wilson | G08B 13/187 340/539.23 |
| 2012/0182429 A1 | 7/2012 | Forutanpour et al. | |
| 2012/0184296 A1 | 7/2012 | Milosiu | |
| 2012/0283896 A1 | 11/2012 | Persaud | |
| 2013/0017836 A1 | 1/2013 | Chang et al. | |
| 2013/0090151 A1 | 4/2013 | Ngai et al. | |
| 2013/0094538 A1 | 4/2013 | Wang | |
| 2013/0113647 A1 | 5/2013 | Sentelle et al. | |
| 2013/0162459 A1 | 6/2013 | Aharony et al. | |
| 2013/0178231 A1 | 7/2013 | Morgan | |
| 2013/0283256 A1 | 10/2013 | Proud | |
| 2014/0126323 A1 | 5/2014 | Li et al. | |
| 2014/0135042 A1 | 5/2014 | Buchheim et al. | |
| 2014/0148195 A1 | 5/2014 | Bassan-Eskenazi et al. | |
| 2014/0247179 A1 | 9/2014 | Furuskog | |
| 2014/0266669 A1 | 9/2014 | Fadell et al. | |
| 2014/0274218 A1 | 9/2014 | Kadiwala et al. | |
| 2014/0286380 A1 | 9/2014 | Prager et al. | |
| 2014/0329540 A1 | 11/2014 | Duggan et al. | |
| 2014/0355713 A1 | 12/2014 | Bao et al. | |
| 2014/0361920 A1 | 12/2014 | Katuri et al. | |
| 2015/0043377 A1 | 2/2015 | Cholas et al. | |
| 2015/0049701 A1 | 2/2015 | Tian et al. | |
| 2015/0063323 A1 | 3/2015 | Sadek et al. | |
| 2015/0078295 A1 | 3/2015 | Mandyam et al. | |
| 2015/0098377 A1 | 4/2015 | Amini et al. | |
| 2015/0131517 A1* | 5/2015 | Chu | H04W 72/30 370/312 |
| 2015/0159100 A1 | 6/2015 | Shi et al. | |
| 2015/0181388 A1 | 6/2015 | Smith | |
| 2015/0195100 A1 | 7/2015 | Imes et al. | |
| 2015/0212205 A1 | 7/2015 | Shpater | |
| 2015/0245164 A1 | 8/2015 | Merrill | |
| 2015/0269825 A1 | 9/2015 | Tran | |
| 2015/0288745 A1 | 10/2015 | Moghaddam et al. | |
| 2015/0304886 A1 | 10/2015 | Liu et al. | |
| 2015/0309166 A1 | 10/2015 | Sentelle et al. | |
| 2015/0312877 A1 | 10/2015 | Bhanage | |
| 2015/0338507 A1 | 11/2015 | Oh et al. | |
| 2015/0350849 A1 | 12/2015 | Huang et al. | |
| 2015/0358995 A1* | 12/2015 | Li | H04W 72/21 370/329 |
| 2015/0366542 A1 | 12/2015 | Brown et al. | |
| 2015/0382342 A1* | 12/2015 | Seok | H04W 72/21 370/336 |
| 2016/0018508 A1 | 1/2016 | Chen et al. | |
| 2016/0066342 A1* | 3/2016 | Ma | H04W 74/04 370/329 |
| 2016/0087775 A1* | 3/2016 | Hedayat | H04L 5/0055 370/329 |
| 2016/0088438 A1 | 3/2016 | O'Keeffe | |
| 2016/0088631 A1 | 3/2016 | Hedayat et al. | |

(56) References Cited

U.S. PATENT DOCUMENTS

| | | | |
|---|---|---|---|
| 2016/0105304 A1* | 4/2016 | Kwon | H04W 56/00 |
| | | | 370/338 |
| 2016/0135205 A1 | 5/2016 | Barbu et al. | |
| 2016/0150418 A1 | 5/2016 | Kang et al. | |
| 2016/0165574 A1* | 6/2016 | Chu | H04W 72/21 |
| | | | 370/312 |
| 2016/0183059 A1 | 6/2016 | Nagy et al. | |
| 2016/0183192 A1* | 6/2016 | Kang | H04M 1/72463 |
| | | | 370/311 |
| 2016/0187475 A1 | 6/2016 | Horng et al. | |
| 2016/0192351 A1* | 6/2016 | Kwon | H04W 72/21 |
| | | | 370/329 |
| 2016/0203689 A1 | 7/2016 | Hintz et al. | |
| 2016/0205672 A1* | 7/2016 | Kim | H04L 27/2675 |
| | | | 370/330 |
| 2016/0210838 A1 | 7/2016 | Yan et al. | |
| 2016/0255606 A1* | 9/2016 | Chu | H04W 84/12 |
| | | | 370/312 |
| 2016/0262355 A1 | 9/2016 | Swan | |
| 2016/0302185 A1* | 10/2016 | Sun | H04L 5/0007 |
| 2016/0315681 A1* | 10/2016 | Moon | H04W 74/0816 |
| 2016/0315796 A1* | 10/2016 | Kwon | H04L 27/2666 |
| 2016/0330714 A1* | 11/2016 | Hedayat | H04L 5/0023 |
| 2016/0330732 A1* | 11/2016 | Moon | H04B 7/0639 |
| 2016/0345349 A1* | 11/2016 | Ferdowsi | H04W 72/1268 |
| 2016/0363663 A1 | 12/2016 | Mindell et al. | |
| 2017/0042488 A1 | 2/2017 | Muhsin | |
| 2017/0048890 A1* | 2/2017 | Sun | H04L 5/0044 |
| 2017/0052247 A1 | 2/2017 | Kong et al. | |
| 2017/0055126 A1 | 2/2017 | O'Keeffe | |
| 2017/0055131 A1 | 2/2017 | Kong et al. | |
| 2017/0059190 A1 | 3/2017 | Stefanski et al. | |
| 2017/0086281 A1 | 3/2017 | Avrahamy | |
| 2017/0090026 A1 | 3/2017 | Joshi et al. | |
| 2017/0111852 A1 | 4/2017 | Selen et al. | |
| 2017/0118000 A1* | 4/2017 | Chu | H04L 5/0023 |
| 2017/0123528 A1 | 5/2017 | Hu et al. | |
| 2017/0126488 A1 | 5/2017 | Cordeiro et al. | |
| 2017/0146656 A1 | 5/2017 | Belsley et al. | |
| 2017/0150255 A1 | 5/2017 | Wang et al. | |
| 2017/0155439 A1 | 6/2017 | Chang et al. | |
| 2017/0177618 A1 | 6/2017 | Hu et al. | |
| 2017/0180882 A1 | 6/2017 | Lunner et al. | |
| 2017/0195893 A1 | 7/2017 | Lee et al. | |
| 2017/0201305 A1* | 7/2017 | Moon | H04W 74/0816 |
| 2017/0223628 A1 | 8/2017 | Snyder et al. | |
| 2017/0251392 A1 | 8/2017 | Nabetani | |
| 2017/0278374 A1 | 9/2017 | Skaaksrud | |
| 2017/0280351 A1 | 9/2017 | Skaaksrud | |
| 2017/0302422 A1* | 10/2017 | Chu | H04W 72/0453 |
| 2017/0311279 A1 | 10/2017 | Allegue et al. | |
| 2017/0311574 A1 | 11/2017 | Swan | |
| 2017/0343658 A1 | 11/2017 | Ramirez et al. | |
| 2018/0006858 A1* | 1/2018 | Kwon | H04L 5/0044 |
| 2018/0027389 A1 | 1/2018 | Shirakata et al. | |
| 2018/0086264 A1 | 3/2018 | Pedersen | |
| 2018/0106885 A1 | 4/2018 | Blayvas | |
| 2018/0120420 A1 | 5/2018 | McMahon et al. | |
| 2018/0168552 A1 | 6/2018 | Shi et al. | |
| 2018/0180706 A1 | 6/2018 | Li et al. | |
| 2018/0220417 A1* | 8/2018 | Matsuo | H04W 72/20 |
| 2018/0288587 A1 | 10/2018 | Allegue Martinez et al. | |
| 2018/0288769 A1* | 10/2018 | Chu | H04L 5/0007 |
| 2018/0288799 A1* | 10/2018 | Min | H04W 74/0808 |
| 2018/0330293 A1 | 11/2018 | Kulkarni et al. | |
| 2019/0007251 A1* | 1/2019 | Zhang | H04L 27/2646 |
| 2019/0033446 A1 | 1/2019 | Bultan et al. | |
| 2019/0109674 A1* | 4/2019 | Hedayat | H04L 5/0007 |
| 2019/0140728 A1* | 5/2019 | Moon | H04B 7/0617 |
| 2019/0146075 A1* | 5/2019 | Kravets | H04B 17/391 |
| | | | 455/67.11 |
| 2019/0146076 A1 | 5/2019 | Kravets et al. | |
| 2019/0149210 A1* | 5/2019 | Seok | H04B 7/0617 |
| | | | 370/338 |
| 2019/0156943 A1 | 5/2019 | Kocherscheidt et al. | |
| 2019/0238377 A1* | 8/2019 | Lee | H04L 5/0094 |
| 2019/0261418 A1* | 8/2019 | Chu | H04W 74/0816 |
| 2019/0272718 A1 | 9/2019 | Hurtig et al. | |
| 2019/0379506 A1* | 12/2019 | Cheng | H04L 1/0038 |
| 2020/0021466 A1 | 1/2020 | Da Silva et al. | |
| 2020/0213172 A1* | 7/2020 | Lee | H04W 74/085 |
| 2020/0274585 A1* | 8/2020 | Huang | H04B 7/0456 |
| 2020/0305231 A1 | 9/2020 | Sadeghi et al. | |
| 2021/0013933 A1* | 1/2021 | Zhou | H04B 7/088 |
| 2021/0399797 A1* | 12/2021 | Khan | H04B 7/18541 |
| 2022/0311557 A1* | 9/2022 | Yamamoto | H04L 1/1858 |

FOREIGN PATENT DOCUMENTS

| | | | | |
|---|---|---|---|---|
| CA | 2945702 | | 8/2015 | |
| EP | 3202200 B1 * | | 5/2022 | H04L 1/1607 |
| JP | 1997-507298 | | 7/1997 | |
| JP | 2004286567 | | 10/2004 | |
| JP | 2013072865 | | 4/2013 | |
| WO | 2014021574 | | 2/2014 | |
| WO | 2014201574 | | 12/2014 | |
| WO | 2015/168700 | | 11/2015 | |
| WO | 2016005977 | | 1/2016 | |
| WO | 2016066822 | | 5/2016 | |
| WO | 2016110844 | | 7/2016 | |
| WO | 2017106976 | | 6/2017 | |
| WO | 2017132765 | | 8/2017 | |
| WO | 2017177303 | | 10/2017 | |
| WO | 2017210770 | | 12/2017 | |
| WO | 2018094502 | | 5/2018 | |
| WO | 2019041019 | | 3/2019 | |

OTHER PUBLICATIONS

EPO, Extended European Search Report issued in Application No. 21763888.1 dated Jul. 21, 2023, 7 pages.
USPTO, Final Office Action dated Aug. 10, 2020, in U.S. Appl. No. 16/807,776, 18 pgs.
USPTO, Non-Final Office Action dated Apr. 22, 2020, in U.S. Appl. No. 16/807,776, 38 pgs.
USPTO, Notice of Allowance dated Oct. 20, 2020, in U.S. Appl. No. 16/807,776, 8 pgs.
WIPO, International Search Report and Written Opinion dated Jan. 5, 2021, in PCT/CA2020/051572, 8 pgs.
Dekker, et al., "Gesture Recognition with a Low Power FMCW Radar and a Deep Convolutional Neural Network", Proceedings of the 14th European Radar Conference, Nuremberg, Germany, Oct. 11-13, 2017, 4 pgs.
Domenico, et al., "Exploring Training Options for RF Sensing Using CSI", IEEE Communications Magazine, 2018, vol. 56, Issue 5, pp. 116-123, 8 pgs.
Iqbal, et al., "Indoor Motion Classification Using Passive RF Sensing Incorporating Deep Learning", ISSN: 2577-2465, Electronic IEEE, Jun. 3, 2018, 5 pgs.
Kosba, et al., "Robust WLAN Device-free Passive Motion Detection", IEEE Wireless Communications and Networking Conference, Apr. 2012, 6 pgs.
Youssef, Moustafa, et al., "Challenges: Device-free Passive Localization for Wireless Environments", Mobicom 07 Proceedings of the 13th Annual ACM International Conference on Mobile Computing and Networking, Sep. 2007, 11 pgs.
EPO, Extended European Search Report issued in Application No. 20922672.9 on Apr. 9, 2024, 7 pages.
Liu, Wenyuan, et al., "Bfp: Behavior-Free Passive Motion Detection Using PHY Information", Wireless Personal Communications, vol. 83 No. 2, Feb. 15, 2015, pp. 1035-1055, 21 pages.

* cited by examiner

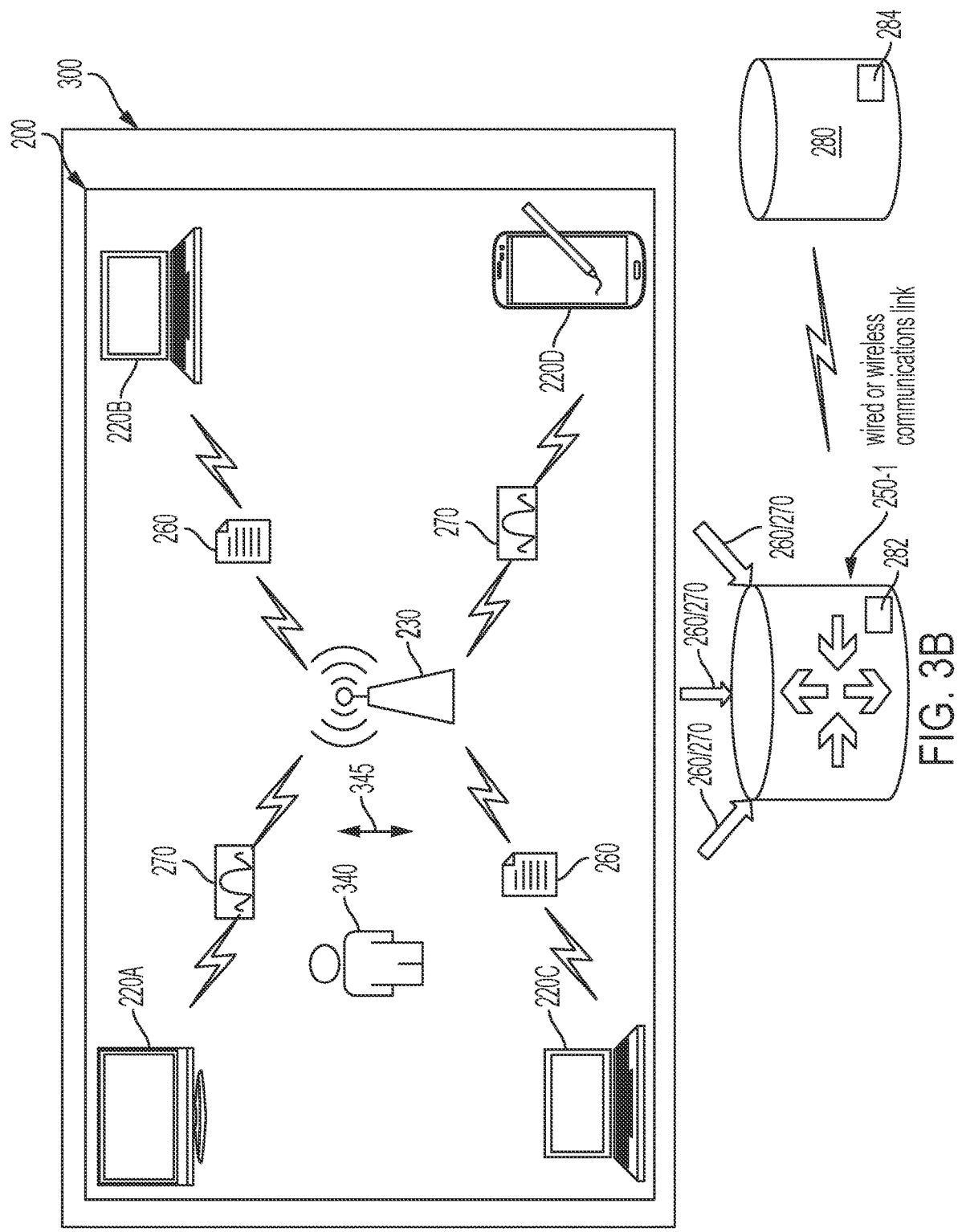

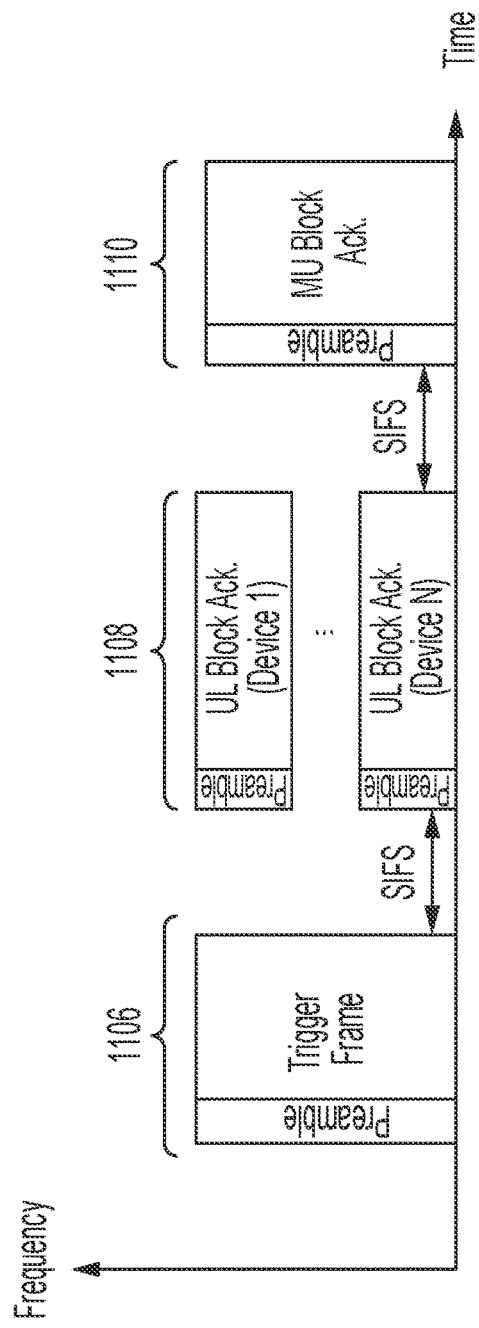
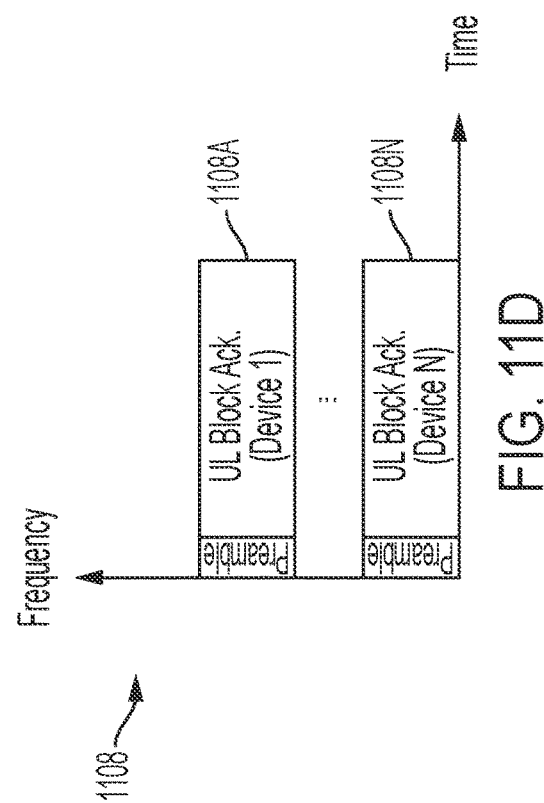
FIG. 11C
FIG. 11D

USING HIGH-EFFICIENCY PHY FRAMES FOR MOTION DETECTION

CROSS-REFERENCE TO RELATED APPLICATIONS

The present application is a continuation-in-part of U.S. patent application Ser. No. 16/807,776, filed Mar. 3, 2020, entitled "Using Over-the-Air Signals for Passive Motion Detection" the disclosure of which is hereby incorporated by reference in their entirety.

BACKGROUND

The following description relates to using over-the-air signals for passive motion detection.

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems and other types of systems.

DESCRIPTION OF DRAWINGS

FIGS. 3A to 3E show various examples of at least one listening device and an environment including a moving object.

FIG. 11C is a diagram showing an example sequence of HE-PHY frames transmitted in an example wireless communication network system operating according to the IEEE 802.11ax standard.

FIG. 11D is a diagram showing an example uplink-OFDMA transmission.

DETAILED DESCRIPTION

Figure 1:
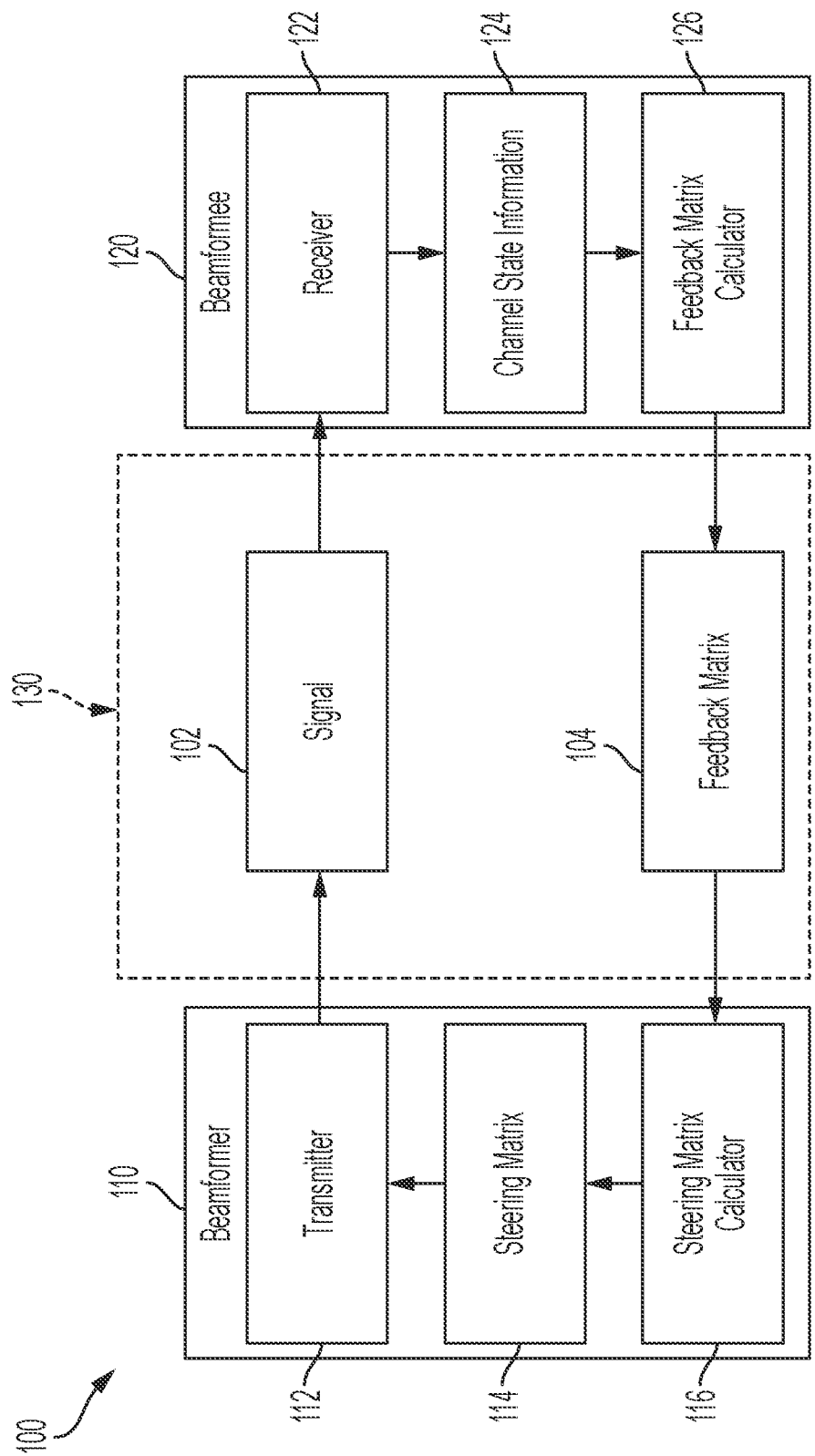
FIG. 1 is a diagram showing an example beamforming system including a beamformer and a beamformee.

In some aspects of what is described, a wireless sensor device (e.g., a listening device) eavesdrops on over-the-air signals (e.g., wireless signals) exchanged between network devices in a space. In some cases, the over-the-air signals include either beamforming reports, physical (PHY) frames including preambles or training symbols, or both. In some instances, the listening device is able to extract movement or motion information through examination of available over-the-air information normally exchanged by wireless devices communicating among each other. Motion may be detected based on the extracted movement or motion information. The listening device may obtain over-the-air information exchanged between wireless devices without the listening device having any association to the wireless network on which the over-the-air information is being exchanged. In this case, the over-the-air information may be used to sense motion of objects in a remote environment, in a passive manner. In some cases, by examining beamforming dynamic information exchanged between devices, a motion detection region may be constrained to the space or environment in which the communicating wireless devices reside. In some instances, this allows the listening device to be placed anywhere within listening range of the communicating wireless devices.

The systems and techniques described here may provide one or more advantages in some instances. For example, the listening device may provide passive motion sensing so the motion detection may be performed discretely, e.g., by law enforcement, security, etc. Further, the listening device may passively detect motion based on wireless communication devices communicating using known protocols or processes (e.g., aspects of the IEEE 802.11 standard) implemented on commercially available wireless communication devices. In some instances, motion may be detected within a geographically constrained sensing area regardless of placement of the listening device.

In some aspects of what is described, over-the-air information is exchanged among wireless devices according to the IEEE 802.11ax standard. In the IEEE 802.11ax standard, a downlink transmission can occur from an access point device to wireless devices associated with the access point device. The downlink transmission can include a High-Efficiency Long Training Field" PHY frame, also known as HE-PHY frame, that is addressed to the wireless devices. The HE-PHY frame of the downlink transmission can include a trigger frame. The access point device can allocate respective subsets of subcarriers, or resource units (RUs) to the respective wireless devices, and the trigger frame can include an indication of the resource unit allocation. The wireless devices transmit an uplink-orthogonal frequency-division multiple access (UL-OFDMA) transmission to the access point device in response to receiving and processing the trigger frame. In the UL-OFDMA transmission, the wireless devices transmit respective HE-PHY frames to the access point device simultaneously using their respective subset of subcarriers. The listening device (or any other device) receiving the downlink HE-PHY frame and the UL-OFDMA transmission can use these transmissions to sense motion of objects in an environment. The systems and techniques described here may provide one or more advantages in some instances. For example, since the UL-OFDMA transmission allows the wireless devices to transmit respective HE-PHY frames to the access point device simultaneously, a single UL-OFDMA transmission can be used to compute multiple channel responses associated with different motion detection zones in the environment. Consequently, motion of objects in multiple motion detection zones can be sensed simultaneously.

Beamforming dynamic information may be indicative of the behavior of, or information generated or used by, wireless communication devices in performing beamforming operations over time. For example, beamforming dynamic information may include feedback or steering matrices generated by wireless communication devices communicating according to an IEEE 802.11 standard (e.g., the IEEE 802.11-2012 standard or the IEEE 802.11ac-2013 standard). By analyzing changes in the beamforming dynamic information of wireless communication devices, motion in the space may be inferred/detected. For example, in some implementations, feedback and steering matrices generated by wireless communication devices in a beamforming wireless communication system may be analyzed over time to detect changes in the estate (which may be caused by motion of an object). Beamforming may be performed between devices based on some knowledge of the channel state (e.g., through feedback properties generated by a receiver), which can be used to generate one or more steering properties (e.g., a steering matrix) that are applied by a transmitter device to shape the transmitted beam/signal in a particular direction or directions. Thus, changes to the steering or feedback properties used in the beamforming process indicate changes in the channel state, which may be caused by moving objects in the space accessed by the wireless communication system.

In some implementations, for example, a steering matrix may be generated on a transmitter device (beamformer) based on a feedback matrix communicated to the transmitter device by a receiver device (beamformee), derived from channel sounding. Because the steering and feedback matrices are related to propagation characteristics of the channel, these matrices change as objects move within the channel. Changes in the channel characteristics are accordingly reflected in these matrices, and by analyzing the matrices, motion can be detected, and different characteristics of the detected motion can be determined.

Channel sounding may refer to the process performed to acquire Channel State Information (CSI) from each of the different receiver devices in a wireless communication system. In some instances, channel sounding is performed by sending training symbols (e.g., a null data packet (NDP) as specified in the IEEE 802.11ac-2013 standard) and waiting for the receiver devices to provide feedback that includes a measure of the channel. In some instances, the feedback includes a feedback matrix calculated by each of the receiver devices. This feedback may then be used to generate the steering matrix used to pre-code the data transmission by creating a set of steered beams, which may optimize reception at one or more receiver devices. The channel sounding process may be performed repeatedly by a wireless communication system. The steering matrix may therefore repeatedly update, such as, for example, to minimize the impact of the propagation channel change to the data transmission quality. By observing changes in the steering matrix (or feedback matrix) over time, motion by an object in the channel can be detected. Further, in some cases, different categories of motion (e.g., human motion vs. dog/cat motion) can be identified.

Changes in the beamforming or feedback matrices can be determined in a number of ways. In some cases, for example, a variance for each entry in the matrix is analyzed, or the linear independence of matrix columns (e.g., rank). This information can, for example, allow for determining a number of independently fading paths present in the channel. In some cases, if the coefficients of this linear independence are changing, the changes could be due to a moving object restricted to a certain zone. If the number of linearly independent columns itself changes, the changes could be due to wide-spread changes across the channel, allowing different kinds of multipath to be created and destroyed. In some cases, the time series of this inter-column correlation can be analyzed to determine, for example, how slow or fast these changes are occurring.

In some instances, the beamforming is performed according to a standardized process. For example, the beamforming may be performed according to an IEEE 802.11 standard (e.g., 802.11n, 802.11ac, 802.11ax standards, etc.). The beamforming may be an optional or mandatory feature of the standard. Beamforming may be performed according to another standard, or in another manner. In some cases, the 802.11 standard applies adaptive beamforming using multi-antenna spatial diversity to improve data transmission quality between network nodes. Moving objects change spatial characteristics of the environment by changing multipath propagation of transmitted wireless signals. As a result, such movement can influence a beamforming steering configuration performed by a device according to the 802.11 standard. By observing how the spatial configuration (e.g., beamforming) of the beamformer changes over time (e.g., via the steering matrix generated by the beamformer based on a feedback matrix), physical motion within the area covered by wireless transmission may be detected.

FIG. 1 shows an example beamforming system 100, which includes a beamformer 110 and a beamformee 120. In general, beamforming is a technique that focuses or steers a wireless signal (e.g., a radio frequency (RF) signal) towards a specific receiving device, rather than having the signal spread in all directions from a broadcast antenna. In the example of FIG. 1, the beamformer 110 may be configured to focus a wireless signal towards the beamformee 120. The beamformer 110 may include a transmitter 112 and a steering matrix calculator 116. The beamformee 120 may include a receiver 122 and a feedback matrix calculator 126. In some implementations, the steering matrix calculator 116 and the feedback matrix calculator 126 are implemented using general or special purpose microprocessors, processors of any kind of digital computer, or special purpose logic circuitry (e.g., a field programmable gate array or an application specific integrated circuit). The beamformer 110 and the beamformee 120 are communicatively coupled to each other by a channel 130. The beamformer 110 sends a wireless signal 102 using the transmitter 112 to the beamformee 120. Transmission of the wireless signal 102 is mediated through the channel 130. In some instances, the signal 102 includes a null data packet (NDP), which may function as a channel sounding packet. The beamformee 120 receives the signal 102 using the receiver 122. In some cases, the transmitter 112 and the receiver 122 each include multiple antennas and form a multiple-input/multiple-output (MIMO) system.

In some implementations, the beamformee 120 determines channel state information (CSI) 124 based on the wireless signal(s) received at the receiver 122. The beamformee 120 then computes, using the feedback matrix calculator 126, a feedback matrix 104 based on the CSI 124. In some cases, the feedback matrix calculator 126 generates a feedback matrix 104 that is indicative of conditions of the channel 130. Therefore, changes within the feedback matrix 104 over time may be indicative of changes in conditions of the channel 130, which in turn may be correlated to changes occurring in a spatial region spanned by the channel 130 (e.g., a zone between the beamformer 110 and beamformee 120). As a consequence, changes within the feedback matrix 104 over time may be used to wirelessly sense changes occurring in the spatial region spanned by the channel 130. As an example, changes within the feedback matrix 104 over time may be used for motion detection (e.g., presence, location, or intensity of motion), presence detection, gesture detection, and other applications.

The feedback matrix 104 is sent by the beamformee 120 to the beamformer 110. In some cases, the feedback matrix 104 is sent to the beamformer 110 in a compressed format (e.g., as a compressed version of the feedback matrix 104 computed by the feedback matrix calculator 126). In some implementations, the feedback matrix calculator 126 generates a V-matrix or a compressed V-matrix (CV-matrix). The beamformer 110 then generates, using the steering matrix calculator 116, a steering matrix 114 based on the feedback matrix 104. The steering matrix 114 is then used by the transmitter 112 to focus or steer the next wireless signal transmission to the beamformee 120.

In some implementations, the beamforming process performed by the system 100 is based on a standard, such as, for example, an IEEE 802.11 standard. In some cases, the beamforming system 100 can be modeled by Equation (1):

$$y_k = H_k Q_k x_k + n \quad (1)$$

where $x_k$ represents a vector $[x_1, x_2, \ldots, x_n]$ transmitted in subcarrier frequency k by the transmitter 112, $y_k$ represents a vector $[y_1, y_2, \ldots, y_n]$ received by the receiver 122, $H_k$ represents a channel response matrix for subcarrier frequency k of dimensions $N_{RX} \times N_{TX}$ (where $N_{RX}$ is the number of antennas at the receiver and $N_{TX}$ is the number of antennas at the transmitter), $Q_k$ is a steering matrix applied to the transmitted signal $x_k$ and having dimension $N_{TX} \times N_{STS}$ (where $N_{STS}$ is the number of elements in $x_k$), and n represents white (spatially and temporally) Gaussian noise.

In some implementations, explicit beamforming may be used. For example, explicit beamforming requires explicit feedback from the beamformee 120 of the current channel state. In such implementations, the beamformee 120 computes the channel matrices $H_k$ based on the Long Training Field (LTF) included in a null data packet transmitted by the beamformer 110 to the beamformee 120. The channel matrices $H_k$ may then be encoded into a matrix $V_k$. In some cases, the matrix $V_k$ is sent by the beamformee 120 to the beamformer 110 in a Beamforming Report Field using an Action No Ack Management Frame. The beamformee 120 may also perform a similar beamforming process to determine a steering matrix for sending beamformed signals to the beamformer 110.

Figure 2A:
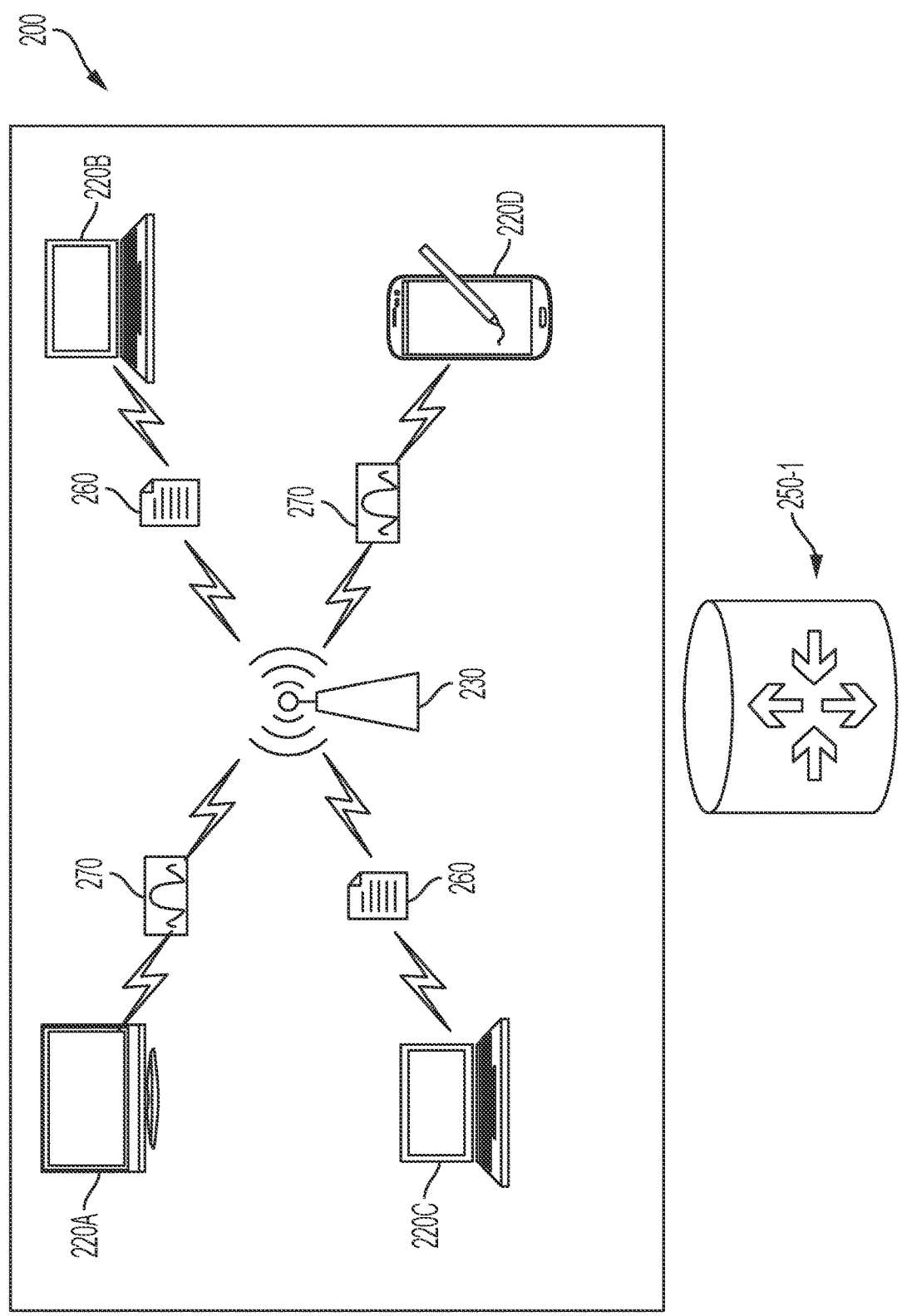
FIGS. 2A to 2E show various examples of at least one listening device and a wireless communication network system.

FIG. 2A is a diagram showing an example wireless communication network system 200. In some instances, the wireless communication network system 200 is configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), ZigBee), millimeter wave communications, and others.

The wireless communication network system 200 may include one or more wireless devices 220A, 220B, 220C, 220D and a wireless access point (AP) 230. The wireless devices 220A, 220B, 220C, 220D can operate in the wireless communication network system 200, for example, according to a wireless network standard or another type of wireless communication protocol. The wireless devices 220A, 220B, 220C, 220D may include, or may be, a mobile device (e.g., a smartphone, a smart watch, a tablet, a laptop computer, etc.), a wireless-enabled device (e.g., a smart thermostat, a Wi-Fi enabled camera, a smart TV), or another type of device that communicates in the wireless communication network system 200. In some examples, one or more of the wireless devices 220A, 220B, 220C, 220D (e.g., the wireless device 220D shown in FIG. 2A) may also be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); 5G standards, and others.

In the example shown in FIG. 2A, the wireless devices 220A, 220B, 220C, 220D are wirelessly connected to and in communication with the AP 230. In some implementations, the wireless devices 220A, 220B, 220C, 220D and the AP 230 communicate to one another via RF signals, for example, according to the IEEE 802.11 family of standards or another standard. In some implementations, the AP 230 may be an access point that allows wireless devices 220A, 220B, 220C, 220D to connect to a wired network or may be a node of a wireless mesh network, such as, for example, a commercially available mesh network system (e.g., GOOGLE Wi-Fi, EERO mesh, etc.). In examples where the AP 230 is a node of a wireless mesh network, the wireless devices 220A, 220B, 220C, 220D may be leaf devices (e.g., mobile devices, smart devices, laptop computers, etc.) that access the mesh network through AP 230.

When the wireless devices 220A, 220B, 220C, 220D seek to connect to or communicate with the AP 230, the wireless devices 220A, 220B, 220C, 220D may go through an authentication and association phase with the AP 230. Among other things, the association phase assigns address information (e.g., an association ID or another type of unique identifier) to each of the wireless devices 220A, 220B, 220C, 220D. For example, within the IEEE 802.11 family of standards for Wi-Fi, each of the wireless devices 220A, 220B, 220C, 220D may identify itself using a unique 48-bit address (e.g., the MAC address), although the wireless devices 220A, 220B, 220C, 220D may be identified using other types of identifiers embedded within one or more fields of a message. The address information (e.g., MAC address or another type of unique identifier) can be either hardcoded and fixed, or randomly generated according to the network address rules at the start of the association process. Once the wireless devices 220A, 220B, 220C, 220D have associated to the AP 230, their respective address information may remain fixed. Subsequently, a transmission by the AP 230 or the wireless devices 220A, 220B, 220C, 220D includes, at a minimum, the address information (e.g., MAC address) of the transmitting wireless device and the address information (e.g., MAC address) of the receiving device (e.g., the AP 230). The address information (e.g., the MAC addresses of the transmitting and receiving devices) is not part of an encrypted or scrambled payload. Consequently, the identities of the transmitting and receiving devices (e.g., as indicated by their address information) may be accessible to a device that is within listening range of the communication and eavesdropping on the communication between the transmitting and receiving devices. The identity of the transmitting and receiving devices may, as an example, be used by the eavesdropping device to determine a link identifier that establishes the identity of a respective link within the wireless communication network system 200.

A listening device 250-1 resides outside the wireless communication network system 200. For example, the listening device 250-1 is not connected to, associated with, or communicating via the AP 230 or any of the wireless devices 220A, 220B, 220C, 220D. In some instances, the wireless communication network system 200 is unaware of the presence of the listening device 250-1. For example, the listening device 250-1 may not go through the above-described authentication or association phase and, as a result, none of the AP 230 or the wireless devices 220A, 220B, 220C, 220D is aware of the existence or presence of the listening device 250-1.

Although the listening device 250-1 is not connected to, associated with, or communicating via the wireless communication network system 200, the listening device 250-1 may be within a listening range of the transmissions occurring within the wireless communication network system 200. As a result, the listening device 250-1 may eavesdrop on over-the-air (OTA) signals (e.g., wireless signals) exchanged among the wireless devices 220A, 220B, 220C, 220D and the AP 230. Such OTA signals may contain beamforming reports, physical (PHY) frames, or a combination thereof. Furthermore, each OTA signal transmitted in the wireless communication network system 200 may be associated with a respective link since, as described above, each OTA signal may include or contain address information (e.g., MAC addresses or another type of unique identifier) of the transmitting and receiving devices. The listening range within which eavesdropping may occur may depend, at least in part, on a frequency band used for the OTA signals or the physical properties of the environment (e.g., the channel 130 in FIG. 1) through with the OTA signals are exchanged. As an example, the listening range for 2.4 GHz Wi-Fi signals may be from about 50 feet to about 100 feet. As a further example, the listening range for sub-GHz (e.g., 900 MHz) signals may be greater than about 1 kilometer.

As discussed above, the OTA signals may contain beamforming reports. Such beamforming reports may be auxiliary information exchanged over-the-air between communicating devices and may be used to optimize performance (e.g., improve data transmission rate or signal-to-noise ratio (SNR)) through the process of beamforming. Information within the beamforming reports may directly or indirectly (e.g., through a transformation) represent a channel response or channel state. For example, in some cases, MIMO systems require measuring and characterizing the propagation between two communicating wireless devices. Such measurement and characterization of the propagation may be used to perform beamforming or beamsteering in order to optimize performance. In the example of FIG. 2A, the AP 230 or one or more of the wireless devices 220A, 220B, 220C, 220D may support MIMO beamforming. Therefore, the AP 230 or one or more of the wireless devices 220A, 220B, 220C, 220D may perform a periodic channel characterization of a communication link between two communicating devices. In some implementations of the periodic channel characterization, a two-way exchange is performed between a source device (e.g., beamformer 110 described in FIG. 1) and a destination device (e.g., beamformee 120 described in FIG. 1). As an example, the AP 230 (e.g., the source device or beamformer 110) may send a sounding request to the wireless device 220B (e.g., the destination device or beamformee 120). The wireless device 220B receives and analyzes the signal, and sends a measurement result (e.g., a channel response) to the AP 230. The measurement result may be sent to the AP 230 in the form of a beamforming report 260 (e.g., feedback matrix 104 in FIG. 1). This process occurs periodically to maintain good beamforming performance between the wireless device 220B and the AP 230. In this example, both parts of the beamforming exchange—the sounding request and the measurement result—occur over-the-air. As a result, the listening device 250-1, which is within listening range of the wireless communication network system 200, may eavesdrop on the beamforming report 260 sent by the wireless device 220B to the AP 230.

As discussed above, each OTA communication by the wireless devices 220A, 220B, 220C, 220D and the AP 230 includes address information (e.g., the MAC addresses) of the transmitting device and the receiving device. Additionally, the address information is not part of an encrypted or scrambled payload. Therefore, when OTA signals are transmitted within the wireless communication network system 200, both the channel response payload (e.g., included in the beamforming report 260) and the address information of the devices involved in the exchange are accessible to the listening device 250-1. Therefore, each beamforming report 260 is associated with a respective link within the wireless communication network system 200 (e.g., a physical path between the wireless device 220B and the AP 230 in the example of FIG. 2A). Consequently, each beamforming report 260 is indicative of the channel response or channel state of a given link within the wireless communication network system 200. Through repeated observations of the beamforming reports 260 exchanged between the wireless device 220B and the AP 230, wireless sensing of the link between the wireless device 220B and the AP 230 may be performed. As an example, changes within the beamforming reports 260 over time may be used to detect motion (e.g., presence, location, or intensity of motion), the presence of an object, or a gesture occurring in the spatial region between the wireless device 220B and the AP 230. In the example described above, the sounding request and measurement result are exchanged between the wireless device 220B and the AP 230; however, in other examples, the sounding request and measurement result are exchanged between any pair of devices selected from the wireless devices 220A, 220B, 220C, 220D and the AP 230 (e.g., the AP 230 and the wireless device 220C shown in FIG. 2A).

As discussed above, the OTA signals may contain a physical (PHY) frame, e.g., transmitted by the AP 230 or one or more of the wireless devices 220A, 220B, 220C, 220D. As an illustration, in the example shown in FIG. 2A, a PHY frame is transmitted over-the-air by the wireless devices 220A and 220D; however, in other examples, the PHY frame may be transmitted by any of the wireless devices 220A, 220B, 220C, 220D and AP 230. In an example (e.g., in an 802.11 transmission), the PHY frame may include a preamble containing training fields 270. The preamble or the training field 270 of the PHY frame may be used to compute the channel response (e.g., in a decoded 802.11 transmission), although other fields or portions of the PHY frame may, additionally or alternatively, be used to compute the channel response. The listening device 250-1, which is within listening range of the wireless communication network system 200, may eavesdrop on the PHY frame. The PHY frame may also include the address information (e.g., MAC address) of the transmitting device. In contrast to the link associated with the beamforming report 260, the link associated with the channel response computed from the PHY frame may correspond to a physical path between the device transmitting the PHY frame and the listening device 250-1. Consequently, while the link associated with the beamforming report 260 may represent an environment contained within the wireless communication network system 200 (e.g., the physical path between the devices involved in the exchange, as indicated by their address information), the link associated with the channel response computed from the PHY frame may represent an environment that at least partially extends outside the wireless communication network system 200 (e.g., the physical path between the device transmitting the PHY frame and the listening device 250-1). Nonetheless, through repeated observations of the PHY frames, wireless sensing of the link between the transmitting device and the listening device 250-1 may be performed. As an example, changes within the channel response over time may be used to detect motion (e.g., presence, location, or intensity of motion), the presence of an object, or a gesture occurring in the spatial region between the transmitting device and the listening device 250-1.

Figure 9:
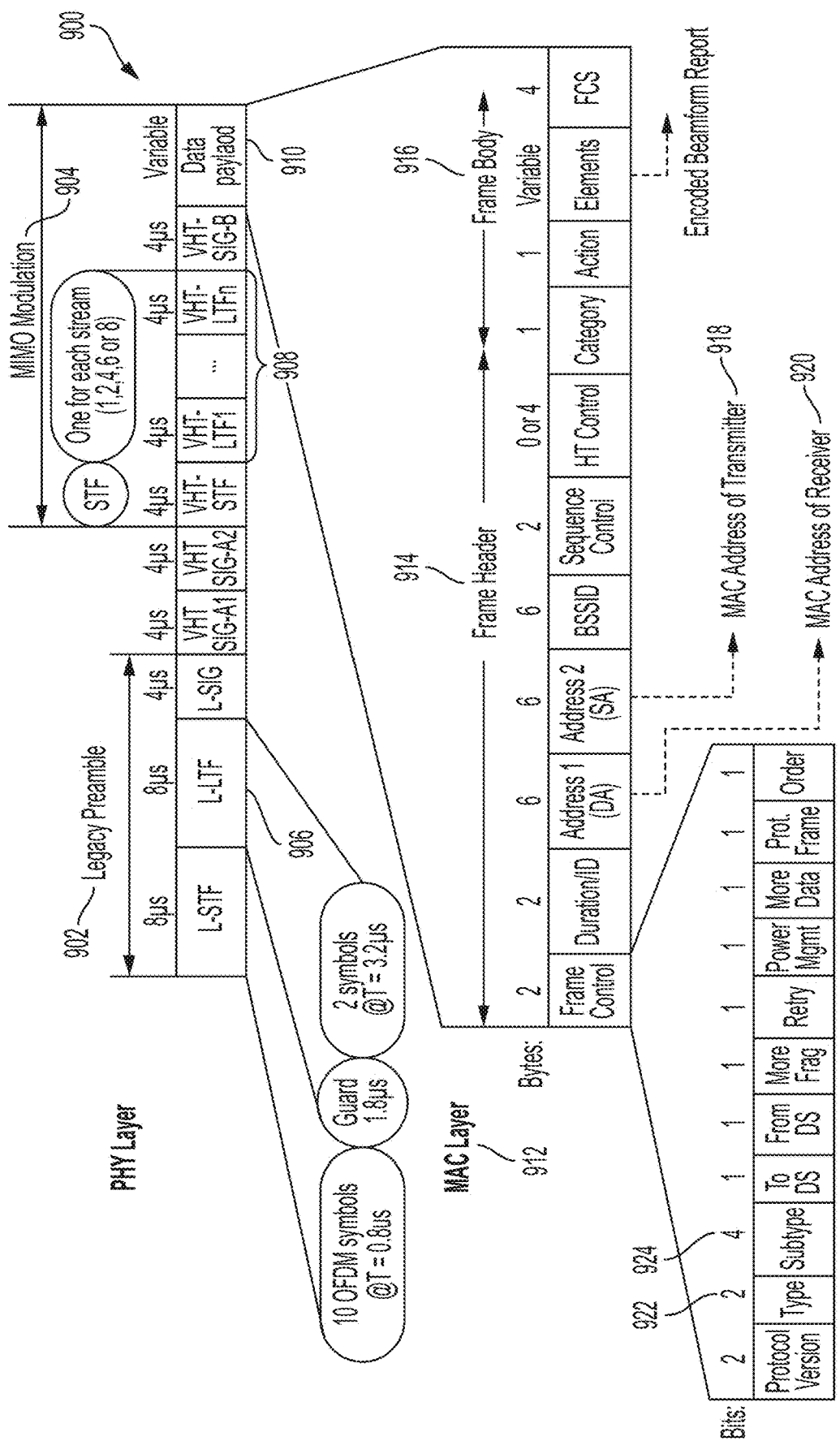
FIG. 9 shows an example of a physical (PHY) frame including a preamble containing training fields.

FIG. 9 shows an example of a PHY frame 900 including a preamble containing training fields. The example PHY frame 900 may be transmitted in an 802.11 communication. In the example of FIG. 9, OTA transmissions of the PHY frame 900 (e.g., on a Wi-Fi network) may begin with a legacy preamble 902 (e.g., lasting 20 microseconds), and may contain MIMO modulated components 904. The legacy preamble 902 may contain a Legacy-Long-Training-Field (L-LTF) 906. The MIMO modulated data may contain one or more VHT-Long-Training-Fields (VHT-LTF1 to VHT-LTFn) 908. The legacy training field 906 or VHT training fields 908 may be used (e.g., by commercially available Wi-Fi transceivers) to compute the channel response.

The PHY frame 900 also includes a PHY data payload 910. Encoded within the PHY data payload 910 is a Media Access Control (MAC) layer frame 912. In the example of FIG. 9, the MAC layer frame 912 illustrates a digitally encoded transmission payload. Each MAC layer frame 912 may include a frame header 914 and a frame body 916. The frame header 914 may indicate information about data encapsulated in the frame body 916. In some examples, the frame header 914 includes the transmitter MAC address 918 and the receiver MAC address 920. In the example of FIG. 9, the frame body 916 is of a Management type and Action-No-Ack subtype (e.g., as illustrated in fields 922 and 924 of the frame header 914). In some examples, the Management type and Action-No-Ack subtype frame is used to carry beamform report payloads.

In some cases, transmission of PHY frames (e.g., by the AP 230 or any of the wireless devices 220A, 220B, 220C, 220D) occurs more frequently than the exchange of beamforming reports 260. Therefore, wireless sensing based on the PHY frames may have a higher temporal resolution compared to wireless sensing based on the beamforming reports 260. In some examples, wireless sensing based on the PHY frames (e.g., containing the preamble or training field 270) may be augmented or combined with wireless sensing based on the beamforming reports 260 (e.g., as described in greater detail below in FIGS. 4 to 7).

Figure 3A:
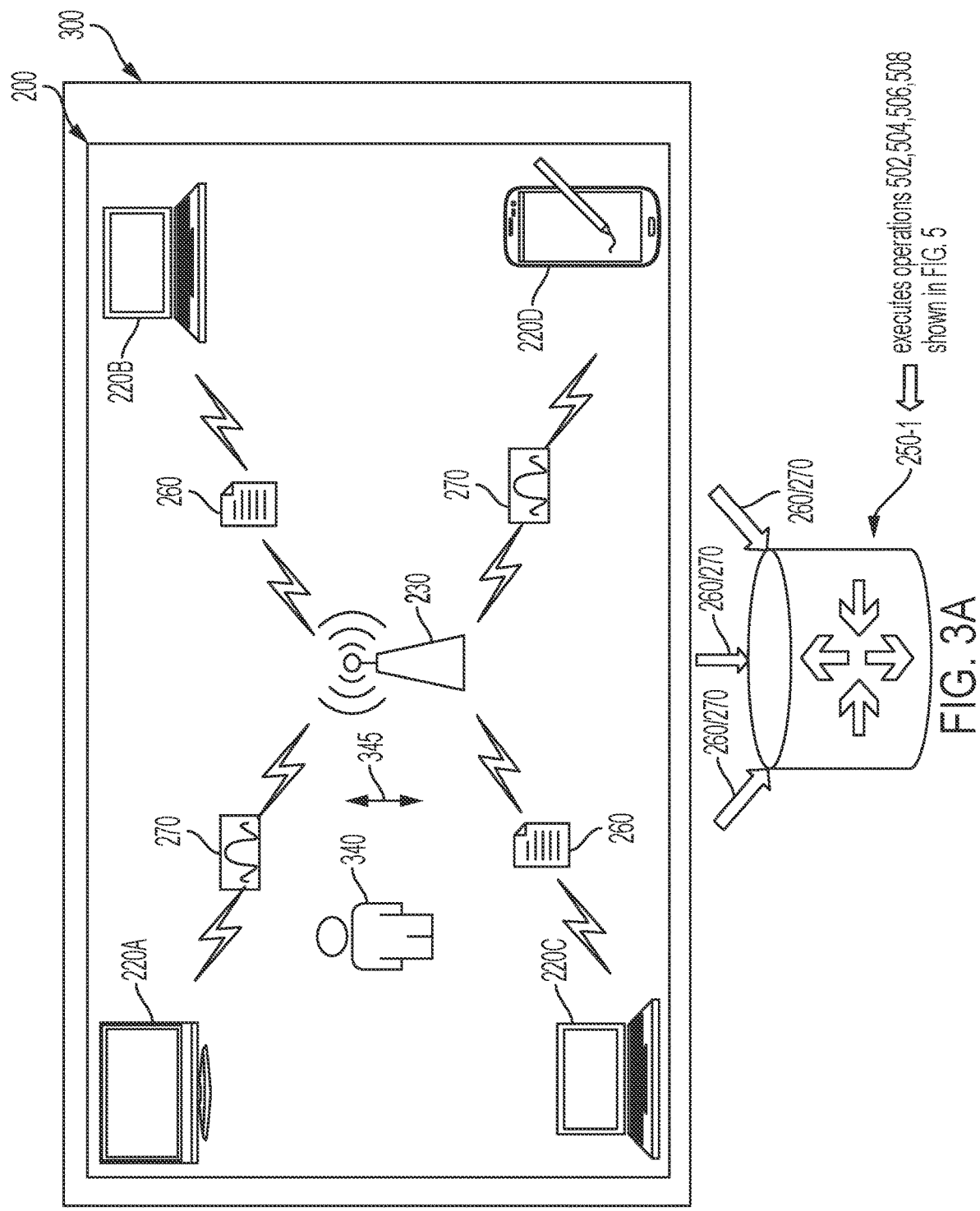

FIG. 3A is a diagram showing an example of an environment 300 including the wireless communication network system 200. The OTA signals communicated on the wireless communication network system 200 are transmitted through a physical space of the environment 300. Hence, such OTA signals can be used for wireless sensing (e.g., motion detection) in the physical space of the environment 300. Although depicted as being a closed area in FIG. 3A, the environment 300 can be an indoor space or an outdoor space, which may include, for example, one or more fully or partially enclosed areas, an open area without enclosure, etc. The space can be or can include an interior of a room, multiple rooms, a building, or the like. As an example, the environment 300 may be a building, e.g., an office building or home, a room in the building, a combination of one or more rooms, or other space within the building, such as a hall or stairwell. The listening device 250-1 may reside remove from (e.g., outside) the environment 300.

As discussed above in FIG. 2A, none of the AP 230 or the wireless devices 220A, 220B, 220C, 220D is aware of the existence or presence of the listening device 250-1. However, the wireless devices 220A, 220B, 220C, 220D and the AP 230 are within listening range of the listening device 250-1. The wireless devices 220A, 220B, 220C, 220D and the AP 230 may produce and exchange OTA signals containing beamforming reports 260 as they communicate among each other within the environment 300. In some implementations, each time the AP 230 or one of the wireless devices 220A, 220B, 220C, 220D transmits information, a PHY frame (e.g., containing the preamble or training field 270) is also transmitted. In some instances, an object 340 may be present within the environment 300. Generally, the object 340 can be any type of static or moveable object and can be living or inanimate. For example, the object 340 can be a human (e.g., as shown in the example of FIG. 3A), an animal, an inorganic object, or another device, apparatus, or assembly, an object that defines all or part of the boundary of a space (e.g., a wall, door, window, etc.), or another type of object.

The object 340 may be moving within the environment 300 (e.g., along a movement path 345 within the environment 300). One or more of the OTA signals transmitted within the environment 300 (e.g., containing the beamforming reports 260 or PHY frames) may be affected by the moving object 340. Unbeknownst to the wireless devices 220A, 220B, 220C, 220D and the AP 230, the listening device 250-1 may eavesdrop on, collect, and organize the OTA signals containing the beamforming reports 260 and the PHY frames.

Figure 4:
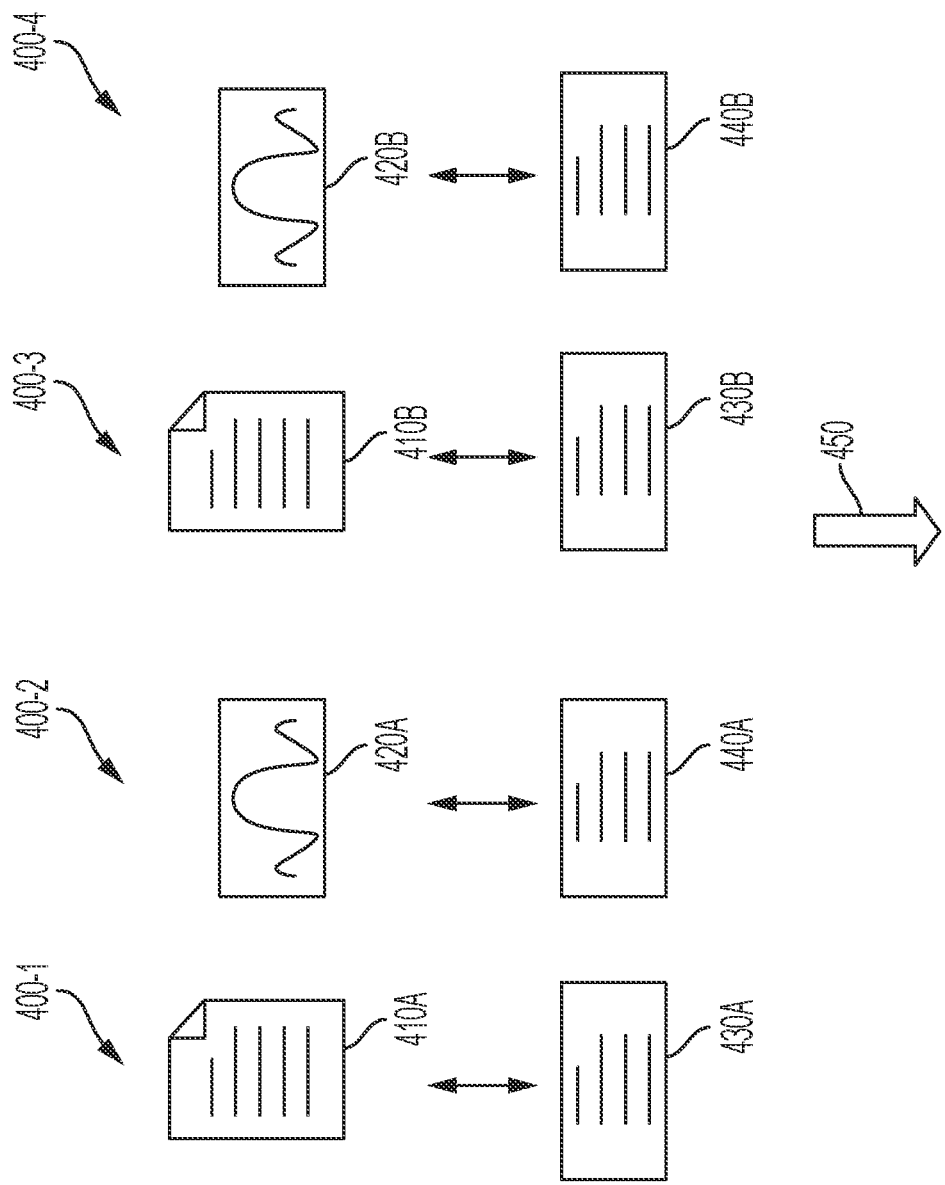
FIG. 4 is a diagram showing received and observed wireless signals that may be used for extracting motion.

FIG. 4 shows an example of OTA signals 400-1 to 400-4 collected and organized by the listening device 250-1. In example of FIG. 4, a first subset of the wireless signals may include the OTA signal 400-1 and the OTA signal 400-3. The OTA signal 400-1 contains a beamforming report 410A and address information 430A associated with the beamforming report 410A, while the OTA signal 400-3 contains a beamforming report 410B and address information 430B associated with the beamforming report 410B. The address information 430A, 430B may include, as an example, source and destination information (e.g., MAC addresses or another type of unique identifier). Therefore, the first subset of wireless signals may include wireless signals containing beamforming reports 410A, 410B, where each of the beamforming reports 410A, 410B is associated with a corresponding wireless link (e.g., a transmitter-receiver pair or source-destination pair as indicated by the address information 430A, 430B). As described above, information within the beamforming reports 410A, 410B may directly or indirectly (e.g., through a transformation) represent a channel response or channel state on their corresponding wireless link.

In some instances, the beamforming reports 410A, 410B may include, or may be, a type of standardized beamforming report, an example being the CSI or H-matrix, V-matrix, or CV-matrix beamforming reports defined in the 802.11 standards, although the beamforming reports 410A, 410B may be other types of dynamic beamforming information. In implementations where the beamforming reports 410A, 410B include, or are, standardized beamforming reports defined in the 802.11 standards, the CSI-matrix, V-matrix, or CV-matrix beamforming reports may be derived from the H-matrix defined in the 802.11 standards, where the H-matrix includes the magnitude and phase response for each subcarrier frequency. In some examples, the CSI-matrix, V-matrix, or CV-matrix beamforming reports may undergo further transformations to better match the needs of the beamforming application.

In the example of FIG. 4, a second subset of the wireless signals may include the OTA signal 400-2 and the OTA signal 400-4. The OTA signal 400-2 contains a PHY frame (e.g., including preamble or training field 420A) and address information 440A associated with the preamble or training field 420A, while the OTA signal 400-4 contains a PHY frame (e.g., including preamble or training field 420B) and address information 440B associated with the preamble or training field 420B. The address information 440A, 440B may include, as an example, source and destination information (e.g., one or more MAC addresses or another type of unique identifier). Therefore, the second subset of wireless signals may include wireless signals containing preamble or training fields 420A, 420B, where each of the preamble or training fields 420A, 420B is associated with a corresponding wireless link (e.g., a transmitter-receiver pair or source-destination pair as indicated by the address information 440A, 440B). After the OTA signals 400-1 to 400-4 are collected and organized by the listening device 250-1, the first and second subsets of the wireless signals undergo a processing step 450, which may be performed by one or more processors. While the example of FIG. 4 illustrates the first subset of wireless signals as having two OTA signals 400-1 and 400-3 and the second subset of wireless signals as having two OTA signals 400-2 and 400-4, in operation, more than two OTA signals may be included in each of the first and second subsets of wireless signals.

Figure 5:
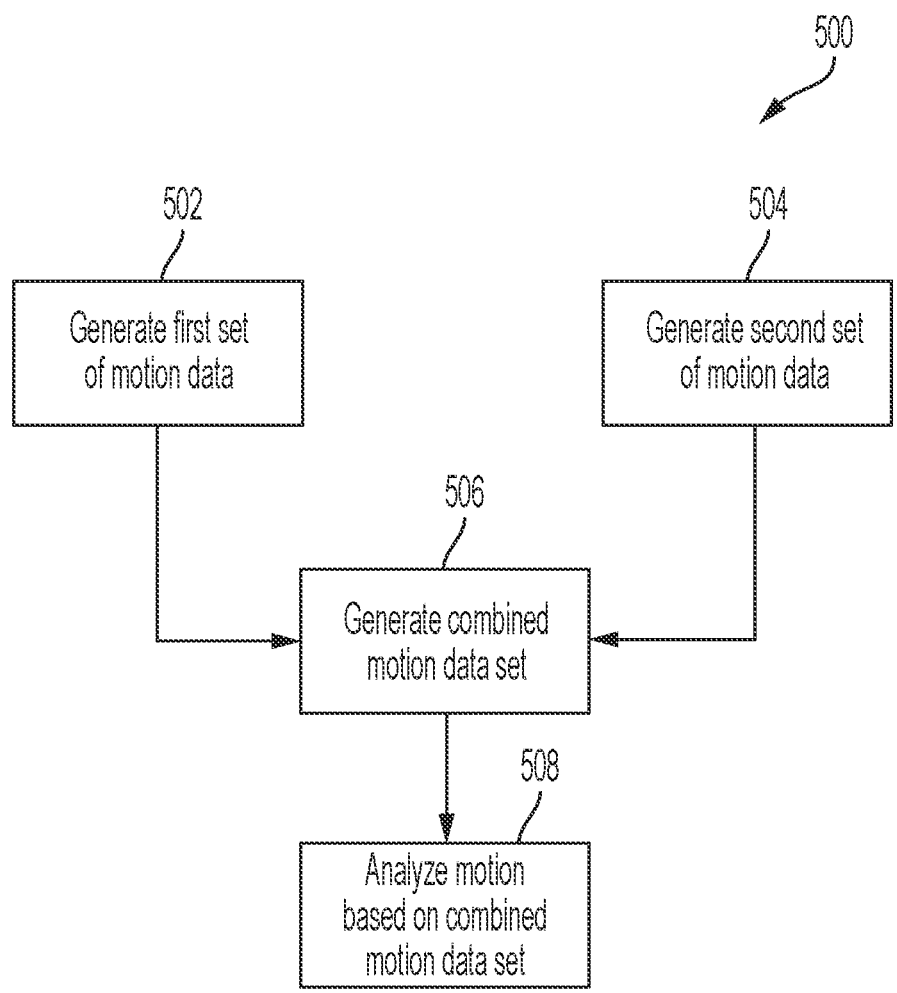
FIG. 5 show an example of a process that may be used to extract motion data from wireless signals.

FIG. 5 shows an example of the operations 500 that may be performed by the one or more processors that execute the processing step 450 shown in FIG. 4. At 502, a first set of motion data is generated (e.g., using a first type of motion detection process) based on the first subset of wireless signals (e.g., the OTA signals 400-1 and 400-3). The first set of motion data may include a first set of motion scores and a first set of link identifiers. In some examples, the first set of motion scores may be generated based on the beamforming reports 410A, 410B since the beamforming reports 410A, 410B may directly or indirectly (e.g., through a transformation) represent a channel response or channel state on their corresponding wireless link. The first set of link identifiers may be generated based on the address information 430A, 430B.

At 504, a second set of motion data is generated (e.g., using a second type of motion detection process) based on the second subset of wireless signals (e.g., the OTA signals 400-2 and 400-4). The second set of motion data may include a second set of motion scores, which may be based on channel responses computed from PHY frames (e.g., including the preamble or training fields 420A, 420B) using, as an example, PHY channel estimation. In some instances, the PHY channel estimation is not defined by a standard and is, instead, left to the manufacturer of the receiver to implement an algorithm to compute the channel response. The second set of motion data may further include a second set of link identifiers, which may be generated based on the address information 440A, 440B. In some examples, the second set of link identifiers may include some or all of links included in the first set of link identifiers.

Example types of motion detection processes that can be used to generate the first and second sets of motion scores include the techniques described in U.S. Pat. No. 9,523,760 entitled "Detecting Motion Based on Repeated Wireless Transmissions," U.S. Pat. No. 9,584,974 entitled "Detecting Motion Based on Reference Signal Transmissions," U.S. Pat. No. 10,051,414 entitled "Detecting Motion Based On Decompositions Of Channel Response Variations," U.S. Pat. No. 10,048,350 entitled "Motion Detection Based on Groupings of Statistical Parameters of Wireless Signals," U.S. Pat. No. 10,108,903 entitled "Motion Detection Based on Machine Learning of Wireless Signal Properties," U.S. Pat. No. 10,109,167 entitled "Motion Localization in a Wireless Mesh Network Based on Motion Indicator Values," U.S. Pat. No. 10,109,168 entitled "Motion Localization Based on Channel Response Characteristics," U.S. Pat. No. 10,459,076 entitled "Motion Detection Based on Beamforming Dynamic Information," and other techniques. As an example, a first type of motion detection process that operates on the beamforming reports 410A, 410B (e.g., as described in U.S. Pat. No. 10,459,076 entitled "Motion Detection Based on Beamforming Dynamic Information") may be used to generate the first set of motion scores, while a second type of motion detection process that operates on the channel responses computed from the preamble or training fields 420A, 420B (e.g., as described in U.S. Pat.

No. 9,584,974 entitled "Detecting Motion Based on Reference Signal Transmissions") may be used to generate the second set of motion scores.

Each of the first and second sets of motion scores may include, or may be, a scalar quantity indicative of a level of signal perturbation in the environment (e.g., the environment 300) accessed by the first and second subsets of wireless signals, respectively. Additionally or alternatively, the first and second sets of motion scores may include, or may be, an indication of whether there is motion, whether there is an object present, or an indication or classification of a gesture performed in the environment accessed by the first and second subsets of wireless signals, respectively.

At 506, the one or more processors may generate a combined motion data set including the first and second sets of motion data. In some implementations, the first set of motion data and the second set of motion data may be input into a logical OR operator to generate the combined motion data set. In some implementations, a weighted sum of the first set of motion data and the second set of motion data may be used to generate the combined motion data set.

At 508, motion within the environment accessed by the first and second subsets of wireless signals is analyzed based on the combined motion data set. In some implementations, analyzing motion within the environment based on the combined motion data set may include determining whether motion occurred within the environment. Additionally or alternatively, analyzing motion within the environment based on the combined motion data set may include determining the location or intensity of motion performed in the environment.

An advantage of generating a combined motion data set including the first and second sets of motion data (e.g., at 506) is that subsequent motion analysis (e.g., at 508) may be based on the combined motion data set, thereby giving a broader or more accurate view of motion occurring within the environment accessed by the first and second subsets of wireless signals compared to cases where only the first set of motion data or the second set of motion data is used to analyze motion. In some examples (such as in the examples shown in FIGS. 2A and 3A), the listening device 250-1 may include the one or more processors. Therefore, in some implementations of the examples shown in FIGS. 2A and 3A, the listening device 250-1 executes the operations 502, 504, 506, and 508 shown in FIG. 5.

Figure 2B:
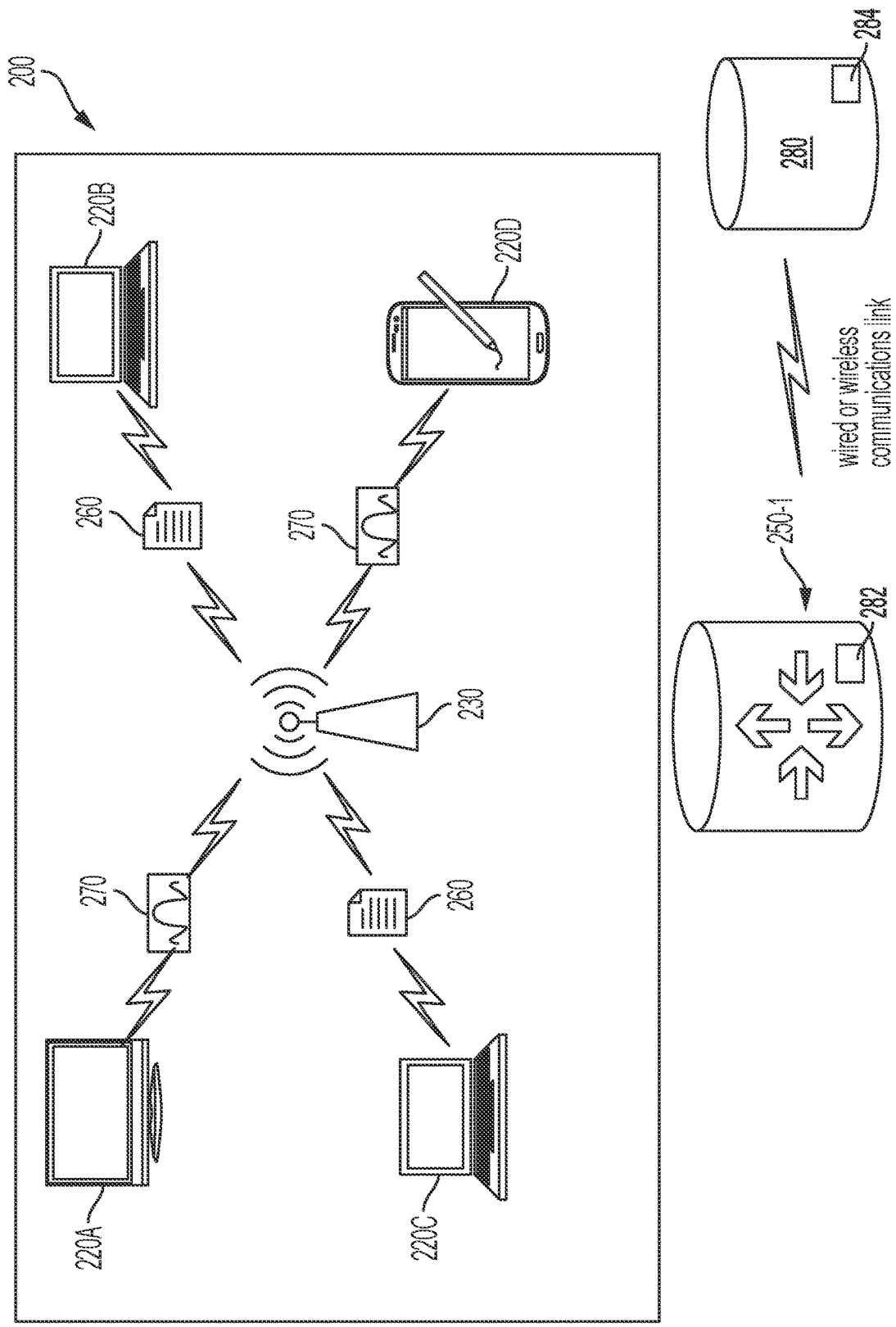

In some examples (such as in the examples shown in FIGS. 2B and 3B), the listening device 250-1 is communicatively coupled (e.g., by a wired or wireless communications link) to a processing device 280 that is also residing outside the environment 300. The processing device 280 is not connected to, associated with, or communicating via the AP 230 or any of the wireless devices 220A, 220B, 220C, 220D. The processing device 280 may be a cloud-based device or a non-cloud-based device. In the examples shown in FIGS. 2B and 3B, the listening device 250-1 may include a first processor 282, while the processing device 280 may include a second processor 284. In some implementations of the examples shown in FIGS. 2B and 3B, the first processor 282 (and consequently the listening device 250-1) may be configured to perform operations 502, 504, and 506, while the second processor 284 (and consequently the processing device 280) may be configured to perform operation 508. In other implementations of the examples shown in FIGS. 2B and 3B, the first processor 282 (and consequently the listening device 250-1) may be configured to perform operations 502 and 504, while the second processor 284 (and consequently the processing device 280) may be configured to perform operations 506 and 508.

Figure 2C:
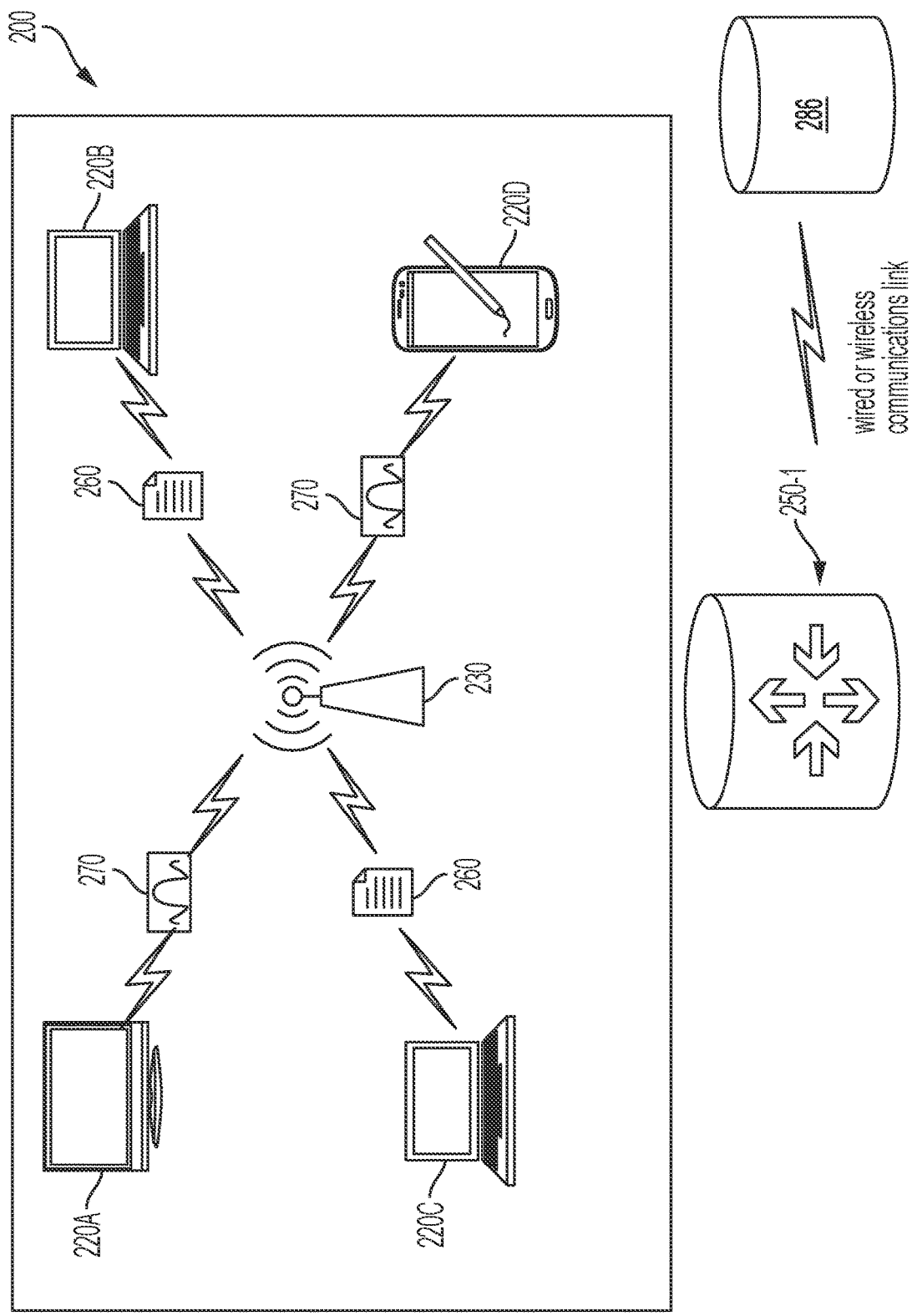
Figure 3C:
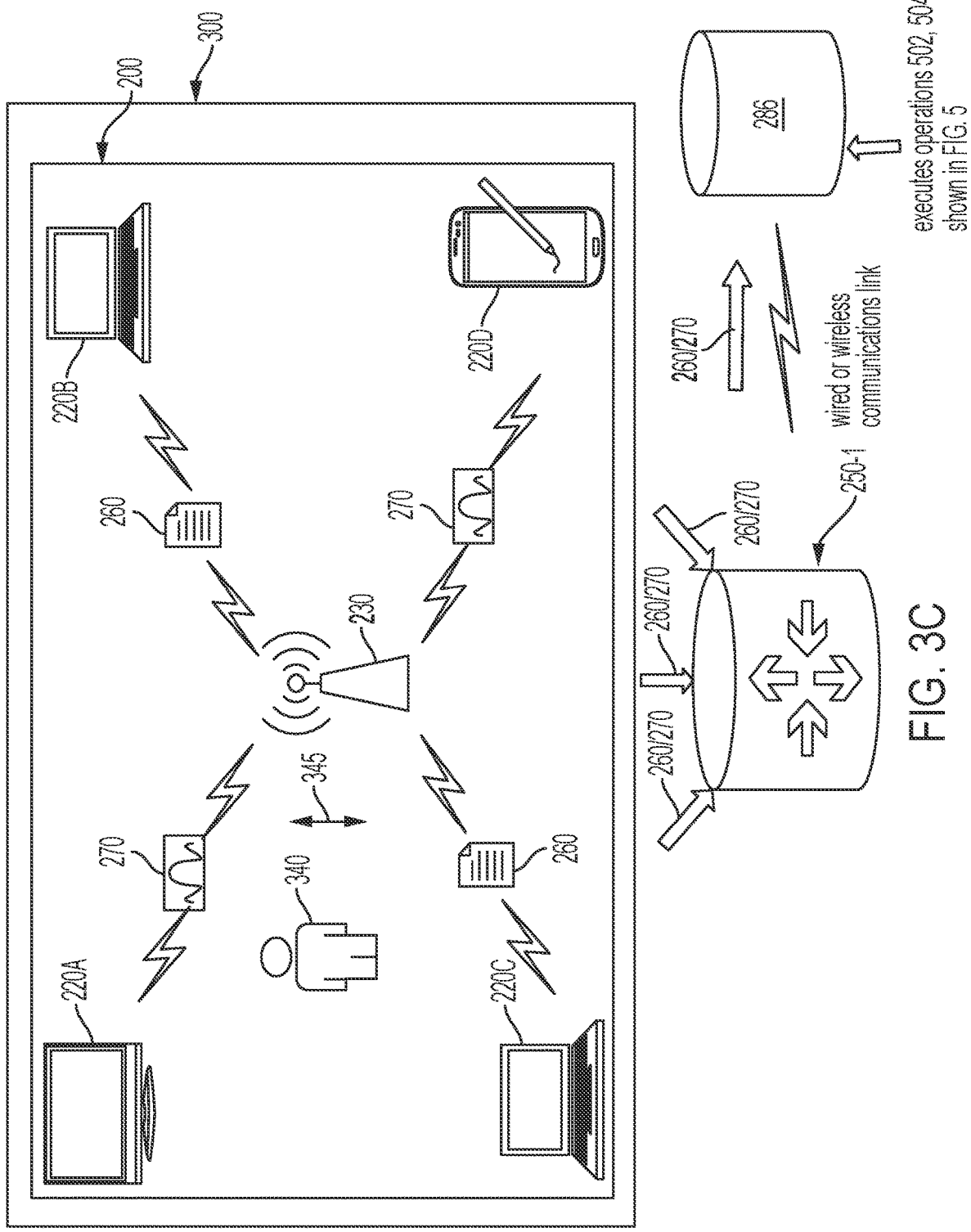

In some examples (such as in the examples shown in FIGS. 2C and 3C), the listening device 250-1 is communicatively coupled (e.g., by a wired or wireless communications link) to a processing device 286 that is also residing outside the environment 300. The processing device 286, which may be a cloud-based device or a non-cloud-based device, is not connected to, associated with, or communicating via the AP 230 or any of the wireless devices 220A, 220B, 220C, 220D. In some implementations of the examples shown FIGS. 2C and 3C, the listening device 250-1 may act as a relay to communicate the beamforming reports (e.g., the beamforming reports 260 in FIGS. 2C and 3C or the beamforming reports 410A, 410B in FIG. 4) and the PHY frames (e.g., containing the preamble or training fields 270 in FIGS. 2C and 3C or the preamble or training fields 420A, 420B in FIG. 4) to the processing device 286. In such implementations, the processing device 286 may be configured to execute the operations 502, 504, 506, and 508 shown in FIG. 5.

Figure 2D:
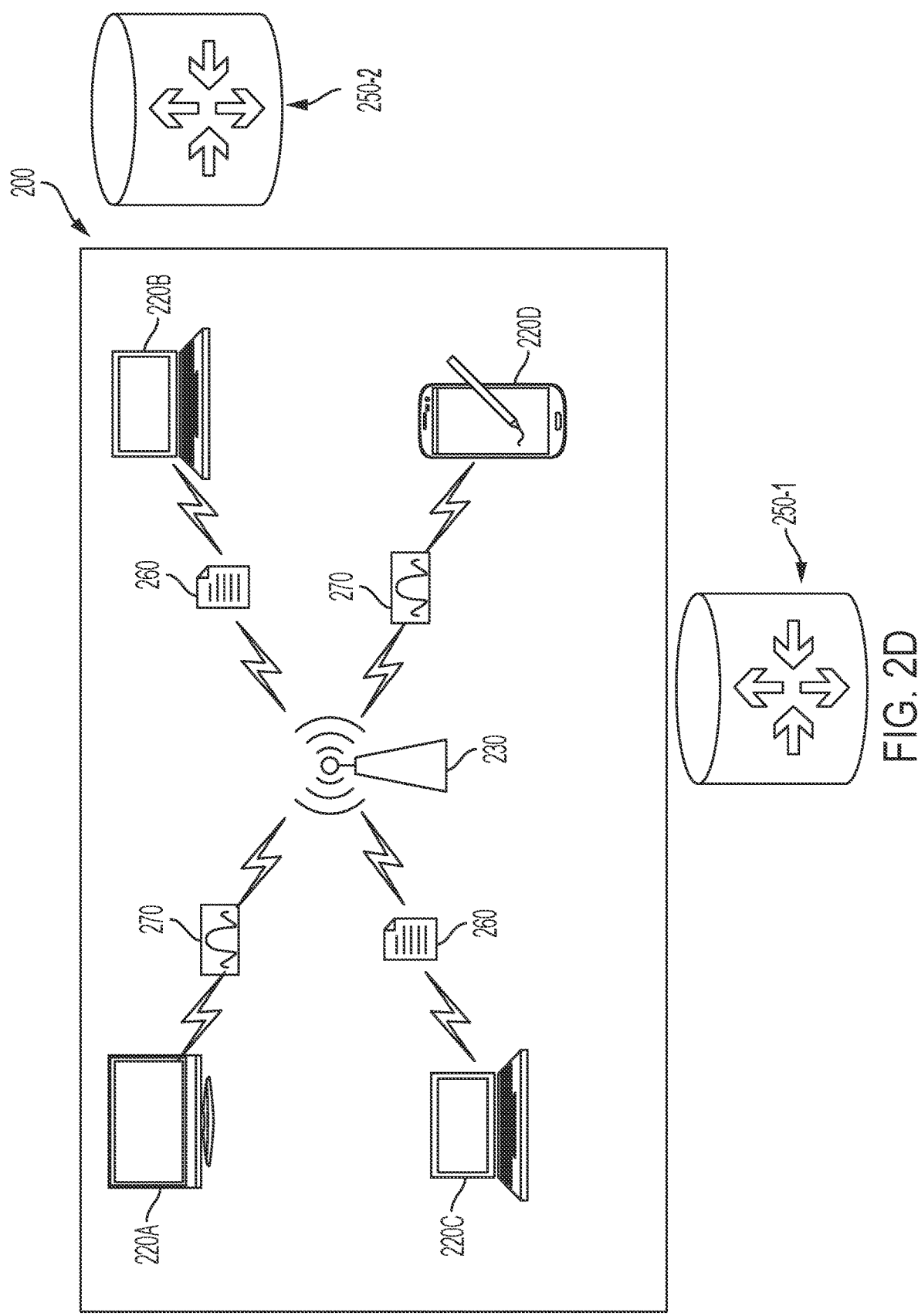
Figure 3D:
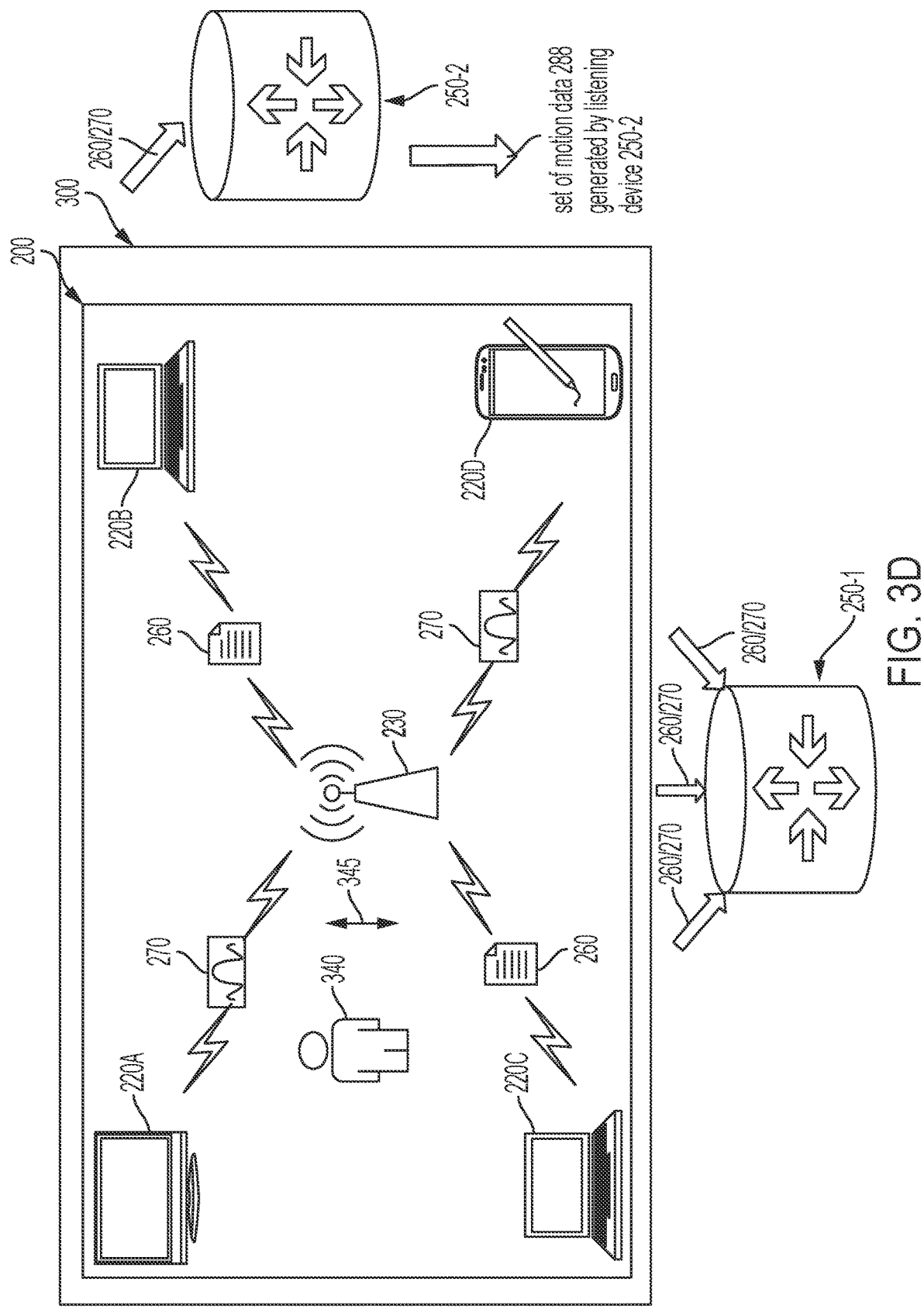

In some examples (such as in the examples shown in FIGS. 2D and 3D), the listening device 250-1 is a first listening device. A second listening device 250-2 resides outside the environment 300 and at a location that is different from the location of the listening device 250-1. Like the listening device 250-1, the second listening device 250-2 is not connected to, associated with, or communicating via the AP 230 or any of the wireless devices 220A, 220B, 220C, 220D. The second listening device 250-2 may also be within a listening range of the wireless communication network system 200 and may eavesdrop on, collect, and organize the OTA signals communicated by devices in the wireless communication network system 200. The OTA signals received by the second listening device 250-2 may contain beamforming reports (e.g., the beamforming reports 260 in FIGS. 2D and 3D or the beamforming reports 410A, 410B in FIG. 4) and PHY frames (e.g., containing the preamble or training fields 270 in FIGS. 2D and 3D or the preamble or training fields 420A, 420B in FIG. 4). The second listening device 250-2 may be configured to generate its own set of motion data 288 including a set of motion scores and a set of link identifiers based on the OTA signals received by the second listening device 250-2. An advantage of having a plurality of listening devices 250-1, 250-2 is that analysis of motion within the environment 300 is based on a combined motion data set that includes the above-described first and second sets of motion data as well as the set of motion data 288 generated by the second listening device 250-2, which in turn leads to a more accurate analysis of motion occurring within the environment 300. The second listening device 250-2 may be configured to transmit its own set of motion data 288 to the listening device 250-1. In some implementations of the examples shown in FIGS. 2D and 3D, the listening device 250-1 generates the combined motion data set (that includes the first and second sets of motion data generated by the listening device 250-1 and the set of motion data 288 generated by the second listening device 250-2) and analyzes motion within the environment 300 based on the combined motion data set.

Figure 2E:
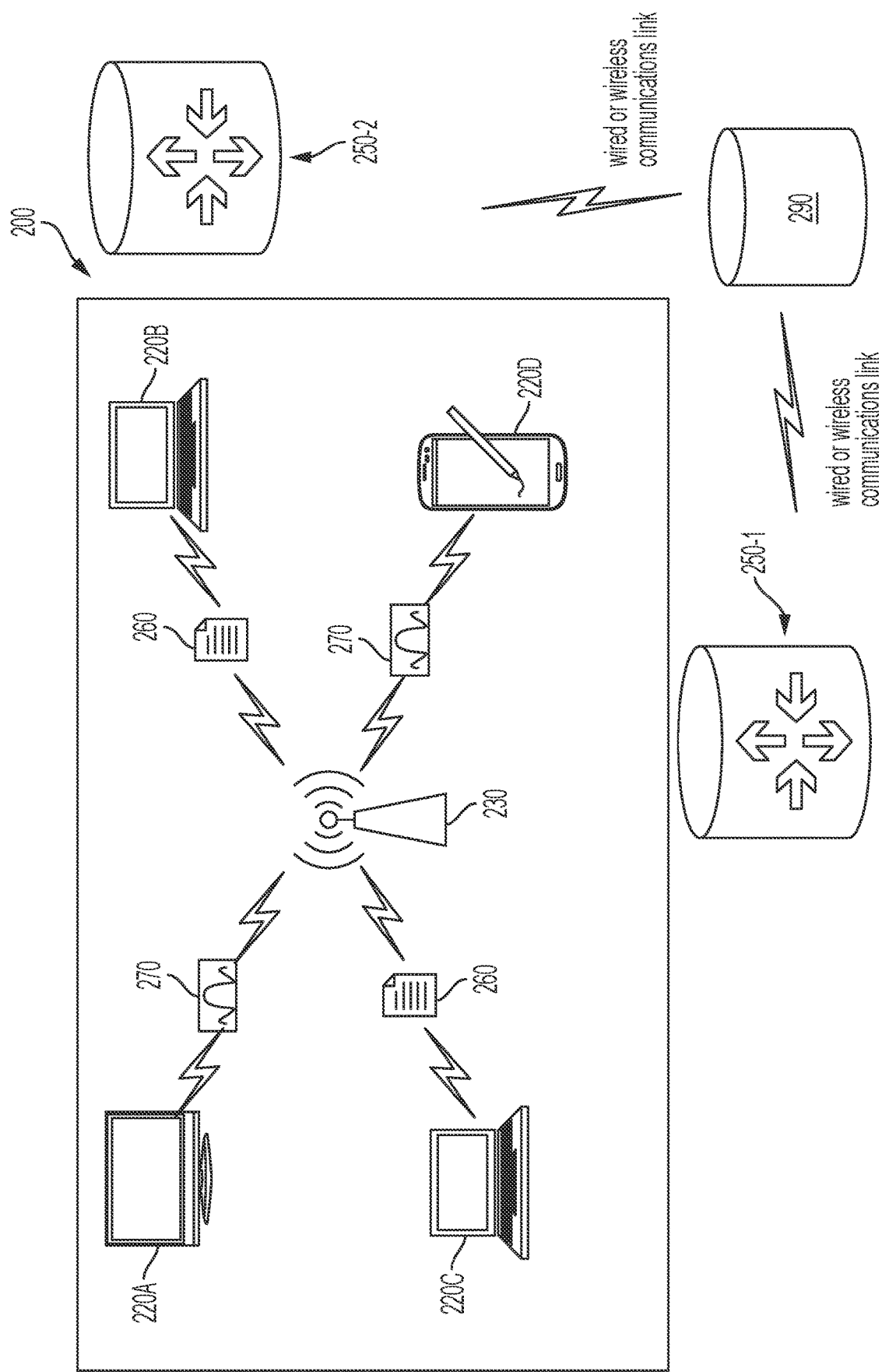
Figure 3E:
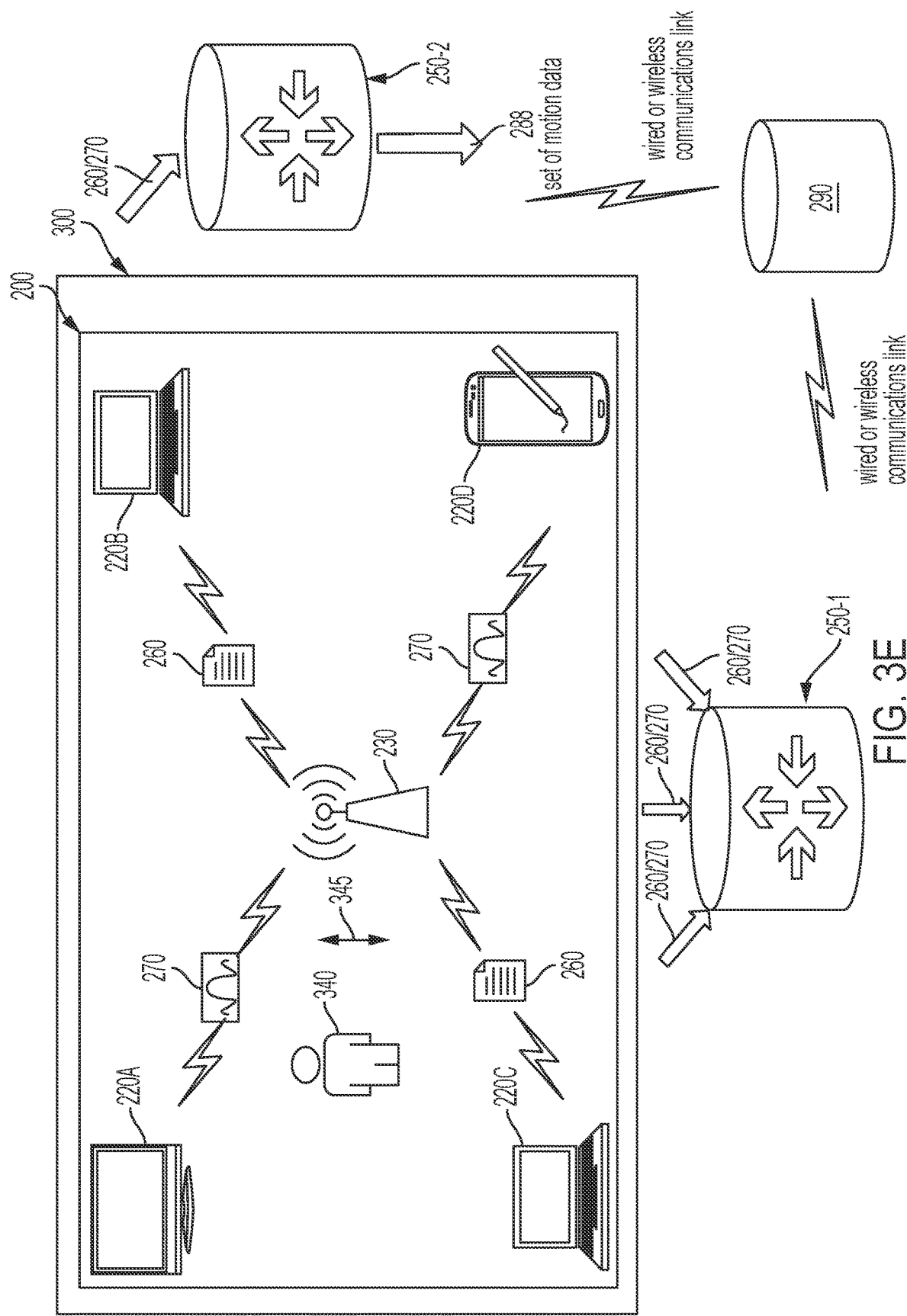

In some examples (such as in the examples shown in FIGS. 2E and 3E), the listening device 250-1 is communicatively coupled (e.g., by a wired or wireless communications link) to a processing device 290 that is also residing outside the environment 300. The processing device 290, which may be a cloud-based device or a non-cloud-based device, is not connected to, associated with, or communicating via the AP 230 or any of the wireless devices 220A, 220B, 220C, 220D. In some implementations of the examples shown in FIGS. 2E and 3E, the listening device 250-1 generates the combined motion data set (that includes the first and second sets of motion data generated by the listening device 250-1 and the set of motion data 288 generated by the second listening device 250-2). The listening device 250-1 subsequently transmits the combined motion data set to the processing device 290, which may be configured to analyze motion within the environment 300 based on the combined motion data set.

While the examples shown in FIGS. 2A to 2E and 3A to 3E illustrate the AP 230 as being included in the wireless communication network system 200, some implementations of the wireless communication network system 200 may be devoid of the AP 230. In such instances, the wireless devices 220A, 220B, 220C, 220D may communicate within the wireless communication network system 200 using an ad-hoc peer-to-peer wireless network that exchanges beamforming reports 260 and PHY frames (e.g., including preambles containing training fields 270). Consequently, the above-described operations apply analogously and equally to instances where the wireless network that connects the wireless devices 220A, 220B, 220C, 220D includes or is an ad-hoc peer-to-peer wireless network.

Figure 6:
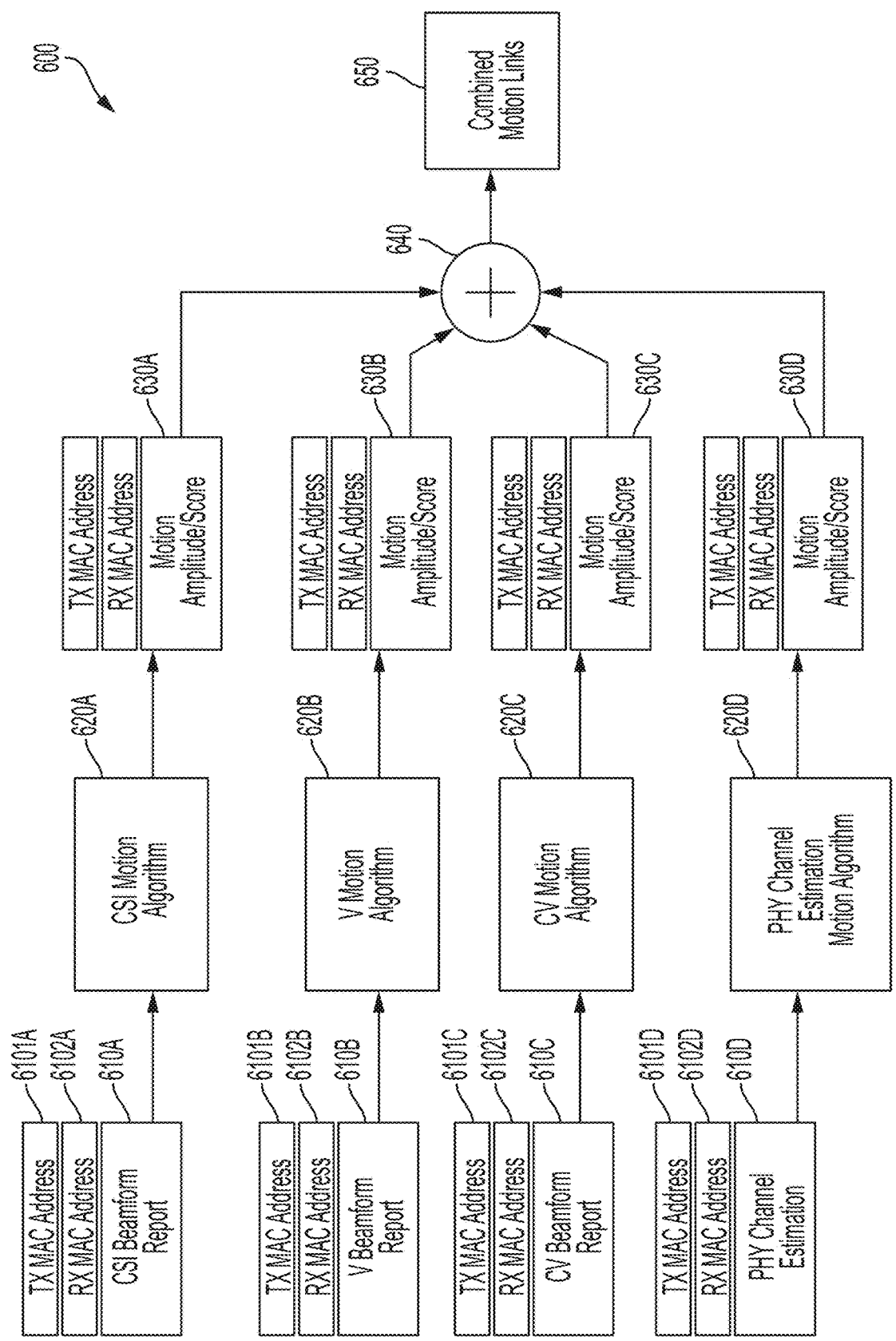
FIG. 6 is a diagram showing a flowchart for detecting motion in a remote environment by a listening device.

FIG. 6 is a diagram showing an example 600 of processing of wireless information to extract motion data at the listening device 250-1. The example 600 of FIG. 6 may also be applicable to implementations where wireless information is processed at the above-described processing device 280, 286, or 290, as the case may be, to extract motion data. In example 600, the listening device 250-1 may observe one of several types of transmissions. In one instance, any one of beamforming reports 610A, 610B, 610C transmitted between any two devices in the environment 300 (e.g., any pair selected from the AP 230 and the wireless devices 220A, 220B, 220C, 220D) may be observed by the listening device 250-1. Beamforming reports 610A, 610B, 610C may have different formats, e.g., CSI or H-matrix 610A, V-matrix 610B, or CV-matrix 610C, as described above. A wireless link may be identified by a transmitting MAC Address and a receiving MAC Address pair associated with a particular wireless signal. As described above, in some instances, when a beamforming report is transmitted, the channel response payload as well as the MAC address of the two parties involved in the exchange may be accessible to the listening device 250-1. Thus, each wireless link may be identified based on the MAC addresses and, each wireless link can represent the physical path between the two identified devices.

In some instances, the listening device 250-1 may identify the wireless link between two distinct devices by analyzing the source and destination information in the wireless signal. In some instances, the listening device 250-1 may identify a wireless link based on the MAC address of the transmitting device (e.g., TX MAC Address 6101A) and the MAC address of the receiving device (e.g., RX MAC address 6102A) in the wireless signal including the CSI Beamform Report 610A. In some implementations, each beamforming report is fed to its corresponding motion algorithm. For example, a CSI-Beamform Report 610A is processed by a CSI-Motion Algorithm 620A, a V-Beamform Report 610B is processed by a V-Motion Algorithm 620B, and a CV-Beamform Report 610C is processed by a CV-Motion Algorithm 620C. In some cases, each of the motion algorithms output data related to motion affecting the wireless signals transmitted between two devices. Because the listening device 250-1 can associate beamforming reports 610A, 610B, 610C with wireless links associated with the wireless communication network system 200 contained in the environment 300, the motion data for the wireless links is constrained to that particular environment 300.

In other instances, the listening device 250-1 may observe transmissions of PHY frames (e.g., including preambles or training fields) by one or more wireless devices. Similar to the beamforming report transmissions, the listening device 250-1 may obtain the MAC address of the transmitter of the PHY frame, and then identify the wireless link represented by the physical path between the transmitter device and the listening device 250-1 (e.g., device to sensor). The listening device 250-1 performs channel estimation 610D using the PHY frame (e.g., using the preambles or training fields of the PHY frame). In this case, the channel estimation is associated with the channel quality of the link between the transmitting device and the listening device 250-1 and not the link between the transmitting device and the receiving device for which the wireless signal was addressed. Typically, the listening device 250-1 is interested in wireless signals transmitted in and through the environment 300. Therefore, in some instances, the listening device 250-1 analyzes the signal to determine if the wireless signal is associated with a wireless link between two wireless devices in the environment 300. For example, using the TX MAC Address 6101D and RX MAC Address 6102D of the wireless signal, the listening device 250-1 may determine whether the wireless signal including the PHY frame was transmitted on a wireless link corresponding to a wireless link in the environment 300. As another example, based on received signal strength/power and wireless link identification (e.g., transmitter+receiver MAC address), the physical distance to the listening device 250-1 can be estimated. This may enhance the ability to exclude devices that reside outside a desired environment 300 but that are still within listening range of the listening device 250-1. The received signal strength/power can be, for example, a Signal-To-Noise-Ratio (SNR) (e.g., represented in dB as the ratio between signal-power to noise-power) computed by the listening device 250-1, a Receive-Signal-Strength-Indicator (RSSI) (a measure of signal power received) computed by the listening device 250-1, or another type of value.

In cases in which the wireless signal is associated with a wireless link in the environment 300, the listening device performs channel estimation processing on the PHY frame training field. In cases in which the wireless signal is not associated with a link in the remote environment 300, the listening device 350 may ignore the wireless signal and perform no further processing. In some implementations, each PHY channel estimation is fed to its corresponding motion algorithm, e.g., PHY Channel Estimation Motion Algorithm 620D, to extract motion information.

In some implementations, one or more received and observed data 610A, 610B, 610C, 610D, are obtained by the listening device 250-1 over a time period. In some cases, multiple instances of the same type of beamforming report or multiple PHY signals may be observed or received. In other cases, no instances of one or more types of beamforming reports may be received. However, in most cases, it is expected that at least one PHY signal associated with a link in the environment 300 is received by the listening device 250-1 as these signals are typically transmitted more frequently than beamforming reports. In some implementations, the listening device accumulates beamform reports 610A, 610B, 610C that are observed, and PHY frames (e.g., including preambles or training fields) received over a period of time.

In some implementations, the output of a motion algorithm 620A, 620B, 620C, 620D is fed to a corresponding process that converts motion data extracted by a respective motion algorithm to a relative motion amplitude or score 630A, 630B, 630C, 630D. While the motion algorithms 620A, 620B, 620C, 620D may have some similarities between them, they are managed separately. In some instances, the motion amplitudes or scores 630A, 630B, 630C, 630D for each type of motion data provide the data in a common format for all types of received or observed data in the environment 300. In some instances, motion amplitudes or scores 630A, 630B, 630C, 630D are determined for each wireless link, e.g., a particular TX MAC Address/RX MAC Address pair. The motion amplitude/scores for each wireless link are combined (e.g., summed 640) to derive a combined motion links value 650 associated with the wireless links.

In some cases, the motion amplitude score may be or include a motion indicator value. In an example, if motion is detected based on the received or observed data 610A, 610B, 610C, 610D after being processed by its corresponding motion algorithm 620A, 620B, 620C, 620D, then a motion indicator value (MIV) may be computed by the listening device 250-1. The MIV represents a degree of motion detected by the device based on the beamform reports 610A, 610B, 610C, or preamble or training fields 610D received by the listening device 250-1. For instance, higher MIVs can indicate a high level of channel perturbation (due to the motion detected), while lower MIVs can indicate lower levels of channel perturbation. Higher levels of channel perturbation may indicate motion in close proximity to the device. The MIVs may include aggregate MIVs (representing a degree of motion detected in the aggregate by the listening device 250-1 based on PHY training fields), link MIVs (representing a degree of motion detected on particular communication links between respective devices in the environment 300), or a combination thereof. In some implementations, MIVs are normalized, e.g., to a value from zero (0) to one hundred (100).

Figure 7:
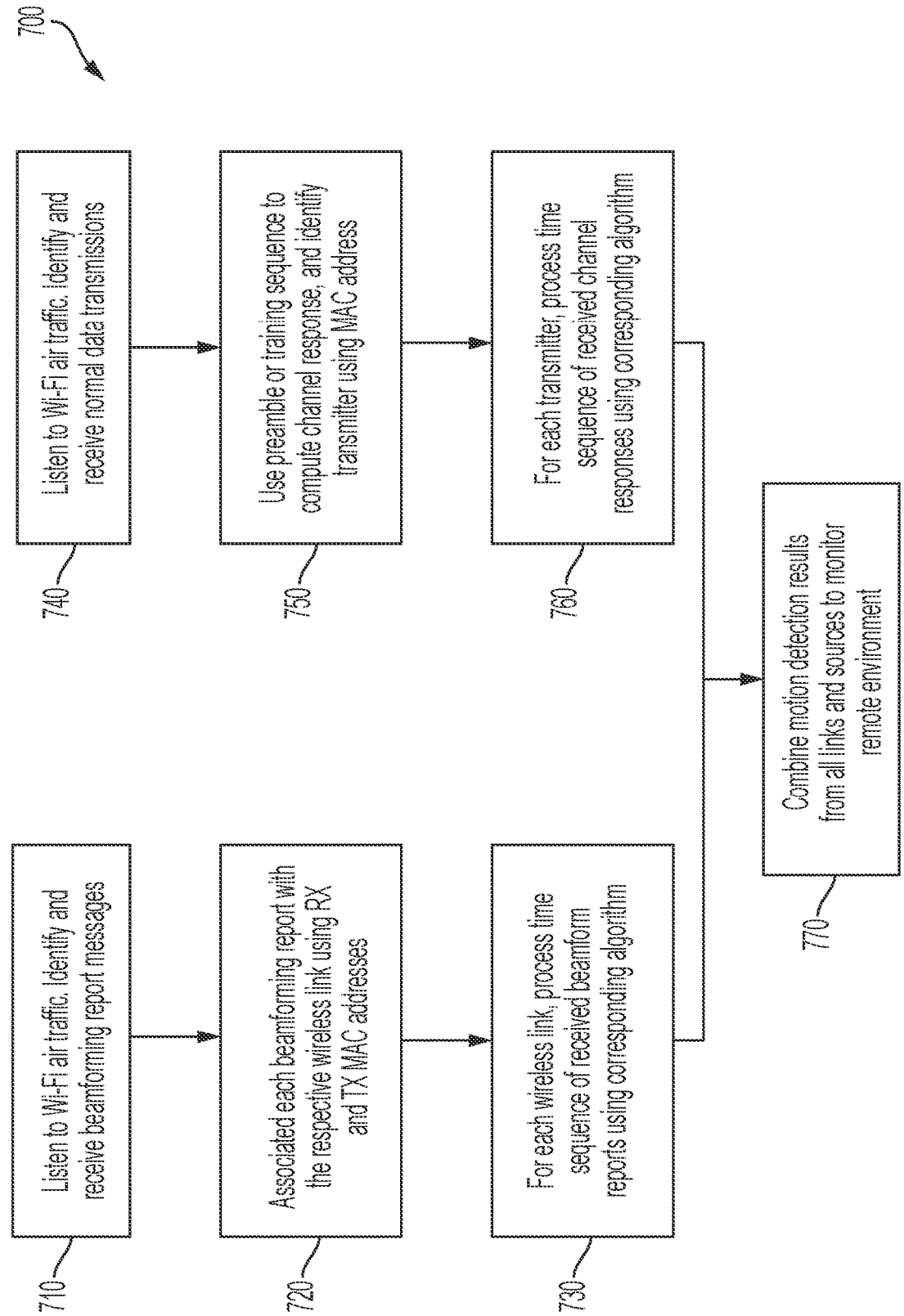
FIG. 7 show an example of a process that may be used to extract motion data from wireless signals.

FIG. 7 is a diagram showing a flowchart showing an example process 700 for detecting motion in a remote environment by a listening device or another type of sensor device. For example, the process 700 may be performed by the listening device 250-1, the processing device 280, 286, or 290, or by another type of sensor device. In some cases, one or more of the operations shown in FIG. 7 are implemented as processes that include multiple operations, sub-processes or other types of routines. In some cases, operations can be combined, performed in another order, performed in parallel, iterated, or otherwise repeated or performed another manner.

At 710, the sensor device eavesdrops or listens to Wi-Fi air traffic and identifies and receives beamforming reports. At 720, the sensor device associates each beamforming report with a respective wireless link using the receiver and transmitter MAC addresses (e.g., as discussed above in reference to FIG. 6). At 730, for each wireless link, a time field of received beamforming reports is processed using a suitable motion detection process (e.g., an algorithm corresponding to detecting motion based on beamforming reports). The result of 730 is a first set of motion data. At 740, the sensor device eavesdrops or listens to Wi-Fi air traffic and identifies and receives normal data transmissions (e.g., including PHY frames). At 750, the sensor device uses preambles or training fields to compute channel responses and identifies a transmitter using a MAC address, thereby associating each channel response with a respective transmitter. At 760, for each transmitter, a time field of received channel responses is processed using a suitable motion detection process (e.g., an algorithm corresponding to detecting motion based on normal data transmissions including PHY frames). The result of 760 is a second set of motion data. At 770, the motion detection results from all links and sources are combined to analyze or monitor motion in a remote environment (e.g., environment 300 that is remote from the listening device 250-1 or the processing devices 280, 286, and 290).

Figure 8:
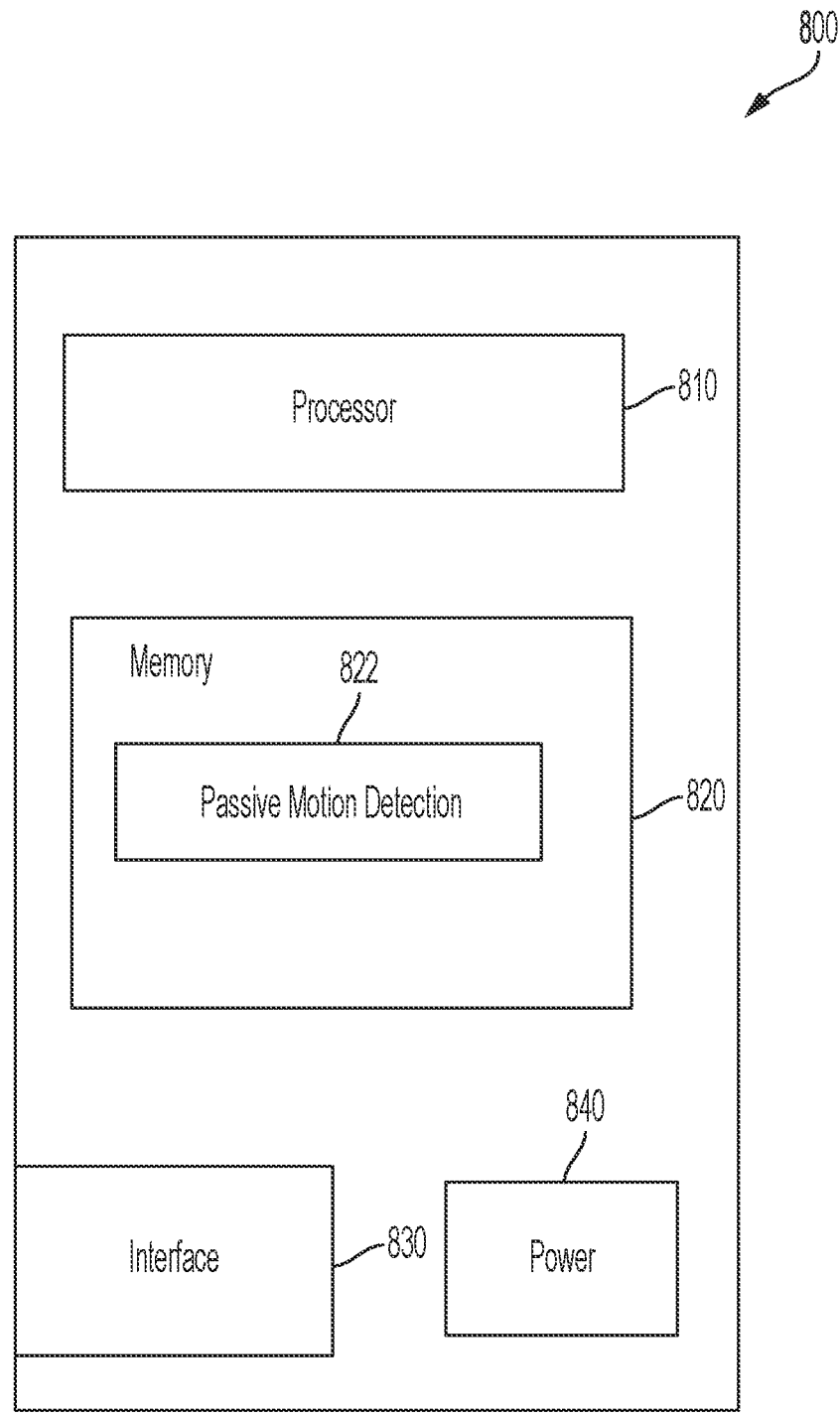
FIG. 8 is a block diagram showing an example sensor device.

FIG. 8 is a block diagram showing an example wireless sensor device 800. In some implementations, the wireless sensor device 800 may be configured as the listening device 250-1 described above. As shown in FIG. 8, the example wireless sensor device 800 includes an interface 830, a processor 810, a memory 820, and a power unit 840. In some implementations, the interface 830, processor 810, memory 820, and power unit 840 of the sensor device 800 are housed together in a common housing or other assembly. In some implementations, one or more of the components of a wireless communication device can be housed separately, for example, in a separate housing or other assembly.

The example interface 830 can communicate (receive, transmit, or both) wireless signals. For example, the interface 830 may be configured to receive radio frequency (RF) signals formatted according to a wireless communication standard (e.g., Wi-Fi or Bluetooth), e.g., wireless signals transmitted by wireless devices in a remote environment, or other wireless devices within listening range of the wireless sensor device. In some cases, the interface 830 may be configured to transmit signals, e.g., to transfer data to a server or other device, but in instances where the wireless sensor device is passive or operates in a passive mode, it does not communicate with the remote environment (e.g., as described in FIGS. 2A to 2E and 3A to 3E). In some cases, the example interface 830 may be implemented as a modem. In some implementations, the example interface 830 includes a radio subsystem and a baseband subsystem. In some cases, the baseband subsystem and radio subsystem can be implemented on a common chip or chipset, or they may be implemented in a card or another type of assembled device. The baseband subsystem can be coupled to the radio subsystem, for example, by leads, pins, wires, or other types of connections.

In some cases, a radio subsystem in the interface 830 can include one or more antennas and radio frequency circuitry. The radio frequency circuitry can include, for example, circuitry that filters, amplifies or otherwise conditions analog signals, circuitry that up-converts baseband signals to RF signals, circuitry that down-converts RF signals to baseband signals, etc. Such circuitry may include, for example, filters, amplifiers, mixers, a local oscillator, etc. The radio subsystem can be configured to receive radio frequency wireless signals on the wireless communication channels. As an example, the radio subsystem may include a radio chip, an RF front end, and one or more antennas. A radio subsystem may include additional or different components. In some implementations, the radio subsystem can be or include the radio electronics (e.g., RF front end, radio chip, or analogous components) from a conventional modem, for example, from a Wi-Fi modem, pico base station modem, etc. In some implementations, the antenna includes multiple antennas.

In some cases, a baseband subsystem in the interface 830 can include, for example, digital electronics configured to process digital baseband data. As an example, the baseband subsystem may include a baseband chip. A baseband subsystem may include additional or different components. In some cases, the baseband subsystem may include a digital signal processor (DSP) device or another type of processor device. In some cases, the baseband system includes digital processing logic to operate the radio subsystem, to communicate wireless network traffic through the radio subsystem, to extract channel response information from PHY frame preamble training signals, or to perform other types of processes. For instance, the baseband subsystem may include one or more chips, chipsets, or other types of devices that are configured to encode signals and deliver the encoded signals to the radio subsystem for transmission, or to identify and analyze data encoded in signals from the radio subsystem (e.g., by decoding the signals according to a wireless communication standard, by processing the signals according to a motion detection process, or otherwise).

In some instances, the radio subsystem in the example interface 830 receives baseband signals from the baseband subsystem, up-converts the baseband signals to radio frequency (RF) signals, and wirelessly transmits the radio frequency signals (e.g., through an antenna). In some instances, the radio subsystem in the example interface 830 wirelessly receives radio frequency signals (e.g., through an antenna), down-converts the radio frequency signals to baseband signals, and sends the baseband signals to the baseband subsystem. The signals exchanged between the radio subsystem and the baseband subsystem may be digital or analog signals. In some examples, the baseband subsystem includes conversion circuitry (e.g., a digital-to-analog converter, an analog-to-digital converter) and exchanges analog signals with the radio subsystem. In some examples, the radio subsystem includes conversion circuitry (e.g., a digital-to-analog converter, an analog-to-digital converter) and exchanges digital signals with the baseband subsystem.

The example processor 810 can execute instructions, for example, to generate output data based on data inputs. The instructions can include programs, codes, scripts, modules, or other types of data stored in memory 820. Additionally or alternatively, the instructions can be encoded as pre-programmed or re-programmable logic circuits, logic gates, or other types of hardware or firmware components or modules. The processor 810 may be or include a general-purpose microprocessor, as a specialized co-processor or another type of data processing apparatus. In some cases, the processor 810 performs high level operation of the wireless sensor device 800. For example, the processor 810 may be configured to execute or interpret software, scripts, programs, modules, functions, executables, or other instructions stored in the memory 820. In some implementations, the processor 810 be included in the interface 830. In some instances, processor 810 may be configured to execute instructions that cause the wireless sensor device 800 to detect motion in a remote environment, e.g., by the process described in FIG. 7.

The example memory 820 may include computer-readable storage media, for example, a volatile memory device, a non-volatile memory device, or both. The memory 820 may include one or more read-only memory devices, random-access memory devices, buffer memory devices, or a combination of these and other types of memory devices. In some instances, one or more components of the memory can be integrated or otherwise associated with another component of the wireless communication device 800. The memory 820 may store instructions that are executable by the processor 810. For example, the instructions may be stored in passive motion detection 822 module in memory 820. The instructions may include instructions for obtaining first channel response information including signals transmitted wirelessly on a communication network in a remote environment, each signal including a beamforming report, and associating each beamforming report with a respective wireless link in the remote environment, each wireless link corresponding to a transmitting wireless communication device and a receiving wireless communication device pair. The instructions may further include instructions for receiving one or more physical (PHY) frame preamble training fields transmitted by wireless communication devices in a listening range of the sensor device, extracting second channel response information from each of the one or more PHY frame preamble training fields, and associating the second channel response information from each of the one or more PHY frame preamble training fields to its respective wireless communication link. The instructions may further include instructions for combining the first channel response information and the second channel response information for each wireless link in the remote environment, and detecting motion of an object in the remote environment by analyzing the combination of the first and second channel response information for each wireless link in the remote environment, such as through one or more of the operations as described in FIGS. 3A to 3E, 4, 5,6 or in the example process 700 shown in FIG. 7.

The example power unit 840 provides power to the other components of the wireless communication device 800. For example, the other components may operate based on electrical power provided by the power unit 840 through a voltage bus or other connection. In some implementations, the power unit 840 includes a battery or a battery system, for example, a rechargeable battery. In some implementations, the power unit 840 includes an adapter (e.g., an AC adapter) that receives an external power signal (from an external source) and coverts the external power signal to an internal power signal conditioned for a component of the sensor device 800. The power unit 840 may include other components or operate in another manner.

Figure 10A:
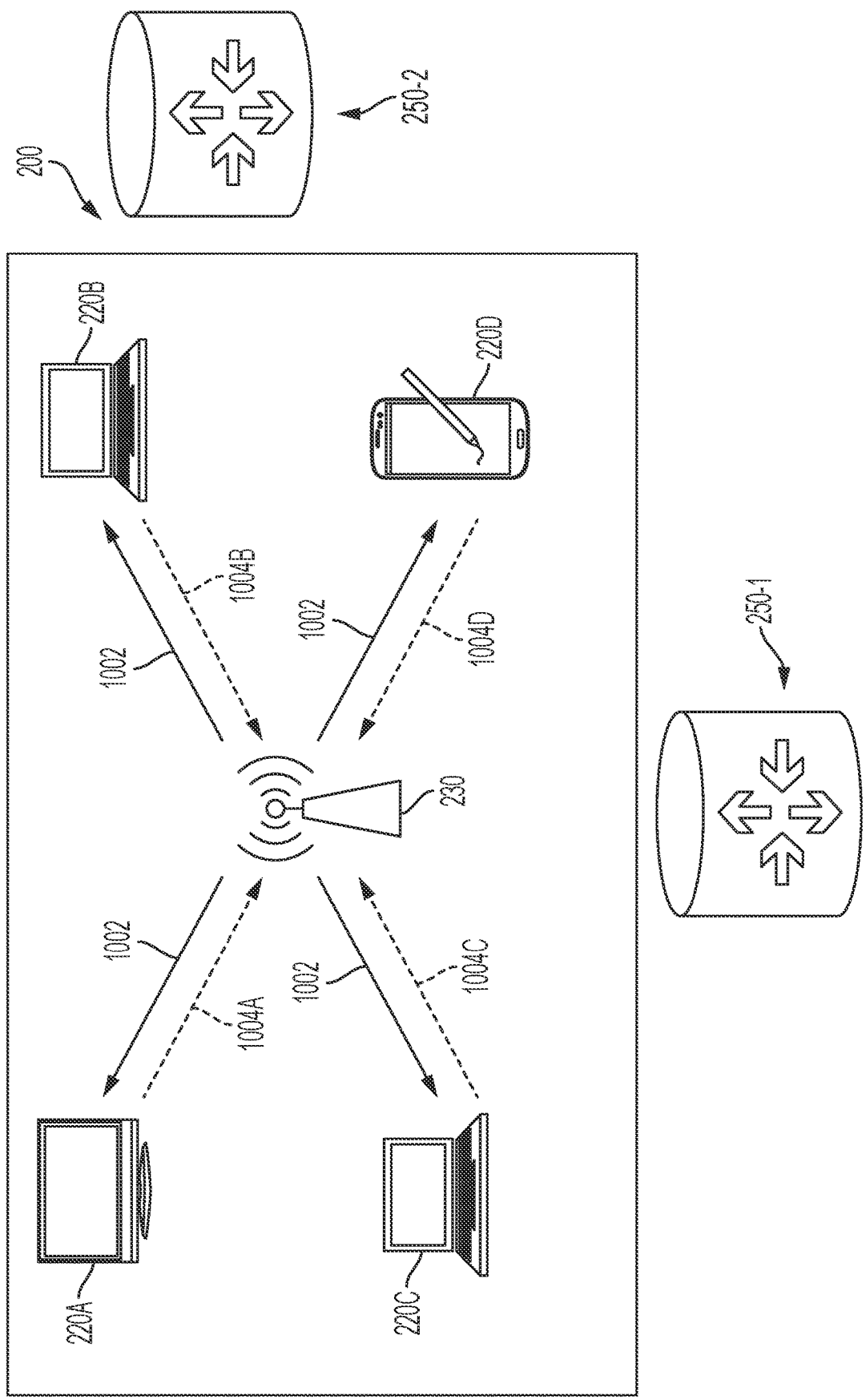
FIG. 10A is a diagram showing example downlink and uplink transmissions in an example wireless communication network system.

FIG. 10A is a diagram showing example downlink and uplink transmissions in the example wireless communication network system 200. The wireless devices 220A, 220B, 220C, 220D, having gone through an association and authentication phase with the AP 230, are wirelessly connected to and in communication with the AP 230. Wireless signals may be transmitted from the AP 230 to the wireless devices 220A, 220B, 220C, 220D via a downlink transmission 1002. Wireless signals may be transmitted from the wireless devices 220A, 220B, 220C, 220D to the AP 230 via respective uplink transmissions 1004A, 1004B, 1004C, 1004D. In some instances, the listening devices 250-1, 250-2 can eavesdrop on the downlink transmission 1002 and the uplink transmissions 1004A, 1004B, 1004C, 1004D. Additionally, each of the wireless devices 220A, 220B, 220C, 220D can receive (e.g., eavesdrop on) a downlink transmission 1002 from the AP 230 and addressed to another one of the wireless devices 220A, 220B, 220C, 220D, and can receive (e.g., eavesdrop on) an uplink transmission from another one of the wireless devices 220A, 220B, 220C, 220D to the AP 230.

The wireless devices 220A, 220B, 220C, 220D and the AP 230 can communicate with one another via RF signals, for example, according to the IEEE 802.11ax standard. A draft of the IEEE 802.11ax standard is published in a document entitled "P802.11ax/D8.0, Oct 2020—IEEE Approved Draft Standard for Information technology—Telecommunications and information exchange between systems Local and metropolitan area networks—Specific requirements Part 11: Wireless LAN Medium Access Control (MAC) and Physical Layer (PHY) Specifications Amendment 1: Enhancements for High Efficiency WLAN," which was approved by the IEEE-SA Standards Board in February 2021, accessible at https://ieeexplore.ieee.org/servlet/opac?punumber=9248708, and hereby incorporated by reference in its entirety.

In the IEEE 802.11ax standard, the respective uplink transmissions 1004A, 1004B, 1004C, 1004D can be an uplink-orthogonal frequency-division multiple access (UL-OFDMA) transmission from the wireless devices 220A, 220B, 220C, 220D to the AP 230. A UL-OFDMA transmission is a feature of the so-called "High-Efficiency Long Training Field" PHY frame, also known as HE-PHY (e.g., in the Wi-Fi 6 standard, according to the IEEE 802.11ax standard).

In a UL-OFDMA transmission, the wireless devices 220A, 220B, 220C, 220D transmit respective HE-PHY frames to the AP 230 simultaneously. In some implementations, simultaneous transmission of the respective HE-PHY frames can include a transmission in parallel at approximately the same time. In some instances, the simultaneous transmission of the respective HE-PHY frames can start or end at the same time (e.g., at exactly the same time); however, in other implementations, the simultaneous transmission of the respective HE-PHY frames can partially or fully overlap in time with each other, even if they are not precisely synchronized.

The simultaneous transmission of respective HE-PHY frames from the wireless devices 220A, 220B, 220C, 220D to the AP 230 can occur because the wireless devices 220A, 220B, 220C, 220D are assigned respective sets of OFDM subcarriers for their respective PHY frames. In some instances, the respective sets of OFDM subcarriers are referred to as respective resource units (RUs). In some instances, beamforming may also be used for the UL-OFDMA transmission, thus resulting in an UL-OFDMA with multi-user MIMO (MU-MIMO) transmission.

Figure 11A:
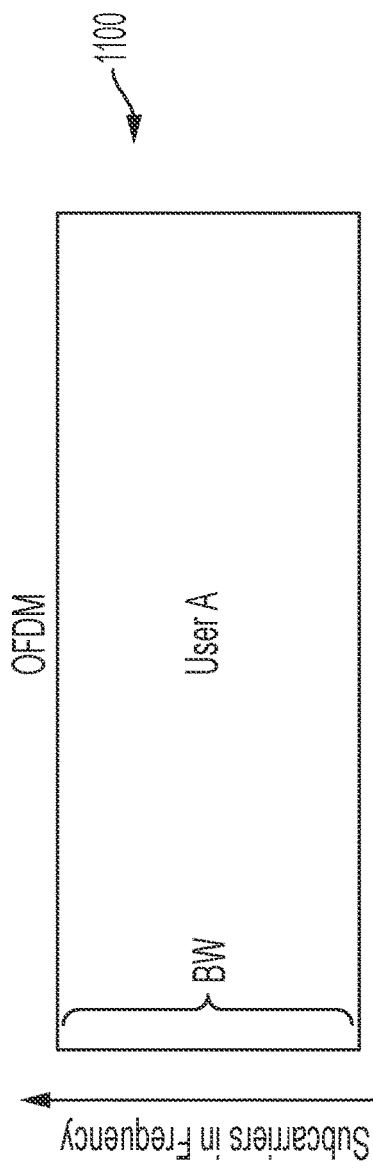
FIG. 11A shows spectrum allocation in an example orthogonal frequency-division multiplexing (OFDM) scheme.
Figure 11B:
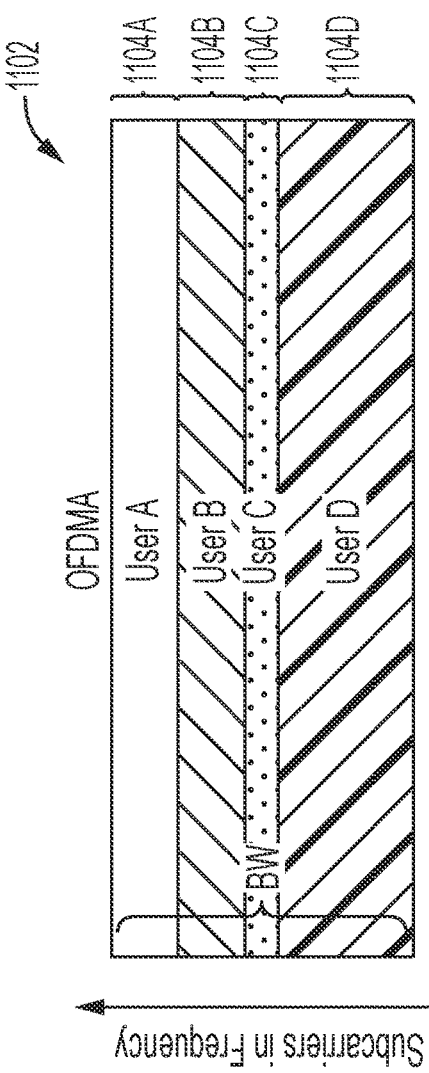
FIG. 11B shows spectrum allocation in an example orthogonal frequency-division multiple access (OFDMA) scheme.

FIG. 11A shows spectrum allocation 1100 in an example orthogonal frequency-division multiplexing (OFDM) scheme. FIG. 11B shows spectrum allocation 1102 in an example orthogonal frequency-division multiple access (OFDMA) scheme. In FIGS. 11A and 11B, the vertical axes represent all available frequency subcarriers in a wireless communication channel (e.g., in arbitrary units such as subcarrier index, frequency, etc.), and the horizontal axes represent time (e.g., in arbitrary units). As seen in FIG. 11A, in an OFDM scheme, all available frequency subcarriers of the wireless communication channel (e.g., shown as channel bandwidth BW in the vertical axis) are allocated to a single user (shown in FIG. 11A as "User A"). Consequently, the single user uses the entire channel bandwidth BW in an OFDM scheme. In contrast, as seen in FIG. 11B, in an OFDMA scheme, the entire channel bandwidth BW is divided into respective subsets of subcarriers, or resource units (RUs) 1104A, 1104B, 1104C, 1104D. The respective RUs are allocated to different users. In an OFDMA scheme, multiple users can therefore communicate on the wireless communication channel simultaneously using their respective RUs. In the example of FIG. 11B, all available frequency subcarriers are divided into a first resource unit 1104A, a second resource unit 1104B, a third resource unit 1104C, and a fourth resource unit 1104D. In some instances, the resource units 1104A, 1104B, 1104C, 1104D do not overlap in frequency and are allocated to respective, different users (e.g., User A, User B, User C, and User D, respectively). Consequently, the OFDMA scheme results in frequency multiplexing or spectrum sharing (e.g., a fine-grain spectrum sharing) among different users.

FIG. 11C is a diagram showing an example sequence of HE-PHY frames transmitted in an example wireless communication network system operating according to the IEEE 802.11ax standard. The vertical axis represents all available frequency subcarriers in a wireless communication channel (e.g., in arbitrary units such as subcarrier index, frequency, etc.), and the horizontal axis represents time (e.g., in arbitrary units). In implementations where the wireless communication network system 200 shown in FIG. 10A operates according to the IEEE 802.11ax standard, the AP 230 may perform a downlink transmission 1002 that sends a first downlink (DL) HE-PHY frame 1106 to the wireless devices 220A, 220B, 220C, 220D. The first DL HE-PHY frame 1106 elicits a UL-OFDMA transmission 1108 from the wireless devices 220A, 220B, 220C, 220D to the AP 230. FIG. 11C also shows a second DL HE-PHY frame 1110 that is transmitted from the AP 230 to the wireless devices 220A, 220B, 220C, 220D after the UL-OFDMA transmission 1108.

The first DL HE-PHY frame 1106 can include a preamble and a trigger frame, and can be addressed to the wireless devices 220A, 220B, 220C, 220D. In some instances, the trigger frame includes a triggered response scheduling (TRS) control field, which can be used by the AP 230 to allocate respective RUs to the wireless devices 220A, 220B, 220C, 220D. The TRS control field can also be used by the AP 230 to specify a set of parameters for the subsequent UL-OFDMA transmission 1108 from the wireless devices 220A, 220B, 220C, 220D to the AP 230. In some instances, the set of parameters can include the duration of the UL-OFDMA transmission 1108, the target RSSI for the UL-OFDMA transmission 1108 (e.g., as measured at the AP 230), or the high-efficiency modulation and coding scheme of the UL-OFDMA transmission 1108. Other parameters for the subsequent UL-OFDMA transmission 1108 can also be specified in the TRS control field.

In response to receiving and processing the first DL HE-PHY frame 1106, the wireless devices 220A, 220B, 220C, 220D perform respective uplink transmissions 1004A, 1004B, 1004C, 1004D that transmit the UL-OFDMA transmission 1108 to the AP 230. The UL-OFDMA transmission 1108 is transmitted in accordance with the RU allocation and the parameters specified in the trigger frame of the first DL HE-PHY frame 1106. In some instances, such as in the example shown in FIG. 11C, transmission of the UL-OFDMA transmission 1108 commences one short interframe space (SIFS) time period after the end of the first DL HE-PHY frame 1106. In the most common instances, the SIFS time period may be in a range from about 3 s to about 16 s, and can be defined by the physical layer and frequency band used. An HE-PHY, for example, defines the SIFS time to be about 10 μs in the 2.4 GHz band and about 16 s in the 5 GHz and 6 GHz bands. As seen in FIG. 11D, the UL-OFDMA transmission 1108 can include respective HE-PHY frames 1108A, 1108N that are simultaneously transmitted from the wireless devices to which the first DL HE-PHY frame 1106 was addressed (e.g., wireless devices 220A, 220B, 220C, 220D). The HE-PHY frames 1108A, 1108N of the UL-OFDMA transmission 1108 can include respective preambles and respective uplink block acknowledgements.

Figure 10B:
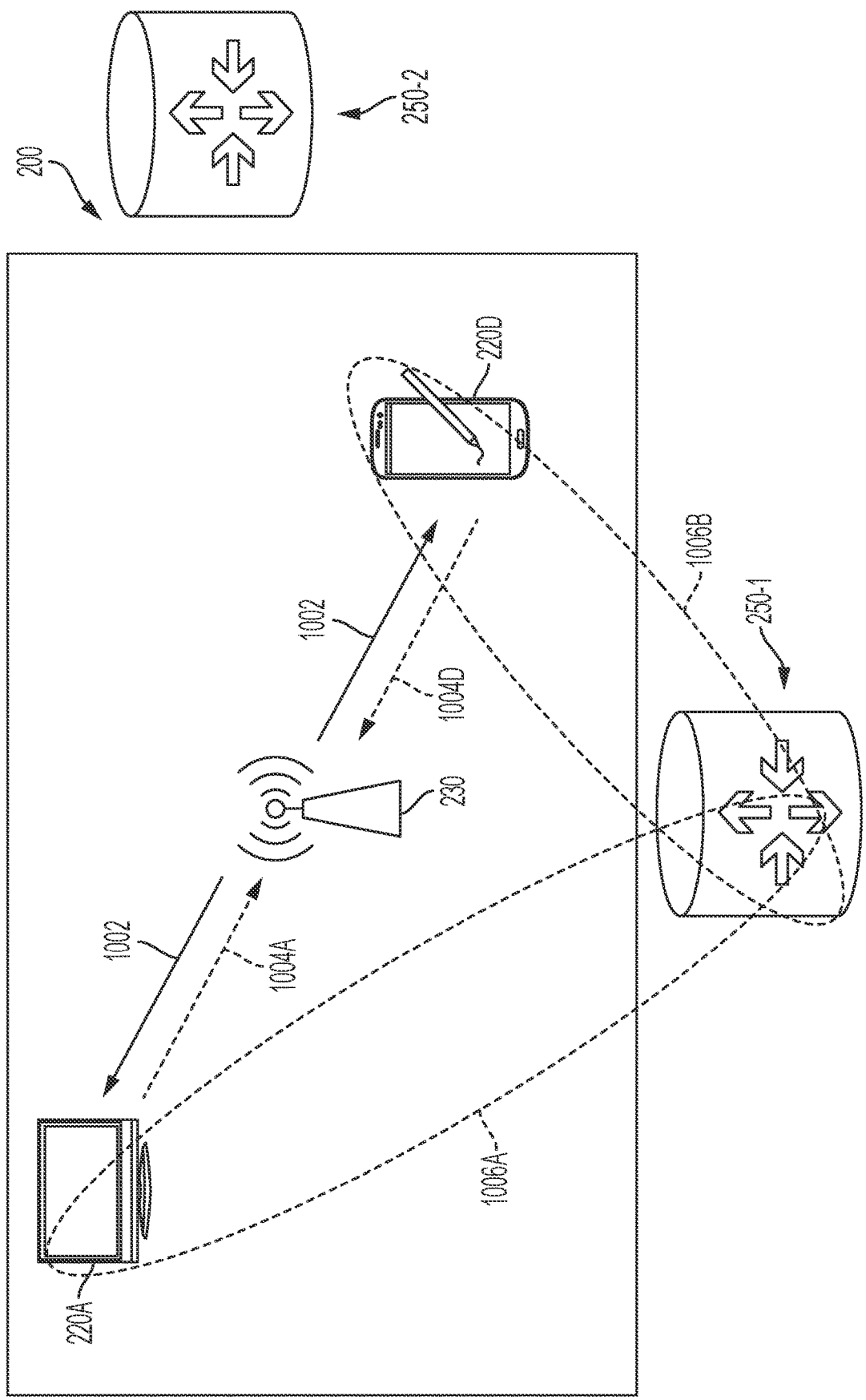
FIG. 10B is a diagram showing example motion detection zones in an example wireless communication network system.

Since the UL-OFDMA transmission 1108 allows the wireless devices 220A, 220B, 220C, 220D to transmit respective HE-PHY frames to the AP 230 simultaneously, a single UL-OFDMA transmission 1108 can be used to detect motion in multiple motion detection zones simultaneously. FIG. 10B is a diagram showing example motion detection zones in an example wireless communication network system. As an example, the UL-OFDMA transmission 1108 may include a transmission of the HE-PHY frame 1108A from the wireless device 220A to the AP 230 and a simultaneous transmission of the HE-PHY frame 1108N from the wireless device 220D to the AP 230. The HE-PHY frames 1108A, 1108N can be used (e.g., by the listening device 250-1, the listening device 250-2, or some other device that receives the UL-OFDMA transmission 1108) to compute respective channel responses. A channel response can correspond to a physical path between the wireless device transmitting the HE-PHY frame and the device receiving the HE-PHY frame. Consequently, in examples where the listening device 250-1 eavesdrops on the transmissions in the wireless communication network system 200 and computes the respective channel responses, the channel response computed from the HE-PHY frame 1108A may be indicative of the physical path between the wireless device 220A and the listening device 250-1, while the channel response computed the HE-PHY frame 1108N may be indicative of the physical path between the wireless device 220D and the listening device 250-1. The channel responses computed from the HE-PHY frames 1108A, 1108N can be used to simultaneously probe a first motion detection zone 1006A and a second motion detection zone 1006D, respectively. Stated differently, in some instances, the channel responses computed from the HE-PHY frames 1108A, 1108N may be used to generate motion data that can be used to simultaneously detect whether motion has occurred in motion detection zones 1006A, 1006D.

The second DL HE-PHY frame 1110 can include a preamble and a multi-user (MU) block acknowledgement, and can be addressed to the wireless devices 220A, 220B, 220C, 220D. In some instances, the MU block acknowledgement of the second DL HE-PHY frame 1110 can be used by the AP 230 to acknowledge receipt of the UL-OFDMA transmission 1108. In some instances, such as in the example shown in FIG. 11C, transmission of the second DL HE-PHY frame 1110 commences one SIFS time period (e.g., about 16 s in 5 GHz and 6 GHz bands) after the end of UL-OFDMA transmission 1108.

In some instances, each of the first DL HE-PHY frame 1106, the UL-OFDMA transmission 1108, and the second DL HE-PHY frame 1110 can include a MAC layer frame encoded within (e.g., encapsulated within) the data payload of an HE-PHY frame, analogous to the example shown in FIG. 9. At the PHY layer, data can be referred to as a physical layer (PHY) protocol data unit (PPDU), which can be a unit of data exchanged between two peer PHY entities to provide the PHY data service. The PPDU can include a preamble followed by a payload. The payload can include digital data, provided by the MAC layer, that has gone through a coding and mapping process to produce an OFDM vector (using defined rates and bandwidths).

In some implementations, HE-PHY frames can have one of a plurality of PPDU formats, including a High-Efficiency Single-User PPDU (HE SU PPDU) format, a High-Efficiency Trigger-Based PPDU (HE TB PPDU) format, a High-Efficiency Multi-User PPDU (HE MU PPDU) format, and a High-Efficiency Enhanced-Range PPDU (HE ER PPDU) format.

Figure 12A:
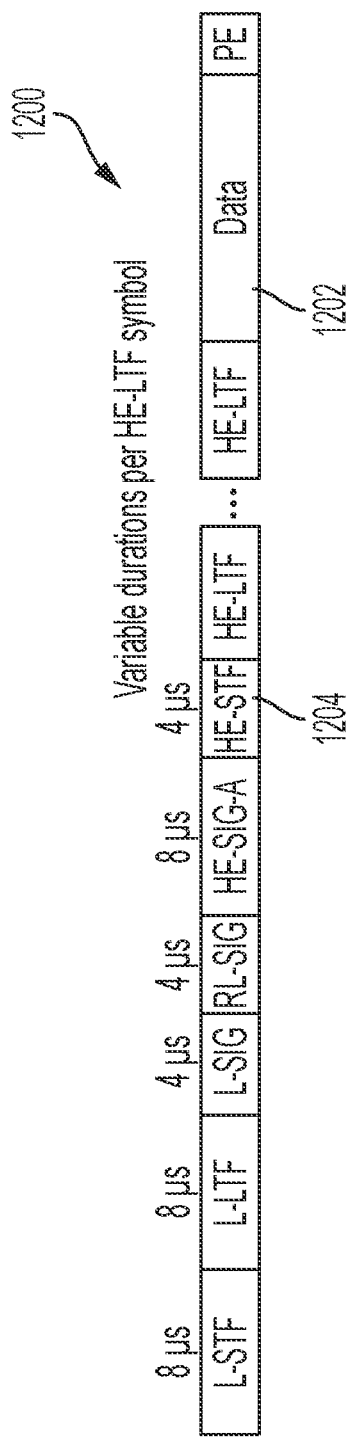
FIG. 12A shows an example HE-PHY frame having a High-Efficiency Single-User PPDU (HE SU PPDU) format.

FIG. 12A shows an example HE-PHY frame 1200 having the HE SU PPDU format. In some instances, the HE-PHY frame 1200 can be used to carry a single MAC data payload (on an uplink transmission or a downlink transmission). The first DL HE-PHY frame 1106 discussed above in relation to FIG. 11C can be a HE-PHY frame having the HE SU PPDU format, and as discussed in further detail below, the AP 230 can coordinate a UL-OFDMA transmission from the wireless devices 220A, 220B, 220C, 220D using a trigger request in a trigger frame. In some instances, the trigger frame can be a MAC layer frame encoded within the data payload 1202 of the HE-PHY frame 1200. In some instances, the trigger frame allocates a respective subset of available bandwidth (e.g., allocates respective RUs) or spatial streams (e.g., allocates respective beamforming matrices) to the wireless devices 220A, 220B, 220C, 220D. The trigger frame can also specify a set of parameters for the subsequent UL-OFDMA transmission.

In some instances, a HE-PHY frame having the HE MU PPDU format can be used to carry multiple MAC data payloads to the wireless devices 220A, 220B, 220C, 220D using the downlink transmission 1002. The multiple MAC data payloads are transmitted to the wireless devices 220A, 220B, 220C, 220D at the same time (e.g., simultaneously). To allow for the simultaneous transmission of multiple MAC data payloads to the wireless devices 220A, 220B, 220C, 220D, the data payloads can be multiplexed on the downlink transmission 1002 by frequency (e.g., using an OFDMA scheme) or by spatial stream (e.g., by beamforming).

In some instances, a HE-PHY frame having the HE ER PPDU format has a HE-SIG-A field that is twice the duration of the HE-SIG-A field in a HE-PHY frame having the HE SU PPDU format. The HE-PHY frame having the HE ER PPDU format can be used to carry a single MAC data payload.

Figure 12B:
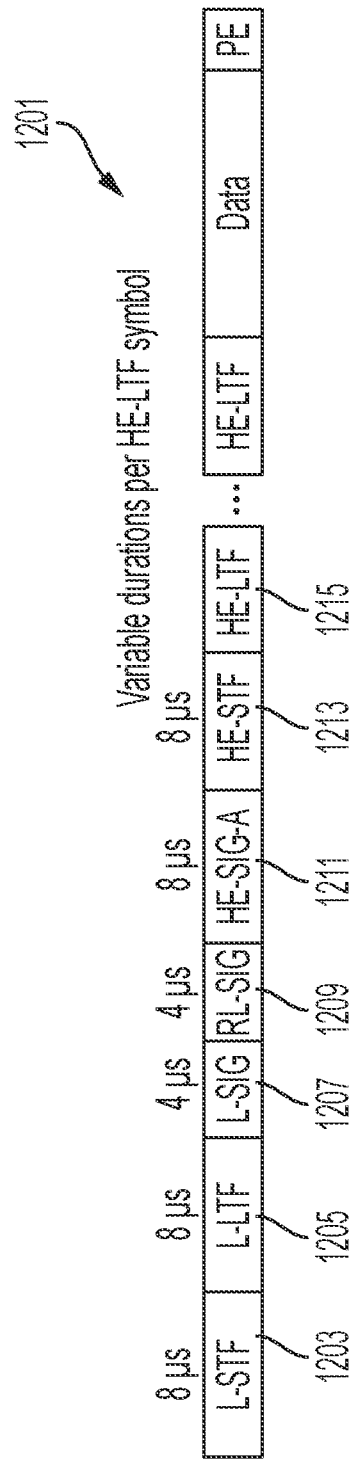
FIG. 12B shows an example HE-PHY frame having a High-Efficiency Trigger-Based PPDU (HE TB PPDU) format.

FIG. 12B shows an example HE-PHY frame 1201 having the HE TB PPDU format. In some instances, the HE-PHY frame 1201 can be used by the wireless devices 220A, 220B, 220C, 220D to respond to the trigger request from the AP 230. As such, in some instances, the UL-OFDMA transmission 1108 discussed above in relation to FIG. 11C can include multiple HE-PHY frames having the HE TB PPDU format. Each of the respective HE-PHY frames 1108A, 1108N of the UL-OFDMA transmission 1108 can be used to carry a single MAC data payload (per respective transmitting user). As seen in the examples of FIGS. 12A and 12B, the duration of the High-Efficiency Short Training Field (HE-STF) 1213 of the HE-PHY frame 1201 having the HE TB PPDU format can be twice that the duration of the HE-STF 1204 of the HE-PHY frame 1200 having the HE SU PPDU format.

As seen in FIG. 12B, the HE-PHY frame 1201 having the HE TB PPDU format includes multiple fields, including pre-HE modulated fields and HE modulated fields. The pre-HE modulated fields include the legacy short training field (L-STF) 1203, the legacy long training field (L-LTF) 1205, the legacy signal (L-SIG) field 1207, the RL-SIG field 1209, and the HE-SIG-A field 1211. The HE modulated fields include the HE-STF 1213, and the High-Efficiency Long Training Field (HE-LTF) 1215. Any of the fields in the HE-PHY frame 1201 can be used to compute the respective channel responses corresponding to the respective motion detection zones. In some implementations, the HE-LTF 1215 can be used to compute the respective channel responses corresponding to the respective motion detection zones. Using the HE-LTF 1215 of the HE-PHY frame 1201 to compute the respective channel responses may provide one or more advantages in some instances. For example, the HE-LTF 1215 of the HE-PHY frame 1201 activates the largest number of subcarriers (e.g., compared to other fields in the HE-PHY frame 1201), thereby providing the maximum available continuous measurement bandwidth for computing the respective channel responses.

An example HE-LTF is described on page 620 of the draft of the IEEE 802.11ax standard as follows:

In a 20 MHz transmission, the 4×HE-LTF sequence transmitted on subcarriers [−122: 122] is given by Equation (27-42).

$$HELTF_{-122,122}=\{-1,-1,+1,-1,+1,-1,+1,+1,+1,-1,+\\1,+1,+1,-1,-1,+1,-1,-,-1,-1,-1,-1,-1,+1,-1,-\\1,-1,-1,+1,+1,-1,+1,-1,+1,+1,+1,+1,-1,+1,-1,-\\1,+1,+1,-1,+1,+1,+1,-1,-1,+1,-1,-1,-1,+1,+\\1,+1,+1,-1,+1,+1,-1,-1,-1,+1,-1,-1,+1,+1,-\\1,+1,-1,-1,-1,+1,+1,-1,-1,-1,-1,-1,+1,+\\1,-1,-1,-1,+1,-1,-1,+1,+1,+1,-1,+1,+1,+\\1,-1,+1,-1,+1,-1,-1,-1,+1,+1,+1,-1,-1,-\\1,+1,-1,+1,+1,0,0,0,-1,+1,-1,+1,-1,+1,+1,-\\1,+1,+1,+1,+1,-1,-1,+1,-1,+1,-1,+1,+1,+1,-1,+\\1,+1,+1,-1,+1,-1,-1,-1,-1,-1,+1,+1,+1,-1,-\\1,-1,-1,-1,+1,-1,+1,-1,-1,-1,+1,-1,+1,+1,-\\1,-1,+1,-1,-1,-1,+1,+1,+1,-1,+1,+1,+1,+1,+\\1,+1,+1,-1,+1,+1,-1,-1,-1,-1,+1,-1,-1,+1,+1,-\\1,+1,-1,-1,-1,+1,-1,-1,-1,-1,-1,+1,+1,+1,-\\1,-1,+1,+1,+1,+1,-1,+1,+1,-1,-1,-1,+1,-1,-\\1,-1,+1,-1,+1,-1,+1,+1\} \quad (27\text{-}42)$$

When responding to the trigger frame, the wireless devices 220A, 220B, 220C, 220D transmit the portions of the HE-LTF 1215 within their respective, allocated RUs. In some instances, all subcarriers in RUs not allocated to a respective wireless device 220A, 220B, 220C, 220D can be set to zero.

Figure 13A:
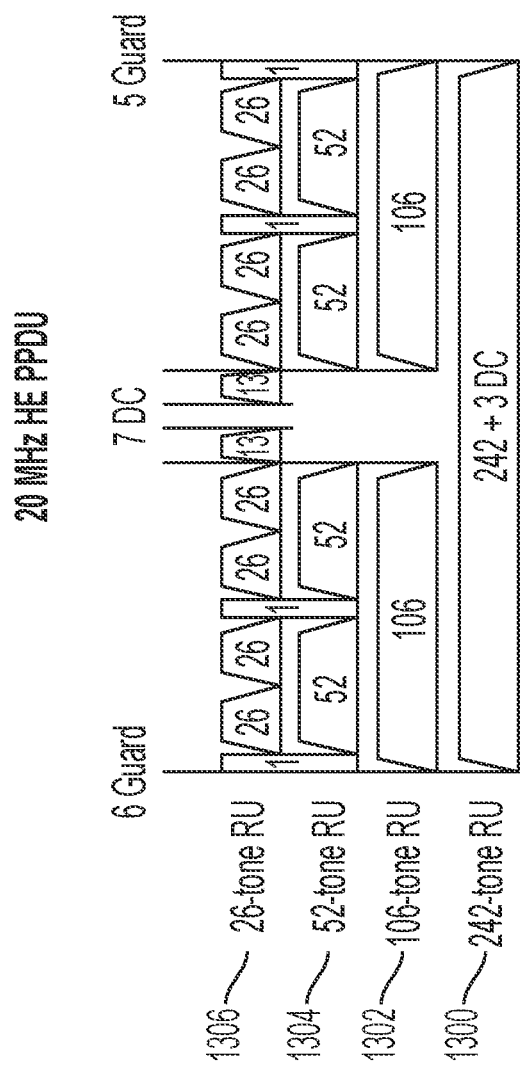
FIG. 13A shows example resource unit allocations for a HE-PHY frame having the HE TB PPDU format transmitted over a channel having a bandwidth of 20 MHz.
Figure 13B:
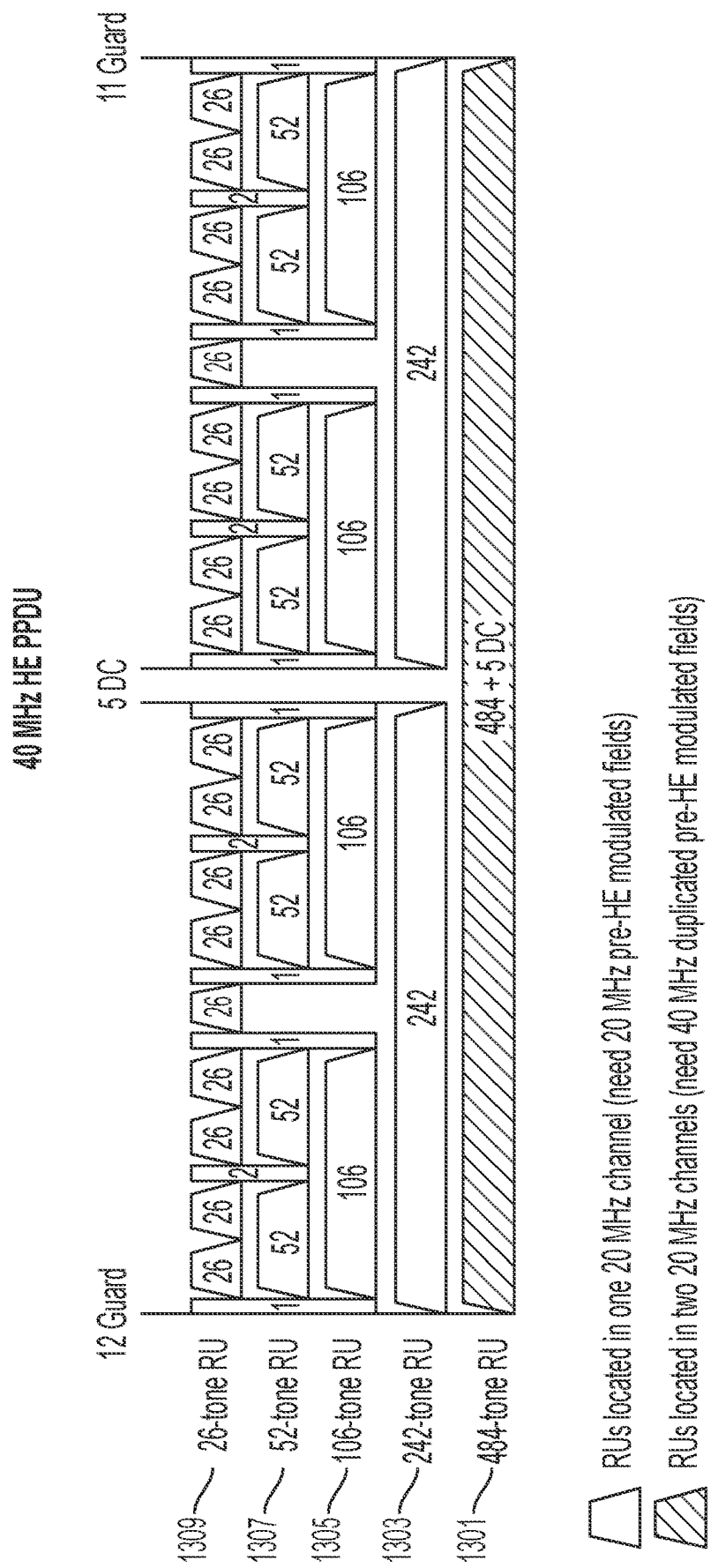
FIG. 13B shows example resource unit allocations for a HE-PHY frame having the HE TB PPDU format transmitted over a channel having a bandwidth of 40 MHz.
Figure 13C:
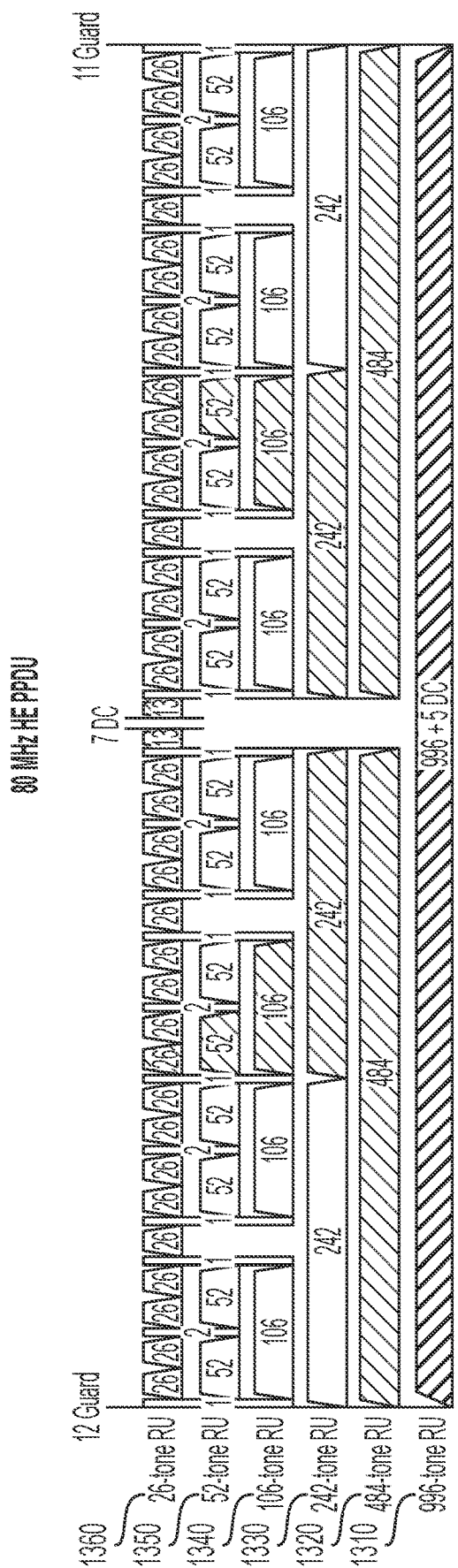
FIG. 13C shows example resource unit allocations for a HE-PHY frame having the HE TB PPDU format transmitted over a channel having a bandwidth of 80 MHz.

FIG. 13A shows example resource unit allocations for a HE-PHY frame 1201 having the HE TB PPDU format transmitted over a channel having a bandwidth of 20 MHz. FIG. 13B shows example resource unit allocations for a HE-PHY frame 1201 having the HE TB PPDU format transmitted over a channel having a bandwidth of 40 MHz. FIG. 13C shows example resource unit allocations for a HE-PHY frame 1201 having the HE TB PPDU format transmitted over a channel having a bandwidth of 80 MHz. The RU allocations shown in FIGS. 13A to 13C illustrate the number of 20 MHz channels that may be modulated for the pre-HE modulated fields for each RU size and location in a HE-PHY frame 1201 having the HE TB PPDU format. The horizontal axis of the example RU allocations represents frequency subcarriers (e.g., in arbitrary units such as subcarrier index, frequency, etc.).

In the example shown in FIG. 13A, the 20 MHz channel can include 242 subcarriers. In some instances, the 20 MHz channel may include a single RU of 242 subcarriers (e.g., as shown in allocation 1300); two RUs, each having 106 subcarriers (e.g., as shown in allocation 1302); four RUs, each having 52 subcarriers (e.g., as shown in allocation 1304); or nine RUs, each having 26 subcarriers (e.g., as shown in allocation 1306). In some instances, some subcarriers are designated as guard intervals (e.g., as shown in allocations 1304 and 1306). In the example allocations shown in FIG. 13A, the RUs are located in one 20 MHz channels, thus needing 20 MHz pre-HE modulated fields.

In the example shown in FIG. 13B, the 40 MHz channel can include 484 subcarriers. In some instances, the 40 MHz channel may include a single RU of 484 subcarriers (e.g., as shown in allocation 1301). In the allocation 1301, the RU is located in two 20 MHz channels, thus needing 40 MHz duplicated pre-HE modulated fields. In some instances, the 40 MHz channel may include two RUs, each having 242 subcarriers (e.g., as shown in allocation 1303); four RUs, each having 106 subcarriers (e.g., as shown in allocation 1305); eight RUs, each having 52 subcarriers (e.g., as shown in allocation 1307); or eighteen RUs, each having 26 subcarriers (e.g., as shown in allocation 1309). In some instances, some subcarriers are designated as guard intervals (e.g., as shown in allocations 1305, 1307, and 1309).

In the example shown in FIG. 13C, the 80 MHz channel can include 996 subcarriers. In some instances, the 80 MHz channel may include a single RU of 996 subcarriers (e.g., as shown in allocation 1310). In the allocation 1310, the RU is located in four 20 MHz channels, thus needing 80 MHz duplicated pre-HE modulated fields. In some instances, the 80 MHz channel may include two RUs, each having 484 subcarriers (e.g., as shown in allocation 1320); four RUs, each having 242 subcarriers (e.g., as shown in allocation 1330); eight RUs, each having 106 subcarriers (e.g., as shown in allocation 1340); sixteen RUs, each having 52 subcarriers (e.g., as shown in allocation 1350); or 37 RUs, each having 26 subcarriers (e.g., as shown in allocation 1360). In some instances, some subcarriers are designated as guard intervals (e.g., as shown in allocations 1340, 1350, and 1360).

Figure 14:
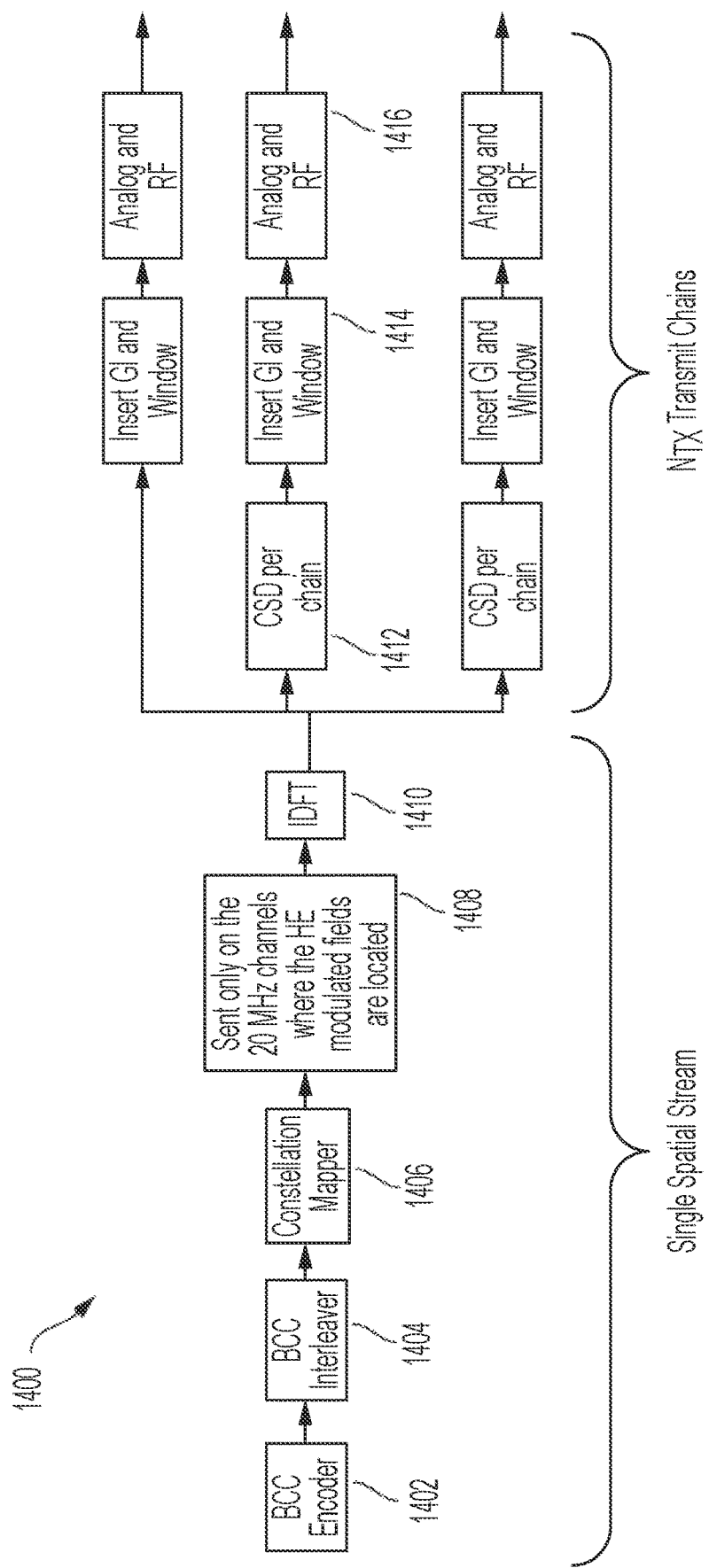
FIG. 14 shows an example transmitter block diagram for the pre-HE modulated fields of a HE-PHY frame having the HE TB PPDU format.

In the HE-PHY frame 1201 having the HE TB PPDU format, the pre-HE modulated fields (e.g., the L-STF 1203, the L-LTF 1205, the L-SIG field 1207, the RL-SIG field 1209, the HE-SIG-A field 1211) are sent on 20 MHz channels where the HE modulated fields of the respective wireless devices 220A, 220B, 220C, 220D are located. Consequently, when HE modulated fields are located in more than one 20 MHz channel (e.g., as seen in the examples shown in FIGS. 13B and 13C), the pre-HE modulated fields may need to be duplicated over the multiple 20 MHz channels. FIG. 14 shows an example transmitter block diagram 1400 for the pre-HE modulated fields of the HE-PHY frame 1201 having the HE TB PPDU format. The transmitter block 1400 includes a single spatial stream, which, in some instances, includes block convolution code (BCC) encoder 1402, a BCC interleaver 1404, a constellation mapper 1406, a filter 1408, and an inverse Discrete Fourier transform (IDFT) block 1410. The transmitter 1400 also includes multiple transmit chains. The number of transmit chains can be equal to the number of transmit antennas, $N_{TX}$.

The BCC encoder 1402 operates on input data and can be a convolution encoder using industry standard polynomials g0=133(8), g1=171(8) and rate=1/2. In some instances, higher encoding rates of 2/3 and 3/4 can be achieved via puncturing. The BCC interleaver 1404 performs a bit rotation process that operates on a block size equal to the number of bits in a single OFDM symbol. In some instances, the interleaving performed by the BCC interleaver 1404 can be performed in two operations, where first adjacent coded bits are mapped onto non-adjacent subcarriers, and secondly adjacent coded bits are mapped in an alternating fashion onto less/more significant bits of the constellation. The constellation mapper 1406 performs a mapping process that takes the BCC Encoded and Interleaved signal, and determines the complex (e.g., in-phase (I) and quadrature-phase (Q)) subcarrier modulation. For each OFDM subcarrier, a group of bits corresponding to the QAM order (e.g., 16-QAM takes 4 bits, 64-QAM takes 6 bits, where 2^Bits=QAM order) is used to represent the amplitude of both the I and Q components of the modulation based on a pre-determined constellation encoding. For cases of the non-MIMO fields of an HE PPDU of FIG. 12A and FIG.

12B (e.g., L-STF, L-LTF, L-SIG, RL-SIG, HE-SIG-A), the filter 1408 can be used to transmit data on all 20 MHz channels of which the assigned RU is located within. The IDFT block 1410 can be used to obtain the time-domain waveform (e.g., the complex, IQ, time-domain waveform) of the modulated signal (e.g., the complex, IQ modulated signal).

The transmitter block 1400 can include multiple transmit chains. Some of the multiple transmit chains can include a cyclic shift for Diversity (CSD) per chain block 1412, an insert guard interval (GI) and window block 1414, and an analog and RF block 1416. The CSD per chain block 1412 can be applied on transmitters which contain multiple output antennas. In some instances, for non-MIMO fields of an HE PPDU of FIG. 12A and FIG. 12B (e.g., L-STF, L-LTF, L-SIG, RL-SIG, HE-SIG-A), the same data is transmitted on all $N_{TX}$ transmit antennae. However, to avoid the potential of NULLs being created due to the superposition, a cyclic shift in the range of hundreds of nanoseconds can be applied to each transmit antenna to decrease the potential of NULLs being formed. The insert GI and window block 1414 can be used to insert the appropriate guard interval into the signal and to truncate the periodic waveform to the length of a single OFDM symbol by applying time-domain windowing. The analog and RF block 1416 can be used to convert the complex digital baseband signal to an in-phase and a quadrature-phase analog signal, and to up-convert to RF according to the center frequency of the desired channel.

As discussed above, the trigger frame can be a MAC layer frame encoded within the data payload 1202 of the HE-PHY frame 1200 having the HE SU PPDU format. At the MAC layer, data can be referred to as a media access control (MAC) protocol data unit (MPDU), which can be a unit of data exchanged between two peer MAC entities using the services of the physical (PHY) layer. In some instances, an MPDU can also be referred to as a medium access control (MAC) frame. The MPDU can include a preamble followed by a payload. Both the preamble and payload can be digital data, represented in binary format.

Figure 15:
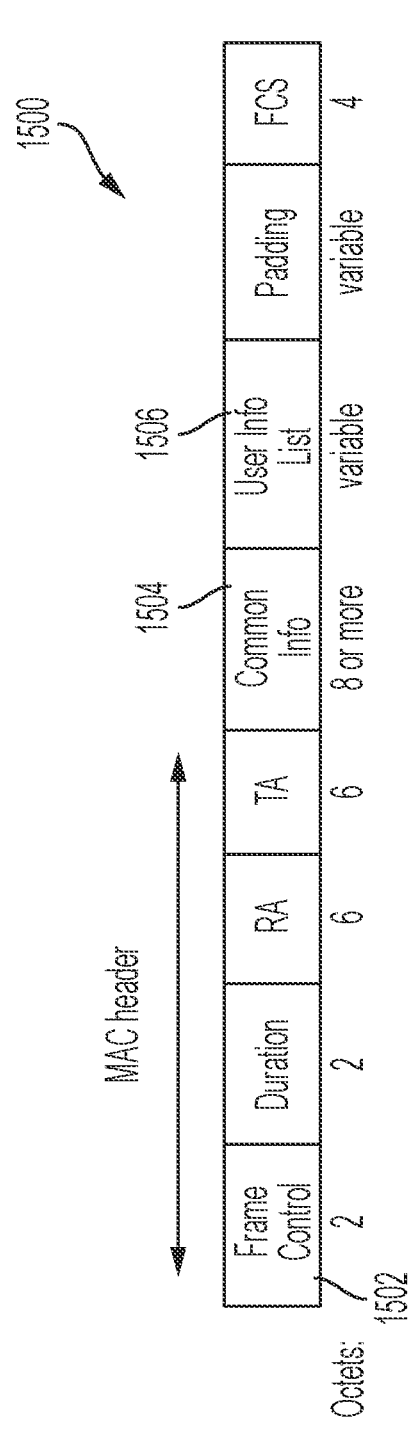
FIG. 15 shows an example format of a trigger frame.
Figure 16:
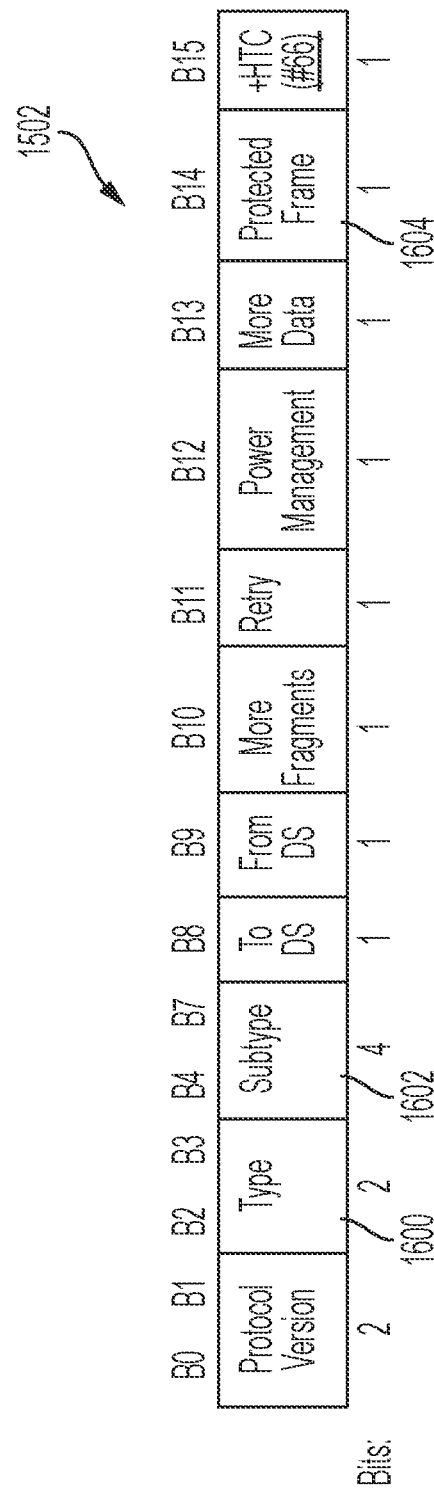
FIG. 16 shows an example expansion of the frame control field of a trigger frame.
Figure 17:
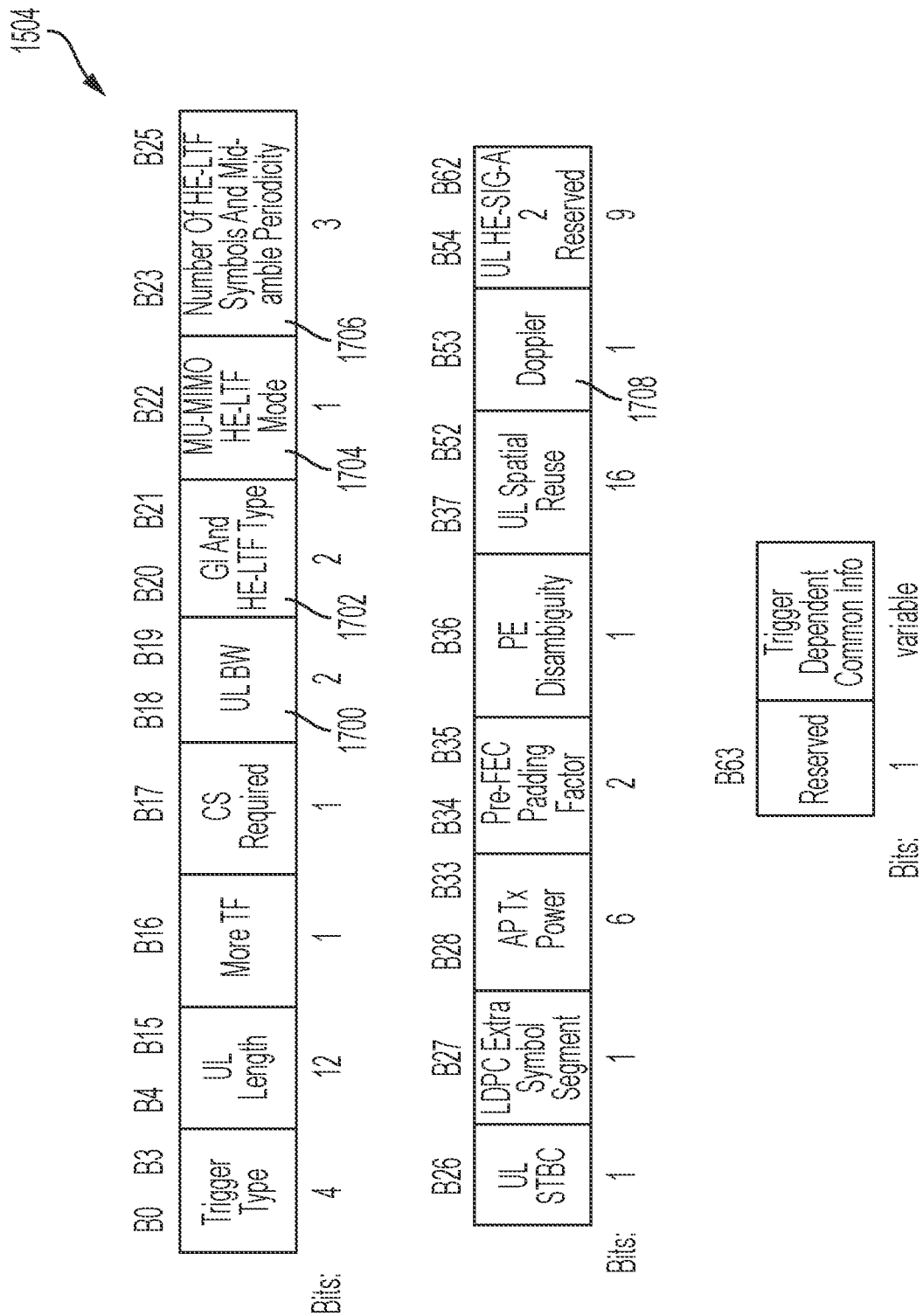
FIG. 17 shows an example expansion of the common information field of a trigger frame.
Figure 18:
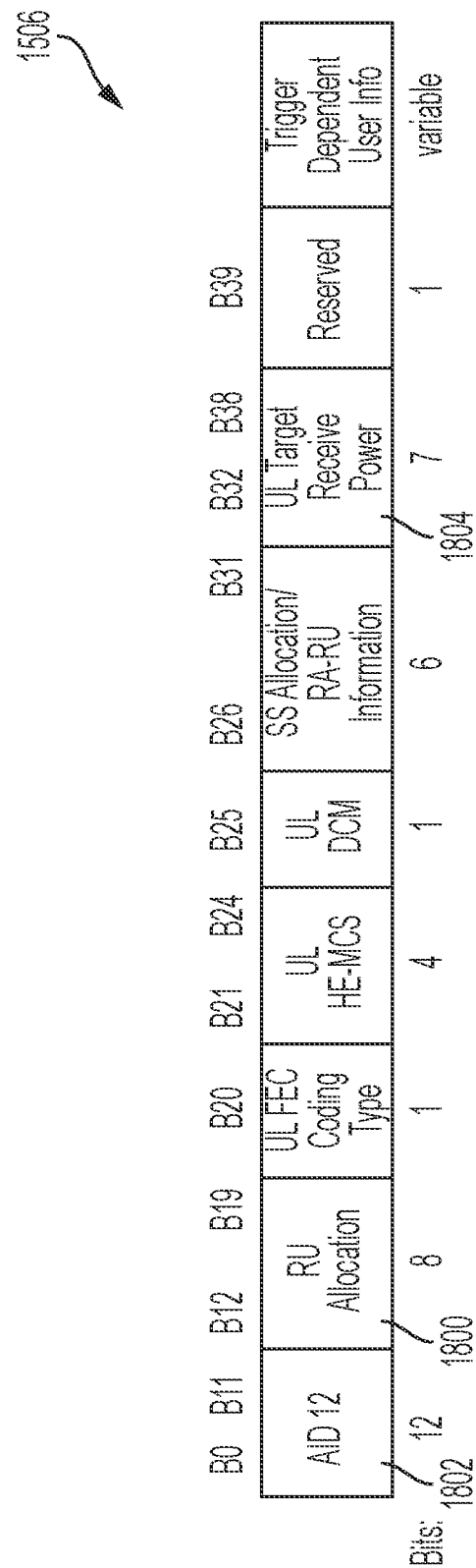
FIG. 18 shows an example expansion of the user information field of the trigger frame.

FIG. 15 shows an example format of a trigger frame 1500. The trigger frame 1500 includes a frame control field 1502, a common information field 1504, and a user information list field 1506. FIG. 16 shows an example expansion of the frame control field 1502 of the trigger frame 1500. FIG. 17 shows an example expansion of the common information field 1504 of the trigger frame 1500. FIG. 18 shows an example expansion of the user information list field 1506 of the trigger frame 1500. As seen in FIG. 16, the frame control field 1502 includes a type field 1600, a subtype field 1602, and a protected frame field 1604. In some instances, a trigger frame for a subsequent UL-OFDMA transmission can be identified (e.g., by the wireless devices 220A, 220B, 220C, 220D) based on the frame control field 1502 (e.g., the binary value in the type field 1600 and in the subtype field 1602). For example, a trigger frame for a subsequent UL-OFDMA transmission can be identified by type field 1600 of the frame control field 1502 having a binary value 01 and subtype field 1602 of the frame control field 1502 having binary value 0010 (e.g., Type=01 indicates a control frame, and Subtype=0010 indicates a trigger frame). Additionally, the frame control field 1502 can be transmitted as a non-protected transmission (e.g., without encryption), allowing the HE-PHY frame 1200 having the HE SU PPDU format to be processed by an external party not associated to the network (e.g., the listening devices 250-1, 250-2). The protected field frame 1604 can be set to a binary value of 1 in instances where at least one of the following are used: data frames protected using the mechanisms specified in Clause 12 (Security) of the draft of the IEEE 802.11ax standard; individually addressed protected robust management frames; or authentication frames with Authentication Algorithm Number field equal to 1 (e.g., indicating a shared key) and Authentication Transaction Sequence Number field equal to 3. The protected field frame 1604 can be set to a binary value of 0 in all other instances.

The common information field 1504 can contain configuration information that is common to all the wireless devices 220A, 220B, 220C, 220D responding to the trigger frame 1300 from the AP 230. As seen in FIG. 17, the common information field 1504 includes an uplink bandwidth (UL BW) field 1700, a guard interval (GI) and HE-LTF type field 1702, a MU-MIMO HE-LTF mode field 1704, a number of HE-LTF symbols and midamble periodicity field 1706, and a doppler field 1708.

In some instances, the UL BW field 1700 specifies the entire bandwidth of all available frequency subcarriers of the wireless communication channel (e.g., the entire bandwidth BW shown in FIGS. 11A and 11B). The RUs allocated to the respective wireless devices 220A, 220B, 220C, 220D are subsets of the entire bandwidth. In some instances, the entire bandwidth can be 20 MHz, 40 MHz, 80 MHz, or 160 MHz. In some implementations, the 160 MHz channel can include a primary 80 MHz channel and a secondary 80 MHz channel. The binary value indicated by the UL BW field 1700 can indicate the entire bandwidth of all available frequency subcarriers of the wireless communication channel. As an example, a binary value of 00 in the UL BW field 1700 can indicate a 20 MHz channel bandwidth (e.g., a 20 MHz PPDU), a binary value of 01 in the UL BW field 1700 can indicate a 40 MHz channel bandwidth (e.g., a 40 MHz PPDU), a binary value of 10 in the UL BW field 1700 can indicate a 80 MHz channel bandwidth (e.g., a 80 MHz PPDU), and a binary value of 11 in the UL BW field 1700 can indicate a 160 MHz channel bandwidth (e.g., a 160 MHz PPDU).

As seen in FIG. 18, the user information list field 1506 includes a resource unit (RU) allocation field 1800. The RU allocation field 1800 along with the UL BW field 1700 can identify the size and location of the RUs allocated to the respective wireless devices 220A, 220B, 220C, 220D. In some instances, when the UL BW field 1700 indicates a 20 MHz, 40 MHz, or 80 MHz PPDU, then B0 (e.g., the first bit) of the RU allocation field 1800 can be set to 0. In instances where the UL BW field 1700 indicates a 160 MHz PPDU, then B0 of the RU allocation field 1800 can be set to 0 to indicate that the RU allocation applies to the primary 80 MHz channel and set to 1 to indicate that the RU allocation applies to the secondary 80 MHz channel.

The second to eighth bits (e.g., B1-B7) of RU allocation field 1800 can be encoded to identify which RU and bandwidth is assigned for the subsequent UL-OFDMA transmission. Table 1 shows example encodings that can be used for the second to eighth bits of the RU allocation field 1800.

TABLE 1

B7 to B1 of the RU allocation field

| B7-BI of the RU Allocation subfield | UL BW subfield | RU size | RU Index |
|---|---|---|---|
| 0-8 | 20 MHz, 40 MHz, 80 MHz, 80 + 80 MHz or 160 MHz | 26 | RU1 to RU9, respectively |
| 9-17 | 40 MHz, 80 MHz, 80 + 80 MHz or 160 MHz | | RU10 to RU18, respectively |
| 18-36 | 80 MHz, 80 + 80 MHz or 160 MHz | | RU19 to RU37, respectively |
| 37-40 | 20 MHz, 40 MHz, 80 MHz, 80 + 80 MHz or 160 MHz | 52 | RU1 to RU4, respectively |
| 41-44 | 40 MHz, 80 MHz, 80 + 80 MHz or 160 MHz | | RU5 to RU8, respectively |
| 45-52 | 80 MHz, 80 + 80 MHz or 160 MHz | | RU9 to RU16, respectively |
| 53,54 | 20 MHz, 40 MHz, 80 MHz, 80 + 80 MHz or 160 MHz | 106 | RU1 and RU2, respectively |
| 55,56 | 40 MHz, 80 MHz, 80 + 80 MHz or 160 MHz | | RU3 and RU4, respectively |
| 37-60 | 80 MHz$_Z$, 80 + 80 MHz or 160 MHz$_Z$ | | RU5 to RU8, respectively |
| 61 | 20 MHz, 40 MHz, 80 MHz, 80 + 80 MHz or 160 MHz | 242 | RU1 |
| 62 | 40 MHz, 80 MHz, 80 + 80 MHz or 160 MHz | | RU2 |
| 63.64 | 80 MHz, 80 + 80 MHz or 160 MHz | | RU3 and RU4, respectively |
| 65 | 40 MHz, 80 MHz, 80 + 80 MHz of 160 MHz | 484 | RU1 |
| 66 | 80 MHz, 80 + 80 MHz or 160 MHz | | RU2 |
| 67 | 80 MHz, 80 + 80 MHz or 160 MHz | 996 | RU1 |
| 68 | 80 + 80 MHz or 160 MHz | 2 × 996 | RU1 |

As seen in Table 1, if the UL BW field indicates a 160 MHz PPDU, the description indicates the RU index for the primary 80 MHz channel or secondary 80 MHz channel, as indicated by the first bit (130) of the RU allocation field 1800.

The GI and HE-LTF type field 1702 of the common information field 1504 can be used to specify, to the wireless devices 220A, 220B, 220C, 220D), the HE-LTF type and guard interval that the respective wireless devices 220A, 220B, 220C, 220D are to be uses when transmitting the HE TB PPDU response. The HE-LTF type indicates a duration of the HE-LTF symbol, with a 1×HE-LTF type corresponding to an HE-LTF symbol duration of 3.2 μs, a 2×HE-LTF type corresponding to an HE-LTF symbol duration of 6.4 μs, and a 4×HE-LTF type corresponding to an HE-LTF symbol duration of 12.8 μs. Table 2 shows example encodings that can be used for the GI and HE-LTF type field 1702.

TABLE 2

GI and HE-LTF type field encoding

| GI and HE-LTF type field value | Description |
|---|---|
| 0 | 1 × HE-LTF + 1.6 μs GI |
| 1 | 2 × HE-LTF + 1.6 μs GI |
| 2 | 4 × HE-LTF + 3.2 μs GI |
| 3 | Reserved |

The information in the GI and HE-LTF type field 1702 can be used when computing the respective channel responses, since the encoding of the GI and HE-LTF type field 1702 can determine the number of frequency points and spacing of the excited subcarriers in the HE-LTF, and thus the frequency resolution of the respective channel responses.

The MU-MIMO HE-LTF mode field 1704 of the common information field 1504 can be used to specify the HE-LTF mode as either single-streamed or masked, using the encoding in Table 3.

TABLE 3

MU-MIMO HE-LTF mode field encoding

| MU-MIMO HE-LTF mode field value | Description |
|---|---|
| 0 | HE single stream pilot HE-LTF mode |
| 1 | HE masked HE-LTF sequence mode |

The trigger frame 1500 can indicate whether the uplink multi-user transmission following it uses HE single stream pilot HE-LTF mode or HE masked HE-LTF sequence mode if the HE-LTF type of the HE TB PPDU is 2×HE-LTF or 4×HE-LTF. A HE, no pilot HE-LTF mode is used if the HE-LTF type of the HE TB PPDU is 1×HE-LTF. If the HE single stream pilot HE-LTF mode is used, no masking is applied to the HE-LTF. The HE single stream pilot HE-LTF mode can be used for any UL-OFDMA transmission, including UL-OFDMA with MU-MIMO transmissions.

The HE-LTF field allows the device receiving the HE TB PPDU to estimate the channel (e.g., MIMO channel) between the set of constellation mapper outputs (e.g., seen in FIG. 14) and the receiving device's receive chain. If space-time block coding (STBC) is applied, the HE-LTF field allows the device receiving the HE TB PPDU to estimate the channel (e.g., MIMO channel) between the STBC encoder outputs and the receiving device's receive chain. In an HE TB PPDU, the transmitter of a user u in the $r^{th}$ RU provides training for $N_{STS,r,u}$ space-time streams (e.g., defined in the draft of the IEEE 802.11ax standard) used for the transmission of a PLCP Service Data Unit (PSDU). For each subcarrier in the $r^{th}$RU, the MIMO channel that can be estimated is a $N_{RX} \times N_{STS,r,total}$ matrix (e.g., defined in the draft of the IEEE 802.11ax standard). When a single stream pilot is used in the HE-LTF, the pilot subcarriers of each HE-LTF symbol can be multiplied by the entries of a matrix $R_{HE-LTF}$ (e.g., defined in the draft of the IEEE 802.11ax standard) to allow the device receiving the HE TB PPDU to track phase or frequency offset (or both) when using the HE-LTF to compute the channel responses. In some instances, single stream pilots can be used in the HE-LTF field for single user uplink and downlink OFDMA, as well as for downlink MU-MIMO and partial bandwidth uplink MU-MIMO transmissions. In some implementations, single stream pilots can be used in the HE-LTF field for a full bandwidth uplink MU-MINO transmission if single stream pilot HE-LTF mode is selected.

The doppler field 1708 of the common information field 1504 allows the transmitter of the trigger frame 1500 (e.g., the AP 230) to request the wireless devices 220A, 220B, 220C, 220D to periodically include a "midamble" within the data transmission. The midamble can be an HE-LTF inserted periodically within the transmission (e.g., to allow the device receiving the HE TB PPDU to re-equalize for a rapidly changing channel due to a high Doppler presence). If multiple midambles are present in the transmission of the HE TB PPDU, the channel responses can be computed multiple times per transmission of the HE TB PPDU. If the doppler field 1708 is enabled (e.g. set to 1), the number of HE-LTF symbols and midamble periodicity field 1706 of the common information field 1504 can be used to indicate how frequently the midamble is included within the data transmission.

As seen in FIG. 18 the user information list field 1506 includes an association identifier (AID12) field 1802. When the wireless devices 220A, 220B, 220C, 220D connect to the AP 230 (e.g., via an authentication and association phase), each of the wireless devices 220A, 2201B, 220C, 220D is assigned a unique identifier, which is indicated as a 12-bit identifier in the AID12 field 1802. In some instances, the device receiving the trigger frame 1500 (e.g., listening devices 250-1, 250-2 or any other device) can use the AID12 field 1802 in the trigger frame 1500 to identify the wireless devices 220A, 220B, 220C, 220D connected to the AP 230. Table 4 shows example encodings of the AID12 field 1802.

TABLE 4

| AID12 field encoding | |
|---|---|
| AID12 subfield | Description |
| 0 | User Info field allocates one or more contiguous RA-RUs for associated wireless devices |
| 1-2007 | User Info field is addressed to an associated wireless device whose AID is equal to the value in the AID12 subfield |
| 2008-2044 | Reserved |
| 2045 | User Info field allocates one or more contiguous RA-RUs for unassociated wireless devices |
| 2046 | Unallocated RU |
| 2047-4094 | Reserved |
| 4095 | Start of Padding Field |

As seen in Table 4, AID12 values between (and including) 1 and 2007 can be used by the device receiving the trigger frame 1500 (e.g., listening devices 250-1, 250-2 or any other device) to identify the wireless devices 220A, 220B, 220C, 220D connected to the AP 230.

As seen in FIG. 18, the user information list field 1506 includes an uplink (UL) target receive power field 1804. In some instances, the UL target receive power field 1804 can indicate, to the wireless devices 220A, 220B, 220C, 220D, the target RSSI for the subsequent UL-OFDMA transmission (e.g., as measured at the AP 230). In some instances, indicating the target RSSI to the wireless devices 220A, 220B, 220C, 220D allows the wireless devices 220A, 220B, 220C, 220D to adjust their respective transmit power levels when transmitting their respective HE-PHY frames, such that the received power levels are substantially equal at the AP 230. Use of the UL target receive power field 1804 to set the target RSSI for the subsequent UL-OFDMA transmission can overcome a limited dynamic range at the AP 230 and can substantially eliminate the near/far effect of different transmitters (e.g., the effect the wireless devices 220A, 220B, 220C, 220D being located at different distances from the AP 230). For example, without the UL target receive power field 1804, a HE-PHY frame transmitted from a wireless device in close proximity to the AP 230 can have a received power level (e.g., at the AP 230) that is greater than that of a HE-PHY frame transmitted from a wireless device farther from the AP 230. Consequently, without the UL target receive power field 1804, in an UL-OFDMA transmission where the respective HE-PHY frames are transmitted simultaneously, the HE-PHY frame from a closer wireless device can obscure reception of the HE-PHY frame from a farther wireless device. Consequently, use of the UL target receive power field 1804 substantially eliminates the effect the wireless devices 220A, 220B, 220C, 220D being located at different distances from the AP 230, since each of the wireless devices 220A, 220B, 220C, 220D adjusts their respective transmit power levels when transmitting their respective HE-PHY frames, such that the received power levels are substantially equal at the AP 230.

Figure 19:
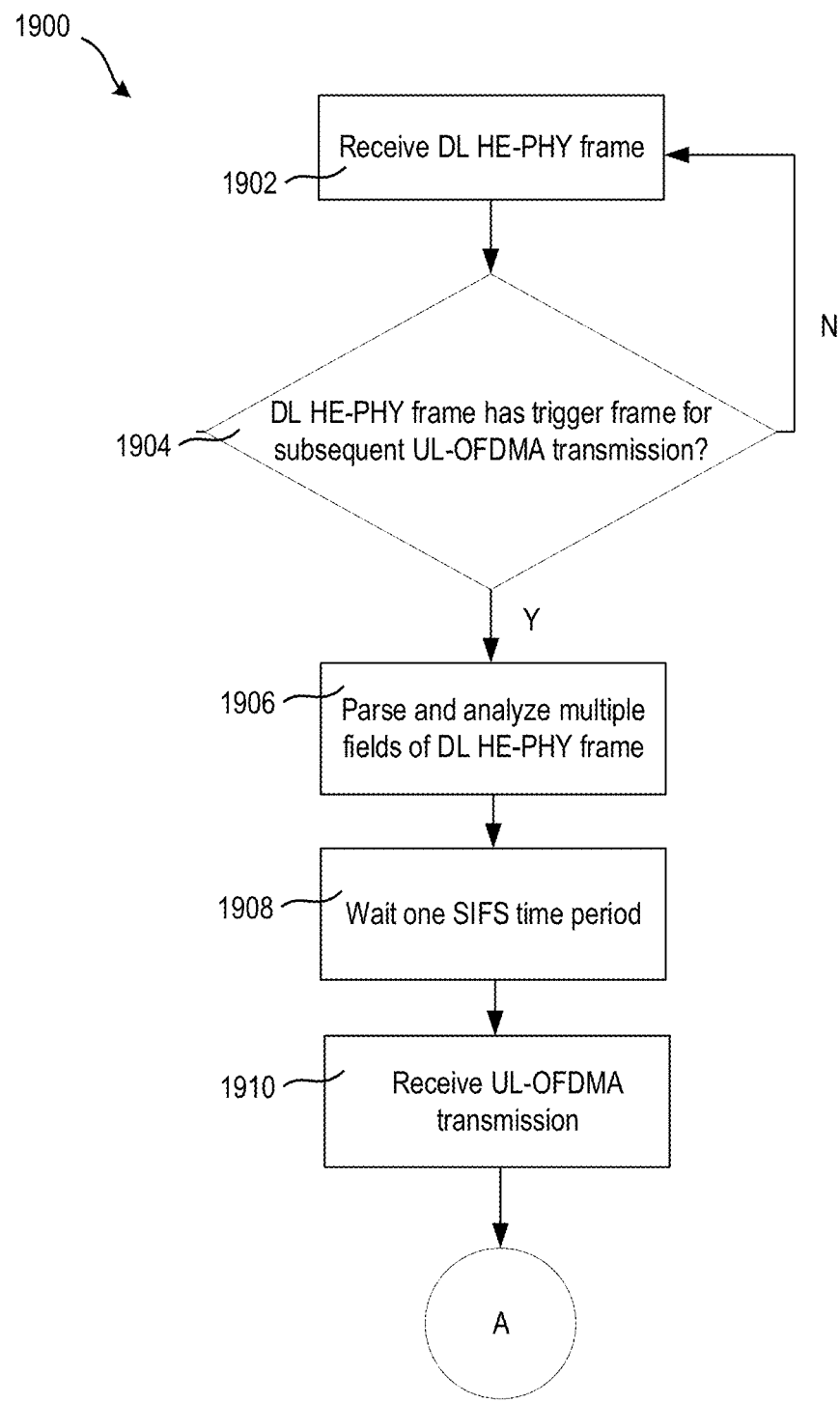
FIG. 19 is a diagram showing a flowchart for an example process for computing channel responses in a wireless communication network system operating according to the IEEE 802.11ax standard.
Figure 19:
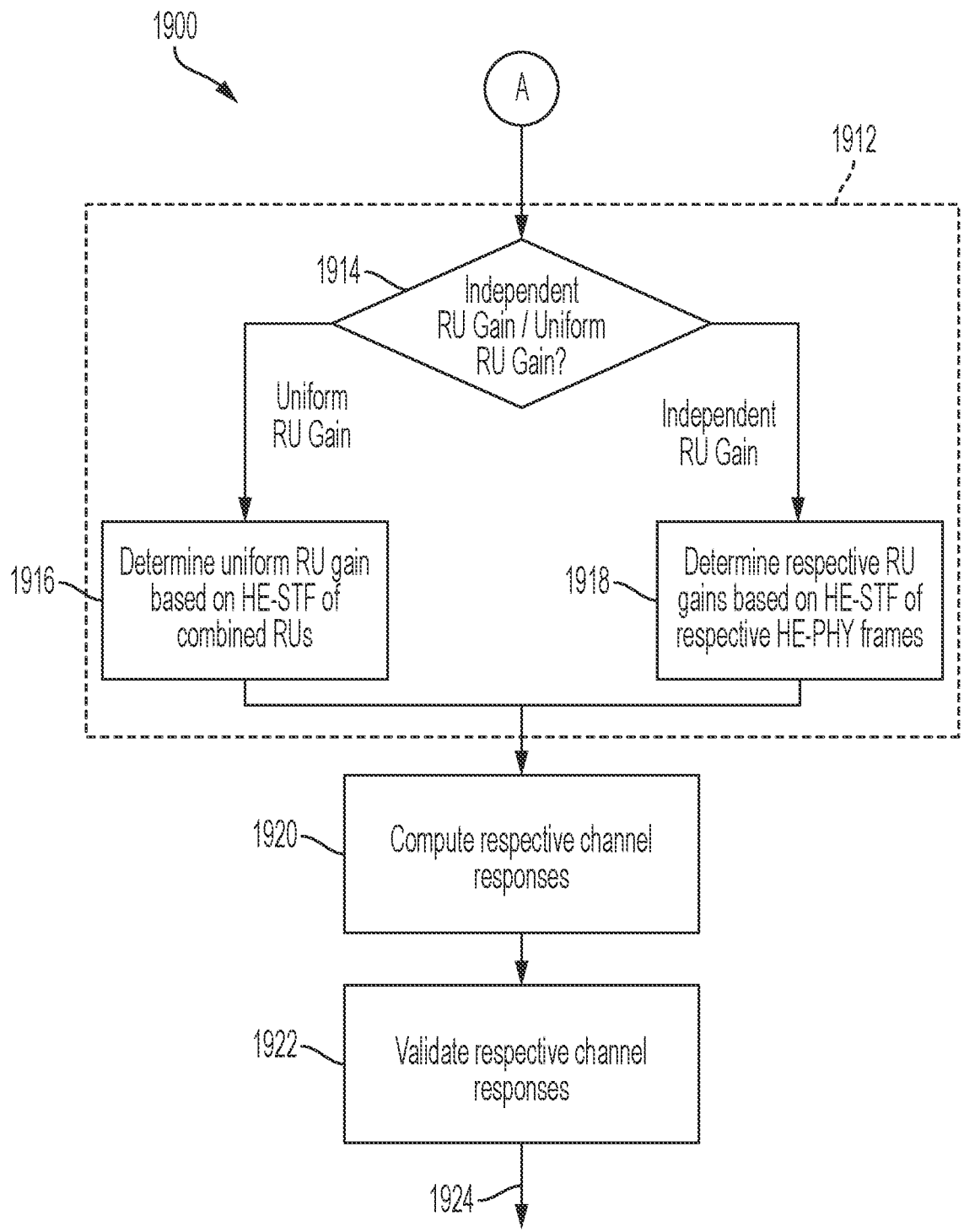

FIG. 19 is a diagram showing a flowchart for an example process 1900 for computing channel responses in a wireless communication network system operating according to the IEEE 802.11ax standard. The process 1900 can be performed by one (or both) of the listening devices 250-1, 250-2 to compute respective channel responses that can be used to simultaneously detect whether motion has occurred in respective motion detection zones. Additionally or alternatively, the process 1900 can be performed by one or more of the wireless devices 220A, 220B, 220C, 220D to simultaneously detect whether motion has occurred in respective motion detection zones. The process 1900 may include additional or different operations, and the operations shown in FIG. 19 may be performed in the order shown or in another order. In some cases, one or more of the operations shown in FIG. 19 are implemented as processes that include multiple operations, sub-processes for other types of routines. In some cases, operations can be combined, performed in another order, performed in parallel, iterated or otherwise repeated or performed in another manner.

At 1902, a DL HE-PHY frame is received. In some instances, the DL HE-PHY frame may be the first DL HE-PHY frame 1106 shown in FIG. 11C and can have the HE SU PPDU format (e.g., shown in FIG. 12A). The DL HE-PHY frame can include a trigger frame, which, as discussed above, can be a MAC layer frame encoded within the data payload 1202 of the HE-PHY frame 1200 having the HE SU PPDU format.

At 1904, a determination is made as to whether the DL HE-PHY frame (e.g., received at 1902) includes a trigger frame for a subsequent UL-OFDMA transmission. Stated differently, at 1904, a determination is made as to whether the trigger frame in the DL HE-PHY frame (e.g., received at 1902) can elicit a subsequent UL-OFDMA transmission. The device can determine whether the DL HE-PHY frame includes a trigger frame for a subsequent UL-OFDMA transmission based on the frame control field of the trigger frame. For example, as discussed above in relation to FIGS. 15 and 16, a trigger frame can be identified by type field 1600 of the frame control field 1502 having a binary value 01 and subtype field 1602 of the frame control field 1502 having binary value 0010 (e.g., Type=01 indicates a control frame, and Subtype=0010 indicates a trigger frame).

In response to a determination that the DL HE-PHY frame is not for a subsequent UL-OFDMA transmission, the process 1900 returns to 1902. Conversely, in response to a determination that the DL HE-PHY frame is for a subsequent UL-OFDMA transmission, the process 1900 proceeds to 1906.

At 1906, multiple fields of the DL HE-PHY frame are parsed and analyzed, for example, to determine a set of parameters of the subsequent UL-OFDMA transmission. The set of parameters determined at 1906 can be used by the device that received the DL HE-PHY frame to prepare a radio subsystem and a baseband subsystem for reception of the subsequent UL-OFDMA transmission. As an example, the set of parameters can be applied to a radio subsystem or a baseband subsystem (or both) for reception of the subsequent UL-OFDMA transmission.

In some instances, at 1906, the common information field 1504 of the trigger frame 1500 can be parsed and analyzed to determine one or more of the following: the total bandwidth of the subsequent UL-OFDMA transmission (e.g., indicated by the UL BW field 1700 of the common information field); the HE-LTF type and guard interval duration of the subsequent UL-OFDMA transmission (e.g., indicated by the GI and HE-LTF type field 1702 of the common information field); the HE-LTF mode of the subsequent UL-OFDMA transmission (e.g., indicated by the MU-MIMO HE-LTF mode field 1704 of the common information field); or whether and how frequently a midamble is included within the subsequent UL-OFDMA transmission (e.g., indicated by the number of HE-LTF symbols and midamble periodicity field 1706 and the doppler field 1708 of the common information field).

In some instances, at 1906, user information list field 1506 of the trigger frame 1500 can be parsed and analyzed to determine one or more of the following: the RU allocation for the respective wireless devices transmitting the subsequent UL-OFDMA transmission (e.g., indicated by the RU allocation field 1800 of the user information list field); the identity of the wireless devices transmitting the subsequent UL-OFDMA transmission (e.g., indicated by the AID12 field 1802 of the user information list field); or the target RSSI for the subsequent UL-OFDMA transmission (e.g., as measured at the AP 230 and indicated by the UL target receive power field 1804 of the user information list field).

At 1908, one SIFS time period (e.g., 16 µs in 5 GHz and 6 GHz bands) is allowed to elapse after the end of the DL HE-PHY frame. At 1910, the UL-OFDMA transmission is received (e.g., from the wireless devices identified at 1906, which simultaneously transmit respective HE-PHY frames using the respective RUs identified at 1906). As discussed above, the UL-OFDMA transmission can include multiple HE-PHY frames having the HE TB PPDU format (e.g., as seen in FIG. 12B).

In some instances, the device receiving the UL-OFDMA transmission at 1910 (e.g., listening devices 250-1, 250-2 or any other device) may have a high dynamic range, thus allowing the device to overcome the near/far effect of different transmitters. In other instances (e.g., where the device receiving the UL-OFDMA transmission at 1910 has limited dynamic range), operation 1912 can be performed to filter the respective HE-PHY frames transmitted from the wireless devices and using the RUs identified at 1906. Operation 1912 can be performed using a filter bank included in the receiver chain of the device receiving the UL-OFDMA transmission.

Figure 20:
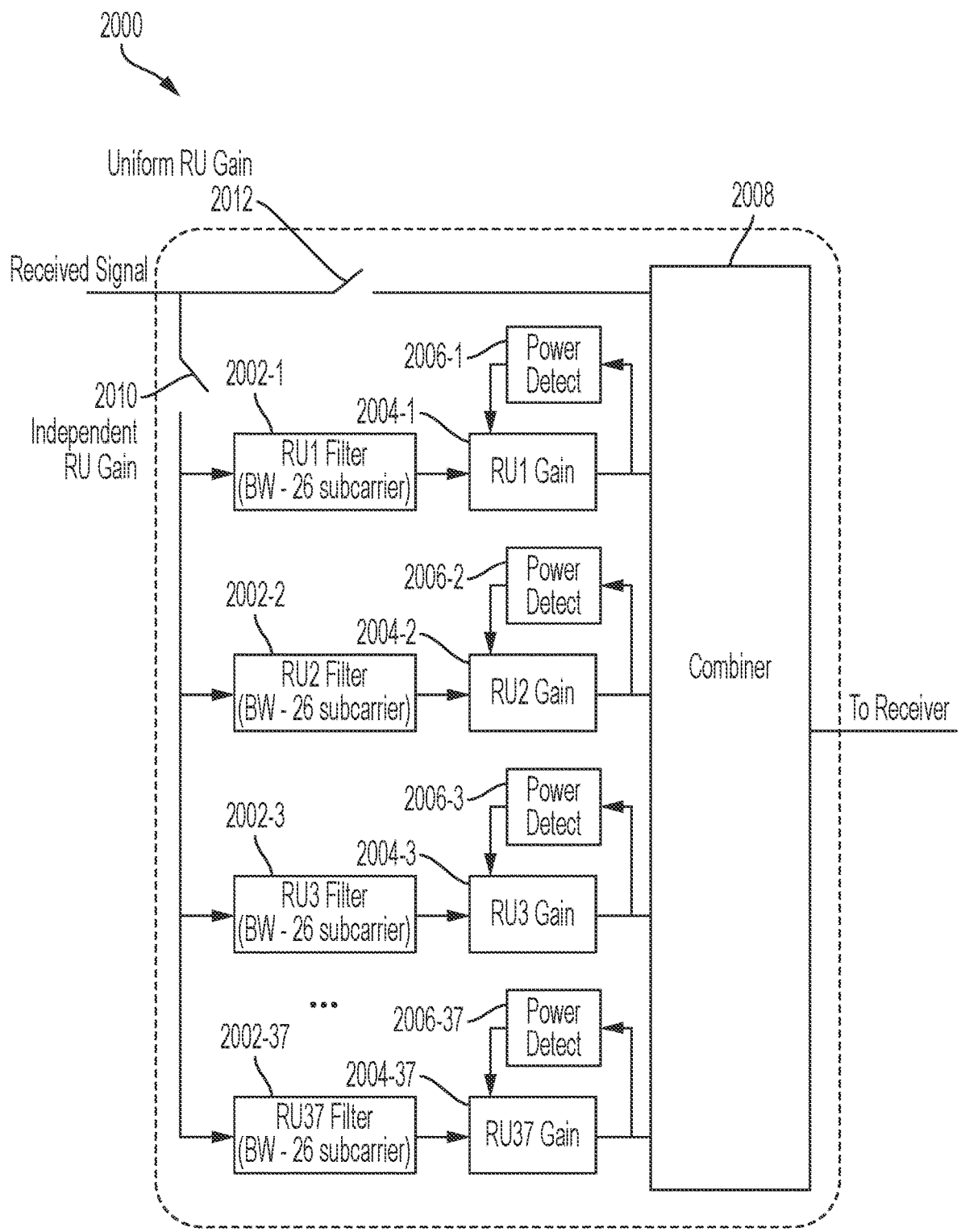
FIG. 20 shows an example filter bank that can be used to equalize respective HE-PHY frames.

FIG. 20 shows an example filter bank 2000 that can be used to equalize respective HE-PHY frames. The filter bank 2000 may be implemented in any position along the receive signal chain of the device receiving the UL-OFDMA transmission. In some instances, the filter bank 2000 can be implemented at the RF front end (e.g., after the antenna). In other instances, the filter bank 2000 can be implemented at an intermediate frequency (e.g., after the carrier center-frequency is down-converted to an intermediate frequency). The location of the filter bank 2000 along the receive signal chain can depend on the trade-offs and ability to realize the RU filters of the filter bank 2000.

Figure 21:
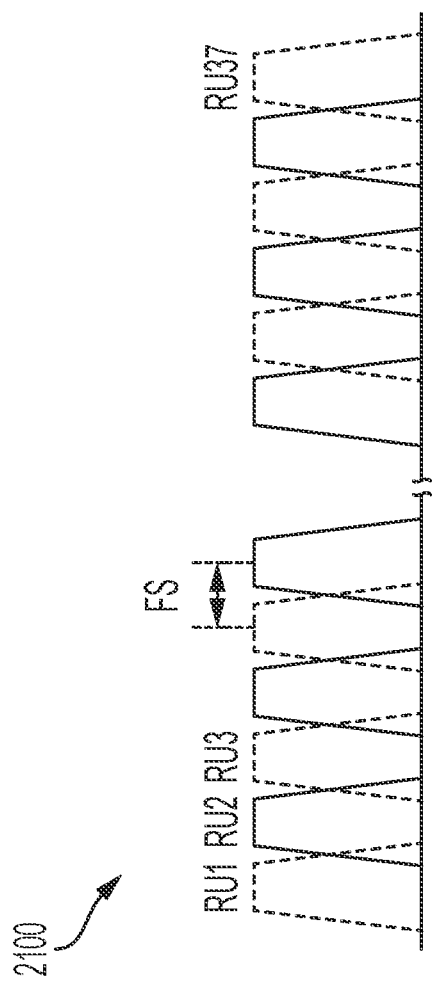
FIG. 21 shows an example tuning of bandpass filters in the filter bank shown in FIG. 20.

The example filter bank 2000 includes multiple dedicated bandpass filters 2002-1 to 2002-37, each having a respective RU gain 2004-1 to 2004-37. The example filter bank 2000 includes 37 bandpass filters, each having a respective RU gain; however, any number of multiple bandpass filters can be used for the filter bank. Having 37 bandpass filters provides the filter bank 2000 the ability to be used for an 80 MHz channel. Two filter banks 2000 can be used in instances where a 160 MHz channel is used. Each of the bandpass filters 2002-1 to 2002-37 is tuned to a respective bandwidth. FIG. 21 shows an example tuning 2100 of the bandpass filters 2002-1 to 2002-37 shown in FIG. 20. In some instances, each bandpass filter is turned to a bandwidth spanning 26-subcarriers (26×78.125 kHz=1.5625 MHz), as defined by the IEEE 802.11 HE PHY. As seen in FIG. 21, adjacent RU bandpass filters can have a center frequency separation FS, which can be 26-subcarriers (e.g., 1.5625 MHz) in some implementations. The RU gains 2004-1 to 2004-37 can be independently controlled and can be used to amplify the output of their respective bandpass filters 2002-1 to 2002-37. In some instances, the respective RU gains 2004-1 to 2004-37 can be determined based on the HE-STF of the respective HE-PHY frames (e.g., each occupying a respective RU). The output of each of the RU gains 2004-1 to 2004-37 is provided as an input to a respective power detector 2006-1 to 2006-37. The respective power detectors 2006-1 to 2006-37 determines the power of their respective inputs and adjusts the gain of their respective RU gains 2004-1 to 2004-37 such that all RUs have the same power prior to combining, thereby allowing equalization of the RUs of the received UL-OFDMA transmission. In some instances, the respective RU gains 2004-1 to 2004-37 are adjusted by the respective power detectors 2006-1 to 2006-37 to the highest value without saturating the receive signal chain, while fulfilling the condition that all RUs have the same power prior to combining. The filter bank 2000 includes a combiner 2008, and the equalized outputs of the RU gains 2004-1 to 2004-37 are provided to the combiner 2008. The combiner 2008 sums the outputs of the RU gains 2004-1 to 2004-37, and the output of the combiner 2008 is provided as an input to the remaining receiver components.

The example filter bank 2000 includes a first switch 2010 and a second switch 2012, which allow the received signal to be processed by the bandpass filters 2002-1 to 2002-37, the RU gains 2004-1 to 2004-37, the power detectors 2006-1 to 2006-37, and the combiner 2008. In instances where the RU gains are different, the first switch 2010 is closed and the second switch 2012 is opened. In instances where the RU gains are the same, the first switch 2010 is opened and the second switch 2012 is closed so that the received UL-OFDMA transmission can be passed directly to the combiner 2008, bypassing the bandpass filters 2002-1 to 2002-37, the RU gains 2004-1 to 2004-37, and the power detectors 2006-1 to 2006-37.

Referring back to FIG. 19, operation 1912 (which filters the respective HE-PHY frames) includes sub-operations 1914, 1916, and 1918. At 1914, a determination is made as to whether to implement uniform RU gain or independent RU gain. In some instances, if the device receiving the UL-OFDMA transmission at 1910 does not have the filter bank 2000, uniform RU gain may be provided, and signals in some RUs may be below the noise floor of the device. At 1916, in response to a determination that uniform RU gain is to be implemented, the uniform RU gain can be determined based on the HE-STF of the combined RUs (e.g., the HE-STF of the output of the combiner 2008).

Conversely, if the device receiving the UL-OFDMA transmission at 1910 includes the filter bank 2000, independent RU gain may be implemented so that the RUs of the received UL-OFDMA transmission can be equalized. At 1918, in response to a determination that independent RU gain is to be implemented, the respective RU gains can be determined based on the HE-STF of the respective HE-PHY frames (e.g., each occupying a respective RU).

At 1920, the respective channel responses are computed (e.g., based on the HE-LTF of the respective HE-PHY frames) and the MAC addresses of the wireless devices transmitting the UL-OFDMA transmission are obtained (e.g., from the respective HE-PHY frames). In some instances, if the "number of HE-LTF symbols and midamble periodicity" and doppler fields indicate that midambles are present, there may be more than one channel response computed from each of the respective HE-PHY frames (e.g., one channel response computed from the HE-LTF preamble and another channel response computed from the HE-LTF midamble). In some instances, the MAC addresses of the wireless devices may be obtained from the transmitting STA address (TA) field of the MAC header of the respective HE-PHY frames.

A result of operation 1920 is that the following are associated to each wireless device (e.g., identified by the AID12 field 1802 of the user information list field): the respective RU; the received power level of the signal within the respective RU; the channel response(s) computed from the HE-LTF of the respective HE-PHY frame; and the wireless device's MAC address.

At 1922, the computed channel responses are validated. For each wireless device identified by the AID12 field 1802 of the user information list field, the associated channel response is validated (e.g., approved for use in a motion detection process) if all the following conditions are satisfied: the received power level indicates the signal is at least greater than a minimum threshold; and a valid MAC address was obtained at 1920. In some instances, the minimum threshold depends on the noise-floor of the device receiving the UL-OFDMA transmission at 1910, and can be set such that the UL-OFDMA transmission is sufficiently higher than the minimum threshold such that a channel response can be computed. With regards to the validity of the MAC address, the frame header 914 shown in FIG. 9 includes the transmitter MAC address 918. As seen in FIG. 9, the frame header 914 is encoded in the MAC layer frame 912, which itself is encoded within the PHY data payload 910 of the PHY frame 900. The MAC layer frame 912 includes a 4-byte frame check sum (FCS) 926 that can be used to determine whether an uncorrectable bit error exists in the contents of the MAC layer frame 912. A determination as to whether a valid MAC addressed was obtained at 1920 can be made based on the validation of the FCS 926. Operation 1922 generates a motion data set 1924, which can include a set of motion scores corresponding to the validated channel responses, the RU frequencies and bandwidth, and the identifiers (e.g., MAC addresses) of the wireless devices transmitting the UL-OFDMA transmission. The motion data set 1924 are provided as in input to a motion detection process to simultaneously detect whether motion has occurred in multiple motion detection zones. In some instances, the motion data set 1924 is processed by the motion detection process to analyze motion within the environment (e.g., to simultaneously analyze multiple motion detection zones in the environment). In some implementations, analyzing motion within the environment based on the motion data set 1924 may include determining whether motion occurred within the environment. Additionally or alternatively, analyzing motion within the environment based on the motion data set 1924 may include determining the location or intensity of motion performed in the environment.

Figure 22:
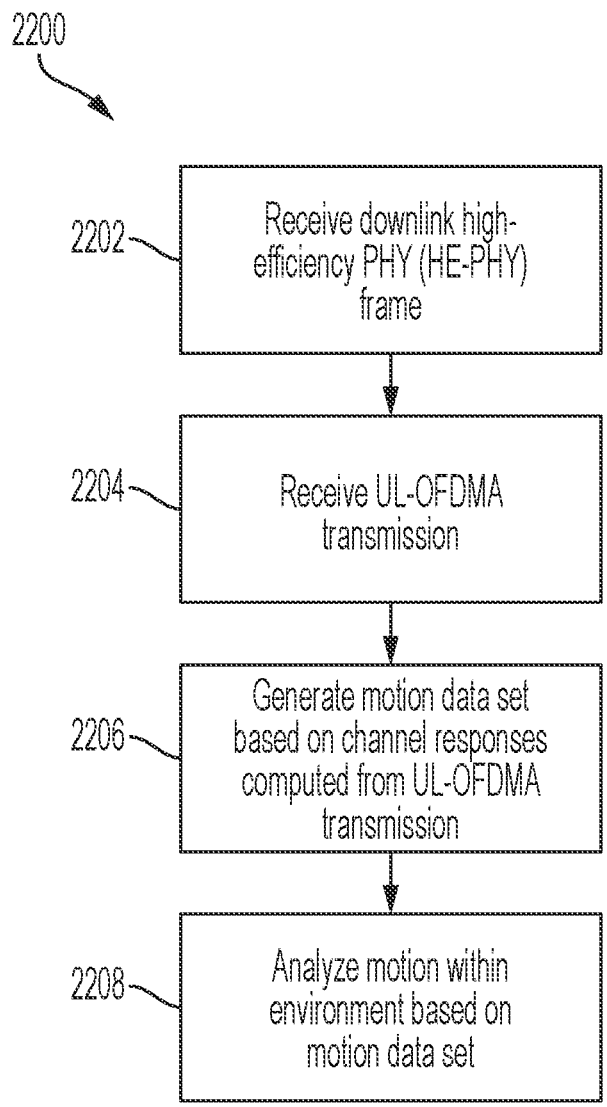
FIG. 22 is a diagram showing a flowchart for an example process for analyzing motion in an environment.

FIG. 22 is a diagram showing a flowchart for an example process 2200 for analyzing motion in an environment. The process 2200 can be performed by one (or both) of the listening devices 250-1, 250-2 to analyze motion in an environment (e.g., simultaneously detect whether motion has occurred in respective motion detection zones). Additionally or alternatively, the process 2200 can be performed by one or more of the wireless devices 220A, 220B, 220C, 220D to analyze motion in an environment (e.g., simultaneously detect whether motion has occurred in respective motion detection zones). The process 2200 may include additional or different operations, and the operations shown in FIG. 22 may be performed in the order shown or in another order. In some cases, one or more of the operations shown in FIG. 22 are implemented as processes that include multiple operations, sub-processes for other types of routines. In some cases, operations can be combined, performed in another order, performed in parallel, iterated or otherwise repeated or performed in another manner.

At 2202, a downlink high-efficiency PHY (HE-PHY) frame is received. The downlink HE-PHY frame can be the DL HE-PHY frame 1106 discussed above in relation to FIG. 11C. The downlink HE-PHY frame can be transmitted by the AP 230 to wireless devices 220A, 220B, 220C, 220D residing inside an environment. In some instances, the downlink PHY frame is addressed to the wireless devices 220A, 220B, 220C, 220D.

At 2204, an uplink orthogonal frequency-division multiple access (UL-OFDMA) transmission is received (e.g., in response to the downlink HE-PHY frame). The UL-OFDMA transmission can be the UL-OFDMA transmission 1108 discussed above in relation to FIG. 11C. The UL-OFDMA transmission can be transmitted by the wireless devices 220A, 220B, 220C, 220D to the AP 230 in response to the DL HE-PHY frame 1106. The UL-OFDMA transmission can include uplink HE-PHY frames (e.g., the HE-PHY frames 1108A to 1108N shown in FIG. 11D). As discussed above, the uplink HE-PHY frames can be simultaneously transmitted on respective resource units by the respective wireless communication devices.

At 2206, a motion data set (e.g., the motion data set 1924) is generated based on channel responses computed from the UL-OFDMA transmission. The process 1900 described above in relation to FIG. 19 can be used to generate the motion data set. As an example, the motion data set can be generated based on channel responses computed from the uplink HE-PHY frames included in the UL-OFDMA transmission. The motion data set can include a set of motion scores and identifiers (e.g., MAC addresses) of the wireless devices 220A, 220B, 220C, 220D.

At 2208, motion within the environment is analyzed based on the motion data set. As an example, the motion data set can be used to simultaneously detect whether motion has occurred in respective motion detection zones 1006A, 1006B.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer-readable storage medium for execution by, or to control the operation of, data-processing apparatus. A computer-readable storage medium can be, or can be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially generated propagated signal. The computer-readable storage medium can also be, or be included in, one or more separate physical components or media (e.g., multiple CDs, disks, or other storage devices). The computer-readable storage medium can include multiple computer-readable storage devices. The computer-readable storage devices may be co-located (instructions stored in a single storage device), or located in different locations (e.g., instructions stored in distributed locations).

Some of the operations described in this specification can be implemented as operations performed by a data processing apparatus on data stored in memory (e.g., on one or more computer-readable storage devices) or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. In some instances, the data processing apparatus includes a set of processors. The set of processors may be co-located (e.g., multiple processors in the same computing device) or located in different location from one another (e.g., multiple processors in distributed computing devices). The memory storing the data executed by the data processing apparatus may be co-located with the data processing apparatus (e.g., a computing device executing instructions stored in memory of the same computing device), or located in a different location from the data processing apparatus (e.g., a client device executing instructions stored on a server device).

A computer program (also known as a program, software, software application, instructions, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors 810 suitable for the execution of a computer program include, by way of example, both general and special purpose microprocessors, and processors of any kind of digital computer. Generally, a processor receives instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, a tablet computer, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices, e.g., memory 820, suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a stylus, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. The communication network may include one or more of a local area network ("LAN") and a wide area network ("WAN"), an internetwork (e.g., the Internet), a network including a satellite link, and peer-to-peer networks (e.g., ad hoc peer-to-peer networks). A relationship of client and server may arise by virtue of computer programs running on the respective computers and having a client-server relationship to each other.

In a general aspect of some of the examples described, motion is passively detected in an environment using wireless signals.

Example 1: A method, including: at a wireless sensor device that resides outside an environment, receiving wireless signals transmitted by wireless communication devices that reside inside the environment, each of the wireless signals being addressed to a respective one of the wireless communication devices. Example 1 includes generating a first set of motion data including a first set of motion scores and a first set of link identifiers based on a first subset of the wireless signals, the first set of motion scores based on beamforming reports in the first subset of the wireless signals, the first set of link identifiers based on address information in the first subset of the wireless signals. Example 1 includes generating a second set of motion data including a second set of motion scores and a second set of link identifiers based on a second subset of the wireless signals, the second set of motion scores based on channel responses computed from physical (PHY) frames in the second subset of the wireless signals, the second set of link identifiers based on address information in the second subset of the wireless signals. Example 1 includes generating a combined motion data set including the first and second sets of motion data; and by operation of one or more processors, analyzing motion within the environment based on the combined data set.

Example 2: The method of Example 1, wherein the wireless signals are transmitted in a wireless network, and the wireless sensor device is not associated to the wireless network.

Example 3: The method of Example 2, wherein the wireless network includes a wireless local area network, and at least one of the wireless communication devices includes an access point of the wireless local area network.

Example 4: The method of Example 2, wherein the wireless network includes an ad-hoc peer-to-peer wireless network, and the wireless communication devices include peer devices communicatively coupled via the ad-hoc peer-to-peer wireless network.

Example 5: The method of Example 1, including: determining the first set of link identifiers based on source and destination information in the address information in the first subset of the wireless signals; and determining the second set of link identifiers based on source and destination information in the address information in the second subset of the wireless signals.

Example 6: The method of Example 1, including: generating the first set of motion scores by a first type of motion detection process based on the beamforming reports in the first subset of the wireless signals; and generating the second set of motion scores by a second type of motion detection process based on the channel responses computed from the PHY frames in the second subset of the wireless signals.

Example 7: The method of Example 1, including computing the channel responses from preambles or training fields in the PHY frames.

Example 8: The method of Example 1, including: generating a third set of motion data including a third set of motion scores and a third set of link identifiers based on a third subset of the wireless signals; and generating the combined data set including the first, second and third sets of motion data.

Example 9: The method of Example 1, wherein analyzing motion within the environment based on the combined data set includes determining whether motion occurred within the environment.

Example 10: The method of Example 1, wherein the wireless sensor device is a first wireless sensor device, and the method includes: at a second wireless sensor device that resides outside the environment, receiving a second set of wireless signals transmitted by one or more of the wireless communication devices that reside inside the environment; generating a third set of motion data including a third set of motion scores and a third set of link identifiers based on the second set of wireless signals; and generating the combined data set including the first, second and third sets of motion data.

Example 11: A system, including: a wireless sensor device residing outside an environment, the wireless sensor device configured to receive wireless signals transmitted by wireless communication devices residing inside the environment, each of the wireless signals addressed to a respective one of the wireless communication devices. The system includes one or more processors configured to: generate a first set of motion data including a first set of motion scores and a first set of link identifiers based on a first subset of the wireless signals, the first set of motion scores based on beamforming reports in the first subset of the wireless signals, the first set of link identifiers based on address information in the first subset of the wireless signals; generate a second set of motion data including a second set of motion scores and a second set of link identifiers based on a second subset of the wireless signals, the second set of motion scores based on channel responses computed from physical (PHY) frames in the second subset of the wireless signals, the second set of link identifiers based on address information in the second subset of the wireless signals; generate a combined motion data set including the first and second sets of motion data; and analyze motion within the environment based on the combined motion data set.

Example 12: The system of Example 11, wherein the wireless sensor device includes the one or more processors.

Example 13: The system of Example 11, further including a processing device residing outside the environment and communicatively coupled to the wireless sensor device, wherein the one or more processors includes: a first processor configured to generate the first set of motion data, the second set of motion data, and the combined motion data set, the wireless sensor device including the first processor; and a second processor configured to analyze the motion within the environment based on the combined motion data set, the processing device including the second processor.

Example 14: The system of Example 11, further including a processing device residing outside the environment and communicatively coupled to the wireless sensor device, wherein the processing device includes the one or more processors.

Example 15: The system of Example 11, further including the wireless communication devices residing inside the environment.

Example 16: The system of Example 15, wherein the wireless signals are transmitted in a wireless network, and the wireless sensor device is not associated to the wireless network.

Example 17: The system of Example 16, wherein the wireless network includes an ad-hoc peer-to-peer wireless network, and the wireless communication devices include peer devices communicatively coupled through the ad-hoc peer-to-peer wireless network.

Example 18: The system of Example 15, wherein the wireless network includes a wireless local area network, and at least one of the wireless communication devices includes an access point of the wireless local area network.

Example 19: The system of Example 11, wherein the one or more processors are configured to compute the channel responses from preambles or training fields in the PHY frames.

Example 20: The system of Example 11, wherein the one or more processors are configured to: determine the first set of link identifiers based on source and destination information in the address information in the first subset of the wireless signals; and determine the second set of link identifiers based on source and destination information in the address information in the second subset of the wireless signals.

Example 21: The system of Example 11, wherein the one or more processors are configured to: generate the first set of motion scores by a first type of motion detection process based on the beamforming reports in the first subset of the wireless signals; and generate the second set of motion scores by a second type of motion detection process based on the channel responses computed from the PHY frames in the second subset of the wireless signals.

Example 22: The system of Example 11, wherein the wireless sensor device is a first wireless sensor device, the system further including a second wireless sensor device residing outside the environment. The second wireless sensor device is configured to: receive a second set of wireless signals transmitted by one or more of the wireless communication devices that reside inside the environment; and generate a third set of motion data including a third set of motion scores and a third set of link identifiers based on the second set of wireless signals.

Example 23: The system of Example 22, wherein the one or more processors are configured to generate the combined data set including the first, second and third sets of motion data.

Example 24: The system of Example 23, wherein the first wireless sensor device includes the one or more processors, and the second wireless sensor device is configured to transmit the third set of motion data to the first wireless sensor device.

Example 25: The system of Example 23, further including a processing device residing outside the environment and communicatively coupled to the first and second wireless sensor device, wherein the one or more processors includes: a first processor configured to generate the first set of motion data, the second set of motion data, and the combined motion data set, the first wireless sensor device including the first processor; and a second processor configured to analyze the motion within the environment based on the combined motion data set, the processing device including the second processor.

Example 26: The system of Example 25, wherein the second wireless sensor device is configured to transmit the third set of motion data to the first wireless sensor device, and the first wireless sensor device is configured to transmit the combined motion data set to the processing device.

Example 27: A non-transitory computer-readable medium storing instructions that, when executed by data processing apparatus, cause the data processing apparatus to perform the operations including: receiving wireless signals transmitted by wireless communication devices that reside inside an environment, each of the wireless signals addressed to a respective one of the wireless communication devices; generating a first set of motion scores based on beamforming reports in a first subset of the wireless signals; determining a first set of link identifiers based on address information in the first subset of the wireless signals; and generating a first set of motion data including the first set of motion scores and the first set of link identifiers. The operations include computing channel responses from physical (PHY) frames in a second subset of the wireless signals; generating a second set of motion scores based on the channel responses; determining a second set of link identifiers based on address information in the second subset of the wireless signals; and generating a second set of motion data including the second set of motion scores and the second set of link identifiers. The operations include generating a combined motion data set including the first and second sets of motion data.

Example 28: The computer-readable medium of Example 27, the operations further including analyzing motion within the environment based on the combined data set.

Example 29: The computer-readable medium of Example 28, wherein analyzing motion within the environment based on the combined data set includes determining whether motion occurred within the environment.

Example 30: The computer-readable medium of Example 27, wherein: determining the first set of link identifiers includes determining the first set of link identifiers based on source and destination information in the address information in the first subset of the wireless signals; and determining the second set of link identifiers includes determining the second set of link identifiers based on source and destination information in the address information in the second subset of the wireless signals.

Example 31: The computer-readable medium of Example 27, wherein: generating the first set of motion scores includes generating the first set of motion scores by a first type of motion detection process based on the beamforming reports in the first subset of the wireless signals; and generating the second set of motion scores includes generating the second set of motion scores by a second type of motion detection process based on the channel responses.

Example 32: The computer-readable medium of Example 27, wherein computing the channel responses includes computing the channel responses from preambles or training fields in the PHY frames in the second subset of the wireless signals.

Implementations of the one or more of the above-described examples may, in some cases, include one or more of the following features. The sensor device is a passive sensor device not associated with the wireless communication network of the remote environment and is in listening range of wireless devices transmitting on the wireless communication network of the remote environment. Identifying the wireless link is based on source and destination information in the signal including the beamforming report. One or more beamforming reports are exchanged in response to normal communications between a source wireless communication device and a destination wireless communication device. Associating the second channel response information with the wireless link includes matching a source identifier of the PHY frame to a source identifier of a wireless link in the remote environment. Combining the first channel response information and the second channel response information includes converting the first channel response information and the second channel response information to respective motion scores and combining the respective motion scores for each wireless link to generate a combined motion value indicative of motion. Beamforming reports may include a H-matrix, a V-matrix, or compressed V-matrix formats.

In some implementations, a computer-readable medium stores instructions that are operable when executed by a data processing apparatus to perform one or more operations of the above-described examples. In some implementations, a system (e.g., a wireless communication device, computer system, a combination thereof, or other type of system communicatively coupled to the wireless communication device) includes one or more data processing apparatuses and memory storing instructions that are operable when executed by the data processing apparatus to perform one or more operations of the first example.

In an Example 33, a motion detection method includes: receiving a downlink high-efficiency PHY (HE-PHY) frame transmitted by an access point device to wireless communication devices residing inside an environment, the downlink HE-PHY frame being addressed to the wireless communication devices. The method further includes receiving an uplink orthogonal frequency-division multiple access (UL-OFDMA) transmission transmitted by the wireless communication devices to the access point device in response to the downlink HE-PHY frame. The UL-OFDMA transmission includes uplink HE-PHY frames simultaneously transmitted on respective resource units by the respective wireless communication devices. The method additionally includes generating a motion data set including a set of motion scores and identifiers of the wireless communication devices based on channel responses computed from the uplink HE-PHY frames. Each channel response is computed from a respective one of the uplink HE-PHY frames. The method includes analyzing motion within the environment based on the motion data set.

Implementations of Example 33 may include one or more of the following features. The downlink HE-PHY frame has a first format, and the uplink HE-PHY frames have a second, different format. The first format is a high-efficiency single-user physical layer protocol data unit (HE SU PPDU) format, and the second format is a high-efficiency trigger-based physical layer protocol data unit (HE TB PPDU) format. The method can further include determining parameters for an uplink transmission based on the downlink HE-PHY frame, and after applying the parameters to an interface, receiving the UL-OFDMA transmission by operation of the interface. The downlink HE-PHY frame includes a trigger frame encoded in a data payload of the downlink HE-PHY frame, and determining the parameters includes determining the parameters based on the trigger frame encoded in the data payload of the downlink HE-PHY frame. The parameters can include at least one of a total bandwidth of the UL-OFDMA transmission, a HE-LTF type and guard interval duration of the UL-OFDMA transmission, information indicative of a midamble in the UL-OFDMA transmission, a resource unit allocation for the wireless communication devices, the identifiers of the wireless communication devices, or a target received signal strength indicator for the UL-OFDMA transmission. In some instances, the interface resides outside the environment, and receiving the downlink HE-PHY frame includes receiving the downlink HE-PHY frame by operation of the interface residing outside the environment, and receiving the UL-OFDMA transmission includes receiving the UL-OFDMA transmission by operation of the interface residing outside the environment The identifiers of the wireless communication devices include MAC addresses of the wireless communication devices. The method can further include computing the channel responses from High-Efficiency Long Training Fields (HE-LTFs) in the uplink HE-PHY frames. The channel responses correspond to respective motion detection zones in the environment, and analyzing motion within the environment based on the motion data set includes analyzing motion in the motion detection zones based on the motion data set.

In an Example 34, a non-transitory computer-readable medium stores instructions that are operable when executed by data processing apparatus to perform one or more operations of the Example 33. In an Example 35, a system includes wireless communication devices, a wireless-connected device and a computer device configured to perform one or more operations of Example 34.

Implementations of Example 35 may include one or more of the following features. One of the wireless communication devices can be or include the computer device. One of the wireless communication devices can be or include the network-connected device. The computer device can be located remote from the wireless communication devices and/or the network-connected device.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of examples have been described. Nevertheless, it will be understood that various modifications can be made. Accordingly, other examples are within the scope of the following claims.

What is claimed is:
1. A motion detection method, comprising:
receiving, at a listening device within range of wireless communication devices residing in an environment, a downlink high-efficiency PHY (HE-PHY) frame transmitted by an access point device to the wireless communication devices, the downlink HE-PHY frame being addressed to the wireless communication devices;

receiving, at the listening device, an uplink orthogonal frequency-division multiple access (UL-OFDMA) transmission transmitted by the wireless communication devices to the access point device in response to the downlink HE-PHY frame, the UL-OFDMA transmission comprising uplink HE-PHY frames simultaneously transmitted on respective resource units by the respective wireless communication devices;

generating a motion data set comprising a set of motion scores and identifiers of the wireless communication devices based on channel responses computed from the uplink HE-PHY frames, each channel response computed from a respective one of the uplink HE-PHY frames; and analyzing motion within the environment based on the motion data set.

2. The method of claim 1, wherein the downlink HE-PHY frame has a first format, and the uplink HE-PHY frames have a second, different format.

3. The method of claim 2, wherein the first format is a high-efficiency single-user physical layer protocol data unit (HE SU PPDU) format, and the second format is a high-efficiency trigger-based physical layer protocol data unit (HE TB PPDU) format.

4. The method of claim 1, comprising:
determining parameters for an uplink transmission based on the downlink HE-PHY frame; and
after applying the parameters to an interface, receiving the UL-OFDMA transmission by operation of the interface of the listening device.

5. The method of claim 4, wherein the downlink HE-PHY frame includes a trigger frame encoded in a data payload of the downlink HE-PHY frame, and determining the parameters comprises determining the parameters based on the trigger frame encoded in the data payload of the downlink HE-PHY frame.

6. The method of claim 4, wherein the parameters comprise at least one of a total bandwidth of the UL-OFDMA transmission, a HE-LTF type and guard interval duration of the UL-OFDMA transmission, information indicative of a midamble in the UL-OFDMA transmission, a resource unit allocation for the wireless communication devices, the identifiers of the wireless communication devices, or a target received signal strength indicator for the UL-OFDMA transmission.

7. The method of claim 4, wherein:
the interface resides outside the environment;
receiving the downlink HE-PHY frame comprises receiving the downlink HE-PHY frame by operation of the interface residing outside the environment; and
receiving the UL-OFDMA transmission comprises receiving the UL-OFDMA transmission by operation of the interface residing outside the environment.

8. The method of claim 1, wherein the identifiers of the wireless communication devices comprise MAC addresses of the wireless communication devices.

9. The method of claim 1, comprising computing the channel responses from High-Efficiency Long Training Fields (HE-LTFs) in the uplink HE-PHY frames.

10. The method of claim 1, wherein the channel responses correspond to respective motion detection zones in the environment, and analyzing motion within the environment based on the motion data set comprises analyzing motion in the motion detection zones based on the motion data set.

11. A system, comprising:
a listening device within range of wireless communication devices residing in an environment, configured to receive a downlink high-efficiency PHY (HE-PHY) frame transmitted by an access point device to the wireless communication devices, the downlink PHY frame being addressed to the wireless communication devices; and one or more processors configured to perform operations comprising:
receiving an uplink orthogonal frequency-division multiple access (UL-OFDMA) transmission transmitted by the wireless communication devices to the access point device in response to the downlink HE-PHY frame, the UL-OFDMA transmission comprising uplink HE-PHY frames simultaneously transmitted on respective resource units by the respective wireless communication devices;

generating a motion data set comprising a set of motion scores and identifiers of the wireless communication devices based on channel responses computed from the uplink HE-PHY frames, each channel response computed from a respective one of the uplink HE-PHY frames; and analyzing motion within the environment based on the motion data set.

12. The system of claim 11, wherein the downlink HE-PHY frame has a first format, and the uplink HE-PHY frames have a second, different format.

13. The system of claim 12, wherein the first format is a high-efficiency single-user physical layer protocol data unit (HE SU PPDU) format, and the second format is a high-efficiency trigger-based physical layer protocol data unit (HE TB PPDU) format.

14. The system of claim 11, the operations comprising:
determining parameters for an uplink transmission based on the downlink HE-PHY frame; and
after applying the parameters to an interface of the listening device, receiving the UL-OFDMA transmission by operation of the interface.

15. The system of claim 14, wherein the downlink HE-PHY frame includes a trigger frame encoded in a data payload of the downlink HE-PHY frame, and determining the parameters comprises determining the parameters based on the trigger frame encoded in the data payload of the downlink HE-PHY frame.

16. The system of claim 14, wherein the parameters comprise at least one of a total bandwidth of the UL-OFDMA transmission, a HE-LTF type and guard interval duration of the UL-OFDMA transmission, information indicative of a midamble in the UL-OFDMA transmission, a resource unit allocation for the wireless communication devices, the identifiers of the wireless communication devices, or a target received signal strength indicator for the UL-OFDMA transmission.

17. The system of claim 14, wherein:
the interface resides outside the environment;
receiving the downlink HE-PHY frame comprises receiving the downlink HE-PHY frame by operation of the interface residing outside the environment; and
receiving the UL-OFDMA transmission comprises receiving the UL-OFDMA transmission by operation of the interface residing outside the environment.

18. The system of claim 11, wherein the identifiers of the wireless communication devices comprise MAC addresses of the wireless communication devices.

19. The system of claim 11, the operations comprising computing the channel responses from High-Efficiency Long Training Fields (HE-LTFs) in the uplink HE-PHY frames.

20. The system of claim 11, wherein the channel responses correspond to respective motion detection zones in the environment, and analyzing motion within the environment based on the motion data set comprises analyzing motion in the motion detection zones based on the motion data set.

21. A non-transitory computer-readable medium storing instructions that, when executed by data processing apparatus, cause the data processing apparatus to perform the operations comprising:
   receiving, at a listening device within range of wireless communication devices residing in an environment, a downlink high-efficiency PHY (HE-PHY) frame transmitted by an access point device to the wireless communication devices, the downlink HE-PHY frame being addressed to the wireless communication devices;
   receiving, at the listening device, an uplink orthogonal frequency-division multiple access (UL-OFDMA) transmission transmitted by the wireless communication devices to the access point device in response to the downlink HE-PHY frame, the UL-OFDMA transmission comprising uplink HE-PHY frames simultaneously transmitted on respective resource units by the respective wireless communication devices;
   generating a motion data set comprising a set of motion scores and identifiers of the wireless communication devices based on channel responses computed from the uplink HE-PHY frames, each channel response computed from a respective one of the uplink HE-PHY frames; and
   analyzing motion within the environment based on the motion data set.

22. The non-transitory computer-readable medium of claim 21, wherein the downlink HE-PHY frame has a first format, and the uplink HE-PHY frames have a second, different format.

23. The non-transitory computer-readable medium of claim 22, wherein the first format is a high-efficiency single-user physical layer protocol data unit (HE SU PPDU) format, and the second format is a high-efficiency trigger-based physical layer protocol data unit (HE TB PPDU) format.

24. The non-transitory computer-readable medium of claim 21, the operations comprising:
   determining parameters for an uplink transmission based on the downlink HE-PHY frame; and
   after applying the parameters to an interface of the listening device, receiving the UL-OFDMA transmission by operation of the interface.

25. The non-transitory computer-readable medium of claim 24, wherein the downlink HE-PHY frame includes a trigger frame encoded in a data payload of the downlink HE-PHY frame, and determining the parameters comprises determining the parameters based on the trigger frame encoded in the data payload of the downlink HE-PHY frame.

26. The non-transitory computer-readable medium of claim 24, wherein the parameters comprise at least one of a total bandwidth of the UL-OFDMA transmission, a HE-LTF type and guard interval duration of the UL-OFDMA transmission, information indicative of a midamble in the UL-OFDMA transmission, a resource unit allocation for the wireless communication devices, the identifiers of the wireless communication devices, or a target received signal strength indicator for the UL-OFDMA transmission.

27. The non-transitory computer-readable medium of claim 24, wherein:
   the interface resides outside the environment;
   receiving the downlink HE-PHY frame comprises receiving the downlink HE-PHY frame by operation of the interface residing outside the environment; and
   receiving the UL-OFDMA transmission comprises receiving the UL-OFDMA transmission by operation of the interface residing outside the environment.

28. The non-transitory computer-readable medium of claim 21, wherein the identifiers of the wireless communication devices comprise MAC addresses of the wireless communication devices.

29. The non-transitory computer-readable medium of claim 1, the operations comprising computing the channel responses from High-Efficiency Long Training Fields (HE-LTFs) in the uplink HE-PHY frames.

30. The non-transitory computer-readable medium of claim 21, wherein the channel responses correspond to respective motion detection zones in the environment, and analyzing motion within the environment based on the motion data set comprises analyzing motion in the motion detection zones based on the motion data set.

* * * * *

UNITED STATES PATENT AND TRADEMARK OFFICE
CERTIFICATE OF CORRECTION

PATENT NO. : 12,019,143 B2
APPLICATION NO. : 17/181077
DATED : June 25, 2024
INVENTOR(S) : Christopher Beg It is certified that error appears in the above-identified patent and that said Letters Patent is hereby corrected as shown below:

In the Specification

Column 22, Detailed Description, Line 56 Delete "s" and insert -- µs -- therefor Column 22, Detailed Description, Line 56 Delete "s," and insert -- µs, -- therefor Column 22, Detailed Description, Line 59 Delete "s" and insert -- µs -- therefor Column 23, Detailed Description, Line 46 Delete "s" and insert -- µs -- therefor Column 27, Detailed Description, Line 6 After "IQ" insert -- , --

Column 29, Detailed Description, Line 38 Delete "(130)" and insert -- (B0) -- therefor Column 31, Detailed Description, Line 42 Delete "2201B," and insert -- 220B, -- therefor Signed and Sealed this
Tenth Day of September, 2024

Katherine Kelly Vidal
*Director of the United States Patent and Trademark Office*